United States Patent
Ohta et al.

(10) Patent No.: US 8,845,426 B2
(45) Date of Patent: Sep. 30, 2014

(54) INPUT SYSTEM, INFORMATION PROCESSING DEVICE, STORAGE MEDIUM STORING INFORMATION PROCESSING PROGRAM, AND THREE-DIMENSIONAL POSITION CALCULATION METHOD

(75) Inventors: Keizo Ohta, Kyoto (JP); Kazuhiro Musa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 198 days.

(21) Appl. No.: 13/354,000

(22) Filed: Jan. 19, 2012

(65) Prior Publication Data

US 2012/0258796 A1 Oct. 11, 2012

(30) Foreign Application Priority Data

Apr. 7, 2011 (JP) ................................. 2011-085214

(51) Int. Cl.
| | |
|---|---|
| A63F 13/00 | (2014.01) |
| A63F 13/40 | (2014.01) |
| G06T 19/00 | (2011.01) |
| G06F 3/0346 | (2013.01) |

(52) U.S. Cl.
CPC .............. *G06F 3/0346* (2013.01); *A63F 13/10* (2013.01); *G06T 19/00* (2013.01); *A63F 2300/105* (2013.01); *G06T 2219/2024* (2013.01); *A63F 2300/1075* (2013.01); *A63F 2300/204* (2013.01); *A63F 2300/6045* (2013.01)
USPC .................... 463/30; 463/31; 463/32; 463/37; 463/39

(58) Field of Classification Search
USPC ............................ 463/30–32; 345/8, 419, 633
See application file for complete search history.

(56) References Cited

U.S. PATENT DOCUMENTS

| | | | |
|---|---|---|---|
| 4,210,329 | A | 7/1980 | Steiger et al. |
| 5,009,501 | A | 4/1991 | Fenner et al. |
| 5,440,326 | A | 8/1995 | Quinn |

(Continued)

FOREIGN PATENT DOCUMENTS

| | | |
|---|---|---|
| CN | 1593709 | 3/2005 |
| CN | 1868244 | 11/2006 |

(Continued)

OTHER PUBLICATIONS

Sony HMZ-T1 with TrackIR 5 playing PC games! WoW and Skyrim Uploaded by iphwne Nov. 16, 2011 https://www.youtube.com/watch?v=5OLCFMBWT6I.*

(Continued)

*Primary Examiner* — Damon Pierce
*Assistant Examiner* — Jeffrey Wong
(74) *Attorney, Agent, or Firm* — Nixon & Vanderhye, P.C.

(57) ABSTRACT

An example input processing system includes a controller device and an information processing device. The controller device transmits data representing an input position on a predetermined input surface and a detection result of an inertia sensor unit to the information processing device. The information processing device calculates an attitude of the controller device based on the detection result of the inertia sensor unit, and sets a predetermined surface in a virtual space so that an attitude of the predetermined surface changes in accordance with the attitude of the controller device. A first image representing an area in the virtual space including a position of the surface is displayed on a predetermined display device. The information processing device calculates, as a position in the virtual space, a position on the surface determined by the input position.

33 Claims, 24 Drawing Sheets

(56) References Cited

U.S. PATENT DOCUMENTS

| | | |
|---|---|---|
| 5,452,104 A | 9/1995 | Lee |
| 5,602,566 A | 2/1997 | Motosyuku et al. |
| 5,608,449 A | 3/1997 | Swafford, Jr. et al. |
| 5,619,397 A | 4/1997 | Honda et al. |
| 5,820,462 A | 10/1998 | Yokoi et al. |
| 5,825,350 A | 10/1998 | Case, Jr. et al. |
| 5,825,352 A | 10/1998 | Bisset et al. |
| D411,530 S | 6/1999 | Carter et al. |
| 5,943,043 A | 8/1999 | Furuhata et al. |
| 6,020,891 A | 2/2000 | Rekimoto |
| 6,069,790 A | 5/2000 | Howell et al. |
| 6,084,584 A | 7/2000 | Nahi et al. |
| 6,084,594 A | 7/2000 | Goto |
| 6,104,380 A | 8/2000 | Stork et al. |
| 6,126,547 A | 10/2000 | Ishimoto |
| 6,164,808 A | 12/2000 | Shibata et al. |
| 6,183,365 B1 | 2/2001 | Tonomura et al. |
| 6,201,554 B1 | 3/2001 | Lands |
| 6,208,329 B1 | 3/2001 | Ballare |
| 6,238,291 B1 | 5/2001 | Fujimoto et al. |
| 6,252,153 B1 | 6/2001 | Toyama |
| 6,254,481 B1 | 7/2001 | Jaffe |
| 6,323,846 B1 | 11/2001 | Westerman et al. |
| 6,340,957 B1 | 1/2002 | Adler et al. |
| 6,347,290 B1 | 2/2002 | Bartlett |
| 6,379,249 B1 | 4/2002 | Satsukawa et al. |
| 6,396,480 B1 | 5/2002 | Schindler et al. |
| 6,400,376 B1 | 6/2002 | Singh et al. |
| 6,411,275 B1 | 6/2002 | Hedberg |
| 6,425,822 B1 | 7/2002 | Hayashida et al. |
| 6,466,198 B1 | 10/2002 | Feinstein |
| 6,466,831 B1 | 10/2002 | Shibata et al. |
| 6,498,860 B1 | 12/2002 | Sasaki et al. |
| 6,500,070 B1 | 12/2002 | Tomizawa et al. |
| 6,509,896 B1 | 1/2003 | Ogasawara et al. |
| 6,538,636 B1 | 3/2003 | Harrison |
| 6,540,610 B2 | 4/2003 | Chatani |
| 6,540,614 B1 | 4/2003 | Nishino et al. |
| 6,557,001 B1 | 4/2003 | Dvir et al. |
| 6,567,068 B2 | 5/2003 | Rekimoto |
| 6,567,101 B1 | 5/2003 | Thomas |
| 6,567,984 B1 | 5/2003 | Allport |
| 6,570,557 B1 | 5/2003 | Westerman et al. |
| 6,582,299 B1 | 6/2003 | Matsuyama et al. |
| 6,657,627 B1 | 12/2003 | Wada et al. |
| 6,690,358 B2 | 2/2004 | Kaplan |
| 6,716,103 B1 | 4/2004 | Eck et al. |
| 6,798,429 B2 | 9/2004 | Bradski |
| 6,834,249 B2 | 12/2004 | Orchard |
| 6,847,351 B2 | 1/2005 | Noguera |
| 6,856,259 B1 | 2/2005 | Sharp |
| 6,888,536 B2 | 5/2005 | Westerman et al. |
| 6,897,833 B1 | 5/2005 | Robinson et al. |
| 6,908,386 B2 | 6/2005 | Suzuki et al. |
| 6,921,336 B1 | 7/2005 | Best |
| 6,930,661 B2 | 8/2005 | Uchida et al. |
| 6,933,923 B2 | 8/2005 | Feinstein |
| 6,939,231 B2 | 9/2005 | Mantyjarvi et al. |
| 6,954,491 B1 | 10/2005 | Kim et al. |
| 6,966,837 B1 | 11/2005 | Best |
| 6,988,097 B2 | 1/2006 | Shirota |
| 6,990,639 B2 | 1/2006 | Wilson |
| 6,993,451 B2 | 1/2006 | Chang et al. |
| 7,007,242 B2 | 2/2006 | Suomela et al. |
| D519,118 S | 4/2006 | Woodward |
| 7,023,427 B2 | 4/2006 | Kraus et al. |
| 7,030,856 B2 | 4/2006 | Dawson et al. |
| 7,030,861 B1 | 4/2006 | Westerman et al. |
| 7,038,662 B2 | 5/2006 | Noguera |
| 7,053,887 B2 | 5/2006 | Kraus et al. |
| 7,068,294 B2 | 6/2006 | Kidney et al. |
| 7,088,342 B2 | 8/2006 | Rekimoto et al. |
| 7,109,978 B2 | 9/2006 | Gillespie et al. |
| 7,115,031 B2 | 10/2006 | Miyamoto et al. |
| 7,128,648 B2 | 10/2006 | Watanabe |
| 7,140,962 B2 | 11/2006 | Okuda et al. |
| 7,142,191 B2 | 11/2006 | Idesawa et al. |
| 7,158,123 B2 | 1/2007 | Myers et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,184,020 B2 | 2/2007 | Matsui |
| 7,225,101 B2 | 5/2007 | Usuda et al. |
| 7,233,316 B2 | 6/2007 | Smith et al. |
| 7,254,775 B2 | 8/2007 | Geaghan et al. |
| 7,256,767 B2 | 8/2007 | Wong et al. |
| 7,271,795 B2 | 9/2007 | Bradski |
| 7,275,994 B2 | 10/2007 | Eck et al. |
| 7,280,096 B2 | 10/2007 | Marvit et al. |
| 7,285,051 B2 | 10/2007 | Eguchi et al. |
| 7,289,102 B2 | 10/2007 | Hinckley et al. |
| 7,295,191 B2 | 11/2007 | Kraus et al. |
| 7,301,526 B2 | 11/2007 | Marvit et al. |
| 7,301,527 B2 | 11/2007 | Marvit |
| 7,301,529 B2 | 11/2007 | Marvit et al. |
| 7,321,342 B2 | 1/2008 | Nagae |
| 7,333,087 B2 | 2/2008 | Soh et al. |
| RE40,153 E | 3/2008 | Westerman et al. |
| 7,339,580 B2 | 3/2008 | Westerman et al. |
| 7,352,358 B2 | 4/2008 | Zalewski et al. |
| 7,352,359 B2 | 4/2008 | Zalewski et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| D568,882 S | 5/2008 | Ashida et al. |
| 7,376,388 B2 | 5/2008 | Ortiz et al. |
| 7,389,591 B2 | 6/2008 | Jaiswal et al. |
| 7,391,409 B2 | 6/2008 | Zalewski et al. |
| 7,403,220 B2 | 7/2008 | MacIntosh et al. |
| 7,431,216 B2 | 10/2008 | Weinans |
| 7,446,731 B2 | 11/2008 | Yoon |
| 7,461,356 B2 | 12/2008 | Mitsutake |
| 7,479,948 B2 | 1/2009 | Kim et al. |
| 7,479,949 B2 | 1/2009 | Jobs et al. |
| 7,510,477 B2 | 3/2009 | Argentar |
| 7,518,503 B2 | 4/2009 | Peele |
| 7,519,468 B2 | 4/2009 | Orr et al. |
| 7,522,151 B2 | 4/2009 | Arakawa et al. |
| 7,540,011 B2 | 5/2009 | Wixson et al. |
| 7,552,403 B2 | 6/2009 | Wilson |
| 7,570,275 B2 | 8/2009 | Idesawa et al. |
| D599,352 S | 9/2009 | Takamoto et al. |
| 7,607,111 B2 | 10/2009 | Vaananen et al. |
| 7,614,008 B2 | 11/2009 | Ording |
| 7,619,618 B2 | 11/2009 | Westerman et al. |
| 7,626,598 B2 | 12/2009 | Manchester |
| 7,647,614 B2 | 1/2010 | Krikorian et al. |
| 7,656,394 B2 | 2/2010 | Westerman et al. |
| 7,663,607 B2 | 2/2010 | Hotelling et al. |
| 7,667,707 B1 | 2/2010 | Margulis |
| 7,692,628 B2 | 4/2010 | Smith et al. |
| 7,696,980 B1 | 4/2010 | Piot et al. |
| 7,699,704 B2 | 4/2010 | Suzuki et al. |
| 7,705,830 B2 | 4/2010 | Westerman et al. |
| 7,710,396 B2 | 5/2010 | Smith et al. |
| 7,719,523 B2 | 5/2010 | Hillis |
| 7,721,231 B2 | 5/2010 | Wilson |
| 7,730,402 B2 | 6/2010 | Song |
| 7,736,230 B2 | 6/2010 | Argentar |
| 7,762,891 B2 | 7/2010 | Miyamoto et al. |
| D620,939 S | 8/2010 | Suetake et al. |
| 7,782,297 B2 | 8/2010 | Zalewski |
| 7,791,808 B2 | 9/2010 | French et al. |
| 7,827,698 B2 | 11/2010 | Jaiswal et al. |
| D636,773 S | 4/2011 | Lin |
| 7,934,995 B2 | 5/2011 | Suzuki |
| D641,022 S | 7/2011 | Dodo et al. |
| 8,038,533 B2 | 10/2011 | Tsuchiyama et al. |
| 8,105,169 B2 | 1/2012 | Ogasawara et al. |
| D666,250 S | 8/2012 | Fulghum et al. |

(56) References Cited

U.S. PATENT DOCUMENTS

| | | | |
|---|---|---|---|
| 8,246,460 B2 | 8/2012 | Kitahara | |
| 8,256,730 B2 | 9/2012 | Tseng | |
| 8,317,615 B2 | 11/2012 | Takeda et al. | |
| 8,337,308 B2 | 12/2012 | Ito et al. | |
| 8,339,364 B2 | 12/2012 | Takeda et al. | |
| 8,529,352 B2 | 9/2013 | Mae et al. | |
| 8,567,599 B2 | 10/2013 | Beatty et al. | |
| 8,613,672 B2 | 12/2013 | Mae et al. | |
| 2001/0019363 A1 | 9/2001 | Katta et al. | |
| 2002/0103026 A1 | 8/2002 | Himoto et al. | |
| 2002/0103610 A1 | 8/2002 | Bachmann et al. | |
| 2002/0107071 A1 | 8/2002 | Himoto et al. | |
| 2002/0165028 A1 | 11/2002 | Miyamoto et al. | |
| 2003/0027517 A1 | 2/2003 | Callway et al. | |
| 2003/0207704 A1 | 11/2003 | Takahashi et al. | |
| 2003/0216179 A1 | 11/2003 | Suzuki et al. | |
| 2004/0023719 A1 | 2/2004 | Hussaini et al. | |
| 2004/0092309 A1 | 5/2004 | Suzuki | |
| 2004/0229687 A1 | 11/2004 | Miyamoto et al. | |
| 2004/0266529 A1 | 12/2004 | Chatani | |
| 2005/0176502 A1 | 8/2005 | Nishimura et al. | |
| 2005/0181756 A1 | 8/2005 | Lin | |
| 2005/0253806 A1 | 11/2005 | Liberty et al. | |
| 2006/0012564 A1 | 1/2006 | Shiozawa et al. | |
| 2006/0015808 A1 | 1/2006 | Shiozawa et al. | |
| 2006/0015826 A1 | 1/2006 | Shiozawa et al. | |
| 2006/0038914 A1 | 2/2006 | Hanada et al. | |
| 2006/0077165 A1 | 4/2006 | Jang | |
| 2006/0094502 A1 | 5/2006 | Katayama et al. | |
| 2006/0174026 A1 | 8/2006 | Robinson et al. | |
| 2006/0250764 A1 | 11/2006 | Howarth et al. | |
| 2006/0252537 A1 | 11/2006 | Wu | |
| 2006/0252541 A1 | 11/2006 | Zalewski et al. | |
| 2006/0267928 A1 | 11/2006 | Kawanobe et al. | |
| 2007/0021216 A1 | 1/2007 | Guruparan | |
| 2007/0049374 A1 | 3/2007 | Ikeda et al. | |
| 2007/0060383 A1 | 3/2007 | Dohta | |
| 2007/0202956 A1 | 8/2007 | Ogasawara et al. | |
| 2007/0252901 A1 | 11/2007 | Yokonuma et al. | |
| 2007/0265085 A1 | 11/2007 | Miyamoto et al. | |
| 2008/0015017 A1 | 1/2008 | Ashida et al. | |
| 2008/0024435 A1 | 1/2008 | Dohta | |
| 2008/0030458 A1 | 2/2008 | Helbing et al. | |
| 2008/0039202 A1 | 2/2008 | Sawano et al. | |
| 2008/0100995 A1 | 5/2008 | Ryder et al. | |
| 2008/0150911 A1 | 6/2008 | Harrison | |
| 2008/0220867 A1 | 9/2008 | Zalewski et al. | |
| 2008/0300055 A1 | 12/2008 | Lutnick et al. | |
| 2009/0082107 A1 | 3/2009 | Tahara et al. | |
| 2009/0143140 A1 | 6/2009 | Kitahara | |
| 2009/0183193 A1 | 7/2009 | Miller, IV | |
| 2009/0219677 A1 | 9/2009 | Mori et al. | |
| 2009/0225159 A1 | 9/2009 | Schneider et al. | |
| 2009/0254953 A1 | 10/2009 | Lin | |
| 2009/0256809 A1 | 10/2009 | Minor | |
| 2009/0280910 A1 | 11/2009 | Gagner et al. | |
| 2009/0322671 A1 | 12/2009 | Scott et al. | |
| 2009/0322679 A1 | 12/2009 | Sato et al. | |
| 2010/0007926 A1 | 1/2010 | Imaizumi et al. | |
| 2010/0045666 A1 | 2/2010 | Kornmann et al. | |
| 2010/0083341 A1 | 4/2010 | Gonzalez | |
| 2010/0149095 A1 | 6/2010 | Hwang | |
| 2010/0156824 A1 | 6/2010 | Paleczny et al. | |
| 2011/0021274 A1 | 1/2011 | Sato et al. | |
| 2011/0190049 A1 | 8/2011 | Mae et al. | |
| 2011/0190050 A1 | 8/2011 | Mae et al. | |
| 2011/0190052 A1 | 8/2011 | Takeda et al. | |
| 2011/0190061 A1 | 8/2011 | Takeda et al. | |
| 2011/0195785 A1 | 8/2011 | Ashida et al. | |
| 2011/0285704 A1 | 11/2011 | Takeda et al. | |
| 2011/0287842 A1 | 11/2011 | Yamada et al. | |
| 2011/0295553 A1 | 12/2011 | Sato | |
| 2012/0001048 A1 | 1/2012 | Takahashi et al. | |
| 2012/0015732 A1 | 1/2012 | Takeda et al. | |
| 2012/0026166 A1 | 2/2012 | Takeda et al. | |
| 2012/0040759 A1 | 2/2012 | Ito et al. | |
| 2012/0044177 A1 | 2/2012 | Ohta et al. | |
| 2012/0046106 A1 | 2/2012 | Ito et al. | |
| 2012/0052952 A1 | 3/2012 | Nishida et al. | |
| 2012/0052959 A1 | 3/2012 | Nishida et al. | |
| 2012/0062445 A1* | 3/2012 | Haddick et al. | 345/8 |
| 2012/0068927 A1 | 3/2012 | Poston et al. | |
| 2012/0086631 A1 | 4/2012 | Osman et al. | |
| 2012/0088580 A1 | 4/2012 | Takeda et al. | |
| 2012/0106041 A1 | 5/2012 | Ashida et al. | |
| 2012/0106042 A1 | 5/2012 | Ashida et al. | |
| 2012/0108329 A1 | 5/2012 | Ashida et al. | |
| 2012/0108340 A1 | 5/2012 | Ashida et al. | |
| 2012/0119992 A1 | 5/2012 | Nishida et al. | |
| 2012/0258796 A1 | 10/2012 | Ohta et al. | |
| 2012/0270651 A1 | 10/2012 | Takeda et al. | |
| 2013/0063350 A1 | 3/2013 | Takeda et al. | |
| 2013/0109477 A1 | 5/2013 | Ito et al. | |

FOREIGN PATENT DOCUMENTS

| | | | | |
|---|---|---|---|---|
| CN | 202270340 U | | 6/2012 | |
| CN | 202355827 | | 8/2012 | |
| CN | 202355828 | | 8/2012 | |
| CN | 202355829 | | 8/2012 | |
| EP | 0 710 017 | | 5/1996 | |
| EP | 0 835 676 | | 4/1998 | |
| EP | 1 469 382 | | 10/2004 | |
| EP | 1 723 992 | | 11/2006 | |
| EP | 2 158 947 | | 3/2010 | |
| FR | 2 932 998 | | 1/2010 | |
| GB | WO2007128949 | * | 2/2007 | A63F 13/10 |
| JP | 09-294260 | | 11/1997 | |
| JP | 10-341388 | | 12/1998 | |
| JP | 2000-222185 | | 8/2000 | |
| JP | 2002-248267 | | 9/2002 | |
| JP | 2004-032548 | | 1/2004 | |
| JP | 3703473 | | 2/2005 | |
| JP | 2005-269399 | | 9/2005 | |
| JP | 3770499 | | 2/2006 | |
| JP | 3797608 | | 7/2006 | |
| JP | 2006-350986 | | 12/2006 | |
| JP | 2007-061271 | | 3/2007 | |
| JP | 2007-075353 | | 3/2007 | |
| JP | 2007-075751 | | 3/2007 | |
| JP | 2007-289413 | | 11/2007 | |
| JP | 2008-264402 | | 11/2008 | |
| JP | 2010-017412 | | 1/2009 | |
| JP | 2009-178363 | | 8/2009 | |
| JP | 2009-247763 | | 10/2009 | |
| JP | 4601925 | | 12/2010 | |
| TW | M278452 | | 10/2005 | |
| TW | 419388 | | 1/2011 | |
| WO | 03/007117 | | 1/2003 | |
| WO | 03/083822 | | 10/2003 | |
| WO | 2007/128949 | | 11/2007 | |
| WO | 2007-143632 | | 12/2007 | |
| WO | 2008/136064 | | 11/2008 | |
| WO | 2009/038596 | | 3/2009 | |

OTHER PUBLICATIONS

Sony's New 3D OLED Headset / VR Goggles Uploaded by TheWaffleUniverse Jan. 8, 2011 http://www.youtube.com/watch?v=UoE5ij63EDI.*

TrackIR 5—review Uploaded by arnycracker8 Jan. 27, 2011 http://www.youtube.com/watch?v=EXMXvAuBzo4.*

IGN Staff, "PS3 Games on PSP?", URL: http://www.ign.com/articles/2006/10/25/ps3-games-on-psp, Publication date printed on article: Oct. 2006.

Marcusita, "What Benefits Can I Get Out of My PSP on My PS3", URL: http://web.archive.org/web/20080824222755/http://forums.afterdawn.com/thread_view.cfm/600615, Publication date printed on article: Dec. 15, 2007.

Rob Aspin et al., "Augmenting the CAVE: An initial study into close focused, inward looking, exploration in IPT systems," 11th IEE International Symposium Distributed Simulation and Real-Time Applications, pp. 217-224 (Oct. 1, 2007).

(56) References Cited

OTHER PUBLICATIONS

D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al., "Virtual Reality for Palmtop Computers," ACM Transactions on Information Systems, ACM, New York, NY, vol. 11, No. 3, pp. 197-218 (Jul. 1, 1993).
Johan Sanneblad et al., "Ubiquitous graphics," Proceedings of the Working Conference on Advanced Visual Interfaces, AVI '06, pp. 373-377 (Oct. 1, 2006).
English-language machine translation for JP 2002-248267.
English-language machine translation for JP 2007-075751.
English-language machine translation for JP 2008-264402.
Apple Support, "iPhone—Technical Specifications", http://support.apple.com/kb/SP2, 2010. 3 pages.
English-language machine translation for JP 2009-178363.
English-language machine translation for JP 2009-247763.
English-language machine translation for JP 09-294260.
English-language machine translation for JP 2004-032548.
English-language machine translation for JP 4601925.
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Takeda et al., U.S. Appl. No. 13/145,690, filed Dec. 19, 2011.
Taekda et al., U.S. Appl. No. 13/153,106, filed Jun. 3, 2011.
Ito et al., U.S. Appl. No. 13/198,251, filed Aug. 4, 2011.
Ashida et al., U.S. Appl. No. 13/206,059, filed Aug. 9, 2011.
Ashida et al., U.S. Appl. No. 13/206,767, filed Aug. 10, 2011.
Ashida et al., U.S. Appl. No. 13/206,914, filed Aug. 10, 2011.
Ashida et al., U.S. Appl. No. 13/207,867, filed Aug. 11, 2011.
Nishida et al., U.S. Appl. No. 13/211,679, filed Aug. 17, 2011.
Nishida et al., U.S. Appl. No. 13/212,648, filed Aug. 18, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
PersonalApplets: "Gyro Tennis App for iPhone 4 and iPod Touch 4$^{th}$ gen" YouTube, Aug. 9, 2010, http://www.youtube.com/watch?v=c7PRFbqWKIs, 1 pages.
Jhrogersii, "Review: Gyro Tennis for iPhone", iSource, Sep. 17, 2010, http://isource.com/2010/09/17/review-gyro-tennis-for-iphone/, 10 pages.
Apple Support: "iPhone Technical Specifications", Apple, Aug. 22, 2008, URL:http://support.apple.com/kp/SP495, 2 pages.
Aug. 20, 2012 Notice of Allowance from U.S. Appl. No. 13/208,719.
Jul. 24, 2012 European Search Report for EP 11177775.1, 12 pages.
U.S. Appl. No. 13/208,719, filed Aug. 12, 2011.
U.S. Appl. No. 13/209,756, filed Aug. 15, 2011.
Xbox 360 Controller, Wikipedia, page as revised on Feb. 2, 2010 (6 pages).
Takeda et al., U.S. Appl. No. 13/019,924, filed Feb. 2, 2011—response to office action filed Feb. 10, 2014.
Takeda et al., U.S. Appl. No. 13/145,690, filed Dec. 19, 2011—RCE filed Feb. 7, 2014.
Taekda et al., U.S. Appl. No. 13/153,106, filed Jun. 3, 2011—response to office action filed Feb. 7, 2014.
Ashida et al., U.S. Appl. No. 13/206,059, filed Aug. 9, 2011—non-final office action mailed Feb. 14, 2014.
Ashida et al., U.S. Appl. No. 13/206,767, filed Aug. 10, 2011—response to office action filed Dec. 11, 2013.
Ashida et al., U.S. Appl. No. 13/207,867, filed Aug. 11, 2011—response to office action filed Jan. 6, 2014.
Ohta et al., U.S. Appl. No. 13/209,756, filed Aug. 15, 2011—non-final office action mailed Dec. 30, 2013.
Nishida et al., U.S. Appl. No. 13/211,679, filed Aug. 17, 2011—notice of appeal filed Jan. 15, 2014.
Takeda et al., U.S. Appl. No. 13/244,710, filed Sep. 26, 2011—response to office action filed Dec. 24, 2013.
Takeda et al., U.S. Appl. No. 13/541,282, filed Jul. 3, 2012—response to office action filed Dec. 13, 2013.
Takeda et al., U.S. Appl. No. 13/672,862, filed Nov. 9, 2012—non-final office action mailed Dec. 24, 2013.
Partial English-language translation of TWM278452.
Mae et al., U.S. Appl. No. 13/017,381, filed Jan. 31, 2011—now USP 8,613,672.
Mae et al., U.S. Appl. No. 13/017,527, filed Jan. 31, 2011—now USP 8,529,352.
Takeda et al., U.S. Appl. No. 13/019,924, filed Feb. 2, 2011—non-final office action mailed Oct. 8, 2013.
Takeda et al., U.S. Appl. No. 13/019,928, filed Feb. 2, 2011—now USP 8,317,615.
Takeda et al., U.S. Appl. No. 13/145,690, filed Dec. 19, 2011—allowed.
Taekda et al., U.S. Appl. No. 13/153,106, filed Jun. 3, 2011—non-final office action mailed Oct. 10, 2013.
Ito et al., U.S. Appl. No. 13/198,251, filed Aug. 4, 2011—awaiting USPTO action.
Ashida et al., U.S. Appl. No. 13/206,059, filed Aug. 9, 2011—awaiting USPTO action.
Ashida et al., U.S. Appl. No. 13/206,767, filed Aug. 10, 2011—Quayle action mailed Nov. 14, 2013.
Ashida et al., U.S. Appl. No. 13/206,914, filed Aug. 10, 2011—allowed.
Ashida et al., U.S. Appl. No. 13/207,867, filed Aug. 11, 2011—non-final office action mailed Oct. 7, 2013.
Ito et al., U.S. Appl. No. 13/208,719, filed Aug. 12, 2011—now USP 8,337,308.
Ohta et al., U.S. Appl. No. 13/209,756, filed Aug. 15, 2011—awaiting USPTO action.
Nishida et al., U.S. Appl. No. 13/211,679, filed Aug. 17, 2011—final office action mailed Oct. 15, 2013.
Nishida et al., U.S. Appl. No. 13/212,648, filed Aug. 18, 2011—final office action mailed Dec. 2, 2013.
Takeda et al., U.S. Appl. No. 13/244,710, filed Sep. 26, 2011—non-final office action mailed Sep. 24, 2013.
Takeda et al., U.S. Appl. No. 13/541,282, filed Jul. 3, 2012—non-final office action mailed Sep. 13, 2013.
Takeda et al., U.S. Appl. No. 13/672,862, filed Nov. 9, 2012—awaiting USPTO action.
Ito et al., U.S. Appl. No. 13/687,057, filed Nov. 28, 2012—allowed.

* cited by examiner

INPUT SYSTEM, INFORMATION PROCESSING DEVICE, STORAGE MEDIUM STORING INFORMATION PROCESSING PROGRAM, AND THREE-DIMENSIONAL POSITION CALCULATION METHOD

CROSS REFERENCE TO RELATED APPLICATIONS

The disclosure of Japanese Patent Application No. 2011-085214 filed on Apr. 7, 2011, is incorporated herein by reference.

FIELD

The present specification discloses an input system, an information processing device, a storage medium storing an information processing program, and a three-dimensional position calculation method for calculating a three-dimensional position based on operations on a controller device, or the like.

BACKGROUND AND SUMMARY

There are conventional techniques with which an input is made at an arbitrary position on the screen using an input device such as a touch panel or a touch pad. For example, in a game device including a touch panel of a conventional technique, the movement of a character in a game space is controlled based on a trace drawn by inputs on the touch panel. Then, a player can perform game operations while freely specifying a position in the game space on a two-dimensional plane.

With the conventional technique, it was possible to specify a position on a two-dimensional plane by using an input device such as a touch panel, but it was difficult to specify a position in a three-dimensional space. For example, with the conventional technique, it is possible to specify an arbitrary position in a game space if the game space is a two-dimensional plane, but it is not possible to properly specify a position in a game space if it is a three-dimensional game space.

Therefore, the present specification discloses an input system, etc., with which it is possible to easily specify a position in a three-dimensional space based on an input on a planar input surface such as a touch panel or a touch pad.

(1)

An example input system described in the present specification includes a controller device and an information processing device for calculating a position in a three-dimensional virtual space based on an operation performed on the controller device.

The controller device includes a position detection unit, an inertia sensor unit, and an operation data transmission unit. The position detection unit detects an input position on a predetermined input surface. The operation data transmission unit transmits, to the information processing device, operation data including data representing detection results of the position detection unit and the inertia sensor unit.

The information processing device includes an attitude calculation unit, a surface setting unit, a first image generation unit, a first image outputting unit, and a position calculation unit. The attitude calculation unit calculates an attitude of the controller device based on the detection result of the inertia sensor unit. The surface setting unit sets a predetermined surface in the virtual space so that an attitude of the predetermined surface changes in accordance with the attitude of the controller device. The first image generation unit generates a first image which represents an area in the virtual space including a position of the surface. The first image outputting unit outputs the first image to a predetermined display device. The position calculation unit calculates, as the position in the virtual space, the position of the surface determined by the input position.

The "controller device" is not limited to the terminal device 7 of the embodiment to be described below, but may be any device that includes a position detection unit and an inertia sensor unit and that has a function of transmitting operation data to an information processing device.

The "information processing device" may be any device capable of performing processes of the various units. The information processing device may be a single-purpose information processing device for games, or a general-purpose information processing device such as an ordinary personal computer.

The "input system" may be any system that includes a controller device and an information processing device, and may or may not include the "predetermined display device" for displaying the first image. That is, the input system may be provided in a form where it includes the predetermined display device or in a form where it does not include the predetermined display device.

The "position detection unit" is not limited to a touch panel of the embodiment to be described below, but may be a touch pad. That is, it is not necessary for the controller device to include a display screen.

The "inertia sensor unit" may be any unit that includes any inertia sensor such as an acceleration sensor or a gyrosensor.

The "predetermined surface" may be a flat surface or a curved surface. The "predetermined surface" does not have to be displayed on the predetermined display device. That is, the "first image" may be any image representing an area in the virtual space including the position of the surface, and does not have to include an image of the predetermined surface.

With the configuration (1) above, the user can specify a position on the surface in the virtual space through an input on the input surface of the controller device. Since the attitude of this surface changes in accordance with the attitude of the controller device, the user can specify a position in a three-dimensional virtual space by specifying a position on the input surface while changing the attitude of the controller device. Thus, with the configuration (1) above, it is possible to easily specify a position in a three-dimensional space based on an input on a planar input surface such as a touch panel or a touch pad.

(2)

The first image generation unit may generate a predetermined image at a position on the first image corresponding to the position calculated by the position calculation unit.

With the configuration (2) above, the user can easily check a position in the virtual space calculated in accordance with an input on the input surface. It is also possible to draw a three-dimensional shape in the virtual space by drawing dots and lines on the input surface.

(3)

The first image generation unit may generate, as the predetermined image, an image representing a path extending through a series of positions which are determined in the virtual space by a series of input positions on the input surface.

The "series of input positions on the input surface" is a set of input positions that are detected one after another while the user stayed in contact with the input surface, and is for example a plurality of input positions along a line (path) that is drawn on the input surface.

With the configuration (3) above, when the user draws a line on the input surface, an image of the line (path) is displayed in the virtual space. Then, different images are displayed when dots are inputted on the input surface and when lines are inputted on the input surface, and it is therefore possible to display an image that more accurately reflects inputs made on the input surface. The user can easily generate a three-dimensional shape made up of lines in the virtual space by drawing lines on the input surface.

(4)

The information processing device may further include an object setting unit for arranging a predetermined object at the position calculated by the position calculation unit.

With the configuration (4) above, by arranging an object in the virtual space, it is possible to easily generate an image representing a position in the virtual space calculated in accordance with an input on the input surface.

(5)

The object setting unit may move the predetermined object based on an operation performed on the controller device.

To "move" is a concept including to translate, to move in an arc (to change the position while rotating), and to rotate (to change the attitude without changing the position).

With the configuration (5) above, by moving around the object generated by inputs made on the input surface, the player can view the object displayed on the predetermined display device from various positions and various directions so as to easily check the shape of the object.

(6)

The object setting unit may move the predetermined object based on the attitude of the controller device if a predetermined condition is satisfied for the operation performed on the controller device, and may not move the predetermined object based on the attitude of the controller device if the predetermined condition is not satisfied.

The "predetermined condition" may be any condition as long as it is a condition related to an operation performed on the controller device. For example, the condition may be considered satisfied when a predetermined operation is performed on the controller device, or may be considered satisfied from when a certain operation is performed on the controller device until a next operation is performed.

With the configuration (6) above, the user can move the object by an intuitive and easy operation of changing the attitude of the controller device. Moreover, if the configuration (6) above is combined with any of the configurations (10) to (12), it is possible to move the object by the same operation as the operation of moving the surface, and it is therefore possible to further improve the controllability.

(7)

The controller device may further include a display unit. Then, the position detection unit is a touch panel provided on a display screen of the display unit. The information processing device may further include a second image generation unit and a second image transmitting unit. The second image generation unit generates a second image which represents an area in the virtual space including a position of the surface. The second image transmitting unit transmits the second image to the controller device. The position calculation unit calculates, as the position in the virtual space, a position corresponding to the input position on the display screen.

With the configuration (7) above, a touch panel is provided on the display screen of the controller device, and an image representing an area in the virtual space in which the surface is set is displayed on the display screen of the controller device. Then, the position calculated by the position calculation unit is a position that is actually specified by the user on the display screen, and the user can therefore specify a position in the virtual space by an intuitive and easy-to-understand operation.

(8)

The second image generation unit may generate, as the second image, an image representing an area in the virtual space in which the surface is set.

With the configuration (8) above, since an image of the position of the surface in the virtual space is displayed on the controller device, it is easier for the user to perform an operation of specifying a position on the surface by an input on the input surface.

(9)

The first image generation unit may generate the first image using a first virtual camera whose viewing direction is set independently of the attitude of the surface. Then, the second image generation unit generates the second image using a second virtual camera whose viewing direction is set to be generally perpendicular to the surface.

The "first virtual camera" may be any virtual camera as long as the viewing direction thereof is set independently of the attitude of the surface, and the viewing direction thereof may change in response to conditions other than the attitude of the surface (e.g., in response to an operation by the user).

With the configuration (9) above, if the player changes the attitude of the surface by changing the attitude of the controller device, the viewing direction does not change in the image displayed on the predetermined display device, whereas the viewing direction changes in accordance with the attitude of the controller device in the image displayed on the controller device. Then, since the attitude of the surface is constant on the display on the controller device, the operation of specifying a position on the surface is made easier. Since the attitude of the surface changes on the display of the predetermined display device, it is possible to easily grasp the attitude of the surface in the virtual space. As described above, with the configuration (9) above, the user can easily perform the operation of specifying a position on the surface using the controller device, and easily check the attitude of the surface by looking at the screen of the predetermined display device, thereby making it easier to perform the operation of specifying a position in a three-dimensional virtual space.

(10)

The surface setting unit may control the attitude of the surface so that the attitude of the surface corresponds to the attitude of the controller device.

With the configuration (10) above, the user can intuitively and easily adjust the attitude of the surface by the operation of changing the attitude of the controller device.

(11)

The surface setting unit may control the attitude of the surface so that the attitude of the surface corresponds to the attitude of the controller device, and control a position of the surface in accordance with the attitude of the controller device.

With the configuration (11) above, the user can intuitively and easily adjust the attitude of the surface by an operation of changing the attitude of the controller device, and also adjust the position of the surface.

(12)

The surface setting unit may control the surface so that the surface moves in an arc about a predetermined position in the virtual space in accordance with the attitude of the controller device.

With the configuration (12) above, the surface moves along a spherical surface about the predetermined position as the center. Therefore, the user can feel as if the user were specifying a position on a spherical surface by making inputs on the input surface while changing the attitude of the controller device.

(13)

The surface setting unit may move the surface based on a direction input operation performed on the controller device.

With the configuration (13) above, the user can move the surface also by a different direction input operation other than the operation of changing the attitude of the controller device, thereby allowing the user to more freely perform the operation of moving the surface.

(14)

The information processing device may further include a game process unit for performing a predetermined game process using, as an input, the position calculated by the position calculation unit.

With the configuration (14) above, the user can play the game by a novel game operation of specifying a position on the input surface while changing the attitude of the controller device. It is also possible, with this game operation, to easily specify a position in a three-dimensional game space.

(15)

An example information processing system described in the present specification calculates a position in a three-dimensional virtual space based on an operation performed on an operation unit. The information processing system includes a position detection unit, a sensor unit, an operation data obtaining unit, an attitude calculation unit, a surface setting unit, a first image generation unit, a first image outputting unit, and a position calculation unit. The position detection unit detects an input position on a predetermined input surface provided on the operation unit. The sensor unit detects a physical quantity used for calculating an attitude of the operation unit. The operation data obtaining unit obtains operation data including data representing detection results of the position detection unit and the sensor unit. The attitude calculation unit calculates an attitude of the controller device based on the physical quantity. The surface setting unit sets a predetermined surface in the virtual space based on the attitude. The first image generation unit generates a first image which represents an area in the virtual space including a position of the surface. The first image outputting unit outputs the first image to a predetermined display device. The position calculation unit calculates, as the position in the virtual space, a position on the surface determined by the input position.

The "operation unit" is not limited to the terminal device 7 of the embodiment to be described below, but may be any device as long as the predetermined input surface can be provided thereon.

The "physical quantity used for calculating an attitude" may be any physical quantity as long as the attitude of the operation unit can be calculated (estimated) based on the physical quantity. Thus, a sensor unit for detecting such a physical quantity may be an inertia sensor such as a gyrosensor or an acceleration sensor as in the embodiment to be described below, as well as a magnetic sensor or a camera. Where the sensor unit is a magnetic sensor, the physical quantity is the azimuthal direction information detected by the magnetic sensor. Where the sensor unit is a camera, the physical quantity is the values regarding the captured image (e.g., pixel values) or the values obtained from the image (e.g., position coordinates of a predetermined image-capturing object in the captured image).

With the configuration (15) above, the user can specify a position on the surface in the virtual space by an input on the input surface of the operation unit. Since the attitude of the surface changes in accordance with the attitude of the controller device, the user can specify a position in a three-dimensional virtual space by specifying a position on the input surface while changing the attitude of the operation unit. Thus, with the configuration (15) above, it is possible to easily specify a position in a three-dimensional space based on an input on a planar input surface such as a touch panel or a touch pad, as with the configuration (1) above.

The present specification also discloses an example information processing device included in the input system, and an example computer-readable non-transitory storage medium storing an information processing program for causing a computer to function as units equivalent to various units of the information processing device (which may not include an image outputting unit). The present specification also discloses a three-dimensional position calculation method to be carried out by the information processing system or the information processing device.

With the input system, the information processing device, the storage medium and the three-dimensional position calculation method set forth above, it is possible to calculate a position on the surface in the virtual space based on an input on the input surface of the controller device and to control the attitude of the surface in accordance with the attitude of the controller device, thereby allowing the user to easily perform the operation of specifying a three-dimensional position based on an input made on a planar input surface such as a touch panel or a touch pad.

These and other features, aspects and advantages will become more apparent from the following detailed description when taken in conjunction with the accompanying drawings.

DETAILED DESCRIPTION OF NON-LIMITING EXAMPLE EMBODIMENTS

1. General Configuration of Game System

Figure 1:
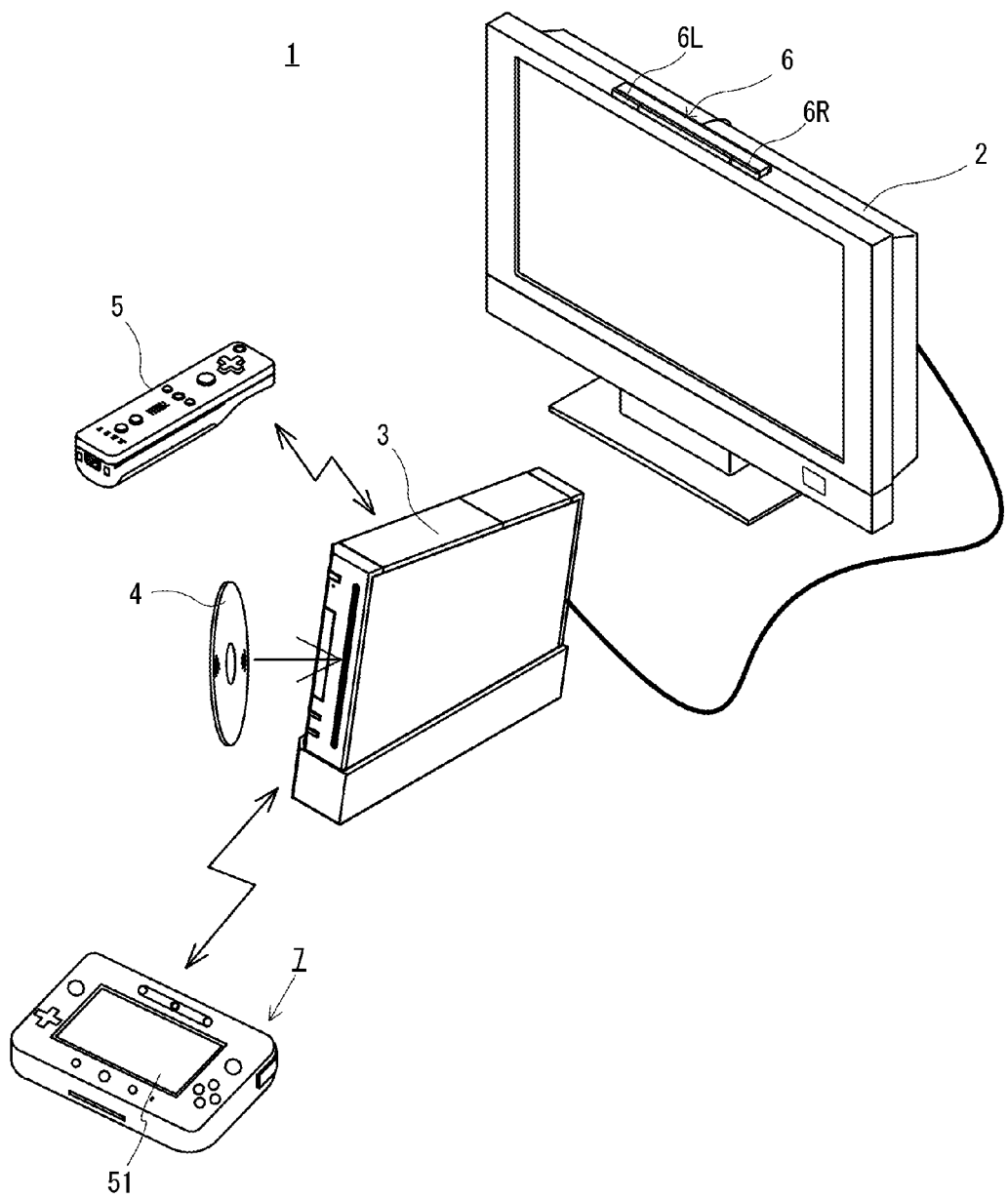
FIG. 1 is an external view of an example non-limiting game system.

An example non-limiting game system 1 of the present embodiment will now be described with reference to the drawings. FIG. 1 is an external view of the game system 1. In FIG. 1, a game system 1 includes a non-portable display device (hereinafter referred to as a "television") 2 such as a television receiver, a home-console type game device 3, an optical disc 4, a controller 5, a marker device 6, and a terminal device 7. In the game system 1, the game device 3 performs game processes based on game operations performed using the controller 5 and the terminal device 7, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and a speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and a marker device 6 is used by the game device 3 for calculating the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits an infrared light in a forward direction of the television 2. The marker device 6 is connected to the game device 3, and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, Bluetooth (Registered Trademark) technology. In other embodiments, the controller 5 and the game device 3 may be connected by a wired connection. While only one controller 5 is included in the game system 1 in the present embodiment, the game device 3 can communicate with a plurality of controllers, and a game can be played by multiple players by using a predetermined number of controllers at the same time. The detailed configuration of the controller 5 will be described below.

The terminal device 7 is sized so that it can be held in one or both of the user's hands, and the user can hold and move the terminal device 7, or can use a terminal device 7 placed at an arbitrary position. The terminal device 7, whose detailed configuration will be described below, includes an LCD (Liquid Crystal Display) 51 as a display, input units (e.g., a touch panel 52, a gyrosensor 64, etc., to be described later). The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the embodiment, the terminal device 7 may include any other display device such as a display device utilizing EL (Electra Luminescence), for example. The terminal device 7 transmits operation data representing the content of operations performed on the terminal device itself to the game device 3.

2. Internal Configuration of Game Device 3

Figure 2:
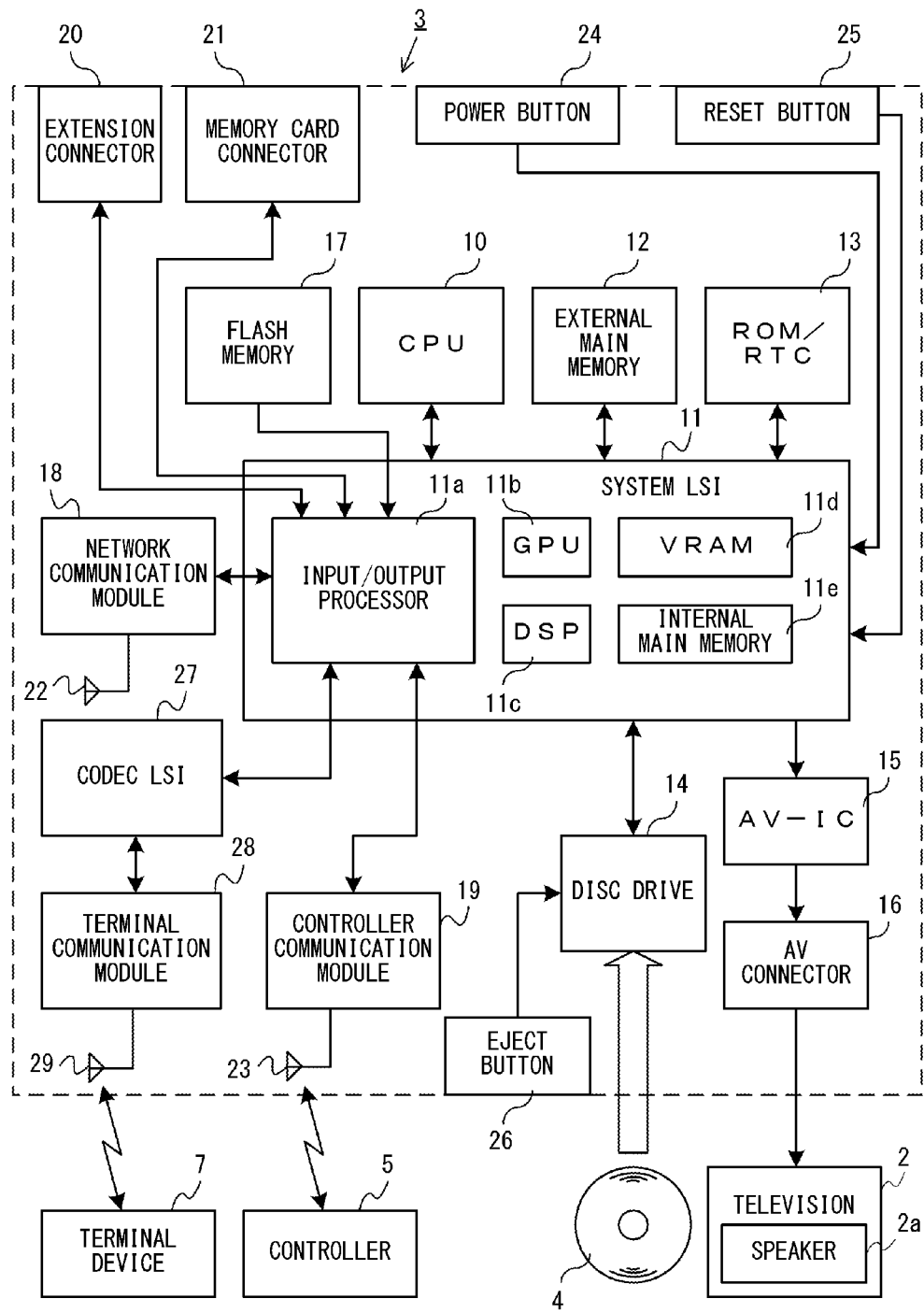
FIG. 2 is a block diagram showing an internal configuration of an example non-limiting game device.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, a VRAM (Video RAM) 11d, and the internal main memory 11e. Although not shown in the figures, these components 11a to 11e are connected with each other through an internal bus.

The GPU 11b, acting as a part of a rendering unit, generates images in accordance with graphics commands (rendering commands) from the CPU 10. The VRAM 11d stores data (data such as polygon data and texture data) used for the GPU 11b to execute the graphics commands. When images are generated, the GPU 11b generates image data using data stored in the VRAM 11d. The game device 3 generates both images displayed on the television 2 and images displayed on the terminal device 7. Hereinafter, the images displayed on the television 2 may be referred to as the "television images", and the images displayed on the terminal device 7 may be referred to as the "terminal images".

The DSP 11c, functioning as an audio processor, generates sound data using sound data and sound waveform (e.g., tone quality) data stored in one or both of the internal main memory 11e and the external main memory 12. In the present embodiment, as with the game images, game sounds to be outputted from the speaker of the television 2 and game sounds to be outputted from the speaker of the terminal device 7 are both generated. Hereinafter, the sounds outputted from the television 2 may be referred to as "television sounds", and the sounds outputted from the terminal device 7 may be referred to as "terminal sounds".

As described above, of the images and sounds generated in the game device 3, data of the images and sounds outputted from the television 2 is read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a. While the connection scheme between the game device 3 and the television 2 may be any scheme, the game device 3 may transmit control commands for controlling the television 2 to the television 2 via a wired connection or a wireless connection. For example, an HDMI (High-Definition Multimedia Interface) cable in conformity with the HDMI standard may be used. In the HDMI standard, it is possible to control the connected device by a function called CEC (Consumer Electronics Control). Thus, in a case in which the game device 3 can control the television 2, as when an HDMI cable is used, the game device 3 can turn ON the power of the television 2 or switch the input of the television 2 from one to another at any point in time.

Of the images and sounds generated in the game device 3, data of the images and sounds outputted from the terminal device 7 are transmitted to the terminal device 7 by an input/output processor 11a, etc. The data transmission to the terminal device 7 by the input/output processor 11a, or the like, will be described below.

The input/output processor 11a exchanges data with components connected thereto, and downloads data from an external device(s). The input/output processor 11a is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11a can be connected to a network such as the Internet via the network communication module 18 and the antenna 22 and can communicate with other device(s) connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna 23 and the controller communication module 19, and stores (temporarily) it in a buffer area of the internal main memory 11e or the external main memory 12.

The game device 3 can exchange data such as images and sounds with the terminal device 7. When transmitting game images (terminal game images) to the terminal device 7, the input/output processor 11a outputs data of game images generated by the GPU 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in the images displayed in the game. Therefore, delay may be eliminated as much as possible for the transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it may be a scheme with a high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and represents, for example, an instruction for controlling the lighting of a marker unit (a marker unit 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. While the codec LSI 27 does not perform a data compression process in the present embodiment for the control data, it may perform a compression process in other embodiments. The above-described data transmitted from the game device 3 to the terminal device 7 may be encrypted as necessary or may not be encrypted.

The game device 3 can receive various data from the terminal device 7. In the present embodiment, the terminal device 7 transmits operation data, image data and sound data, the details of which will be described below. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. After being received by the terminal communication module 28, the operation data is outputted to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

3. Configuration of Controller 5

Figure 3:
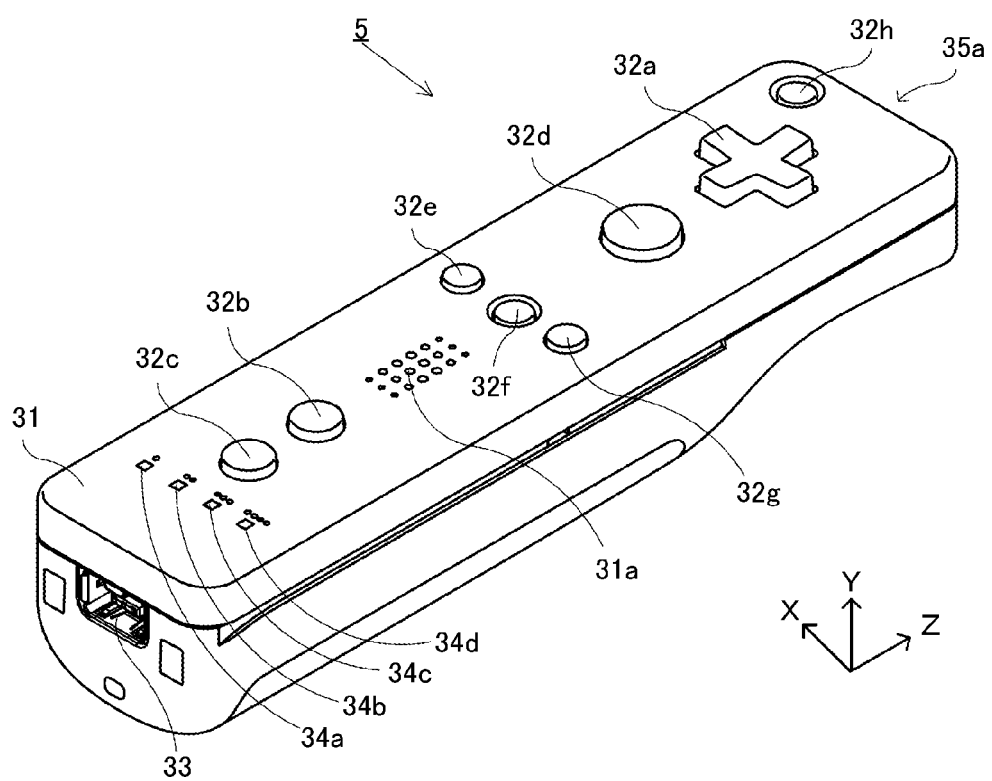
FIG. 3 is a perspective view showing an example non-limiting controller as viewed from the top rear side thereof.
Figure 4:
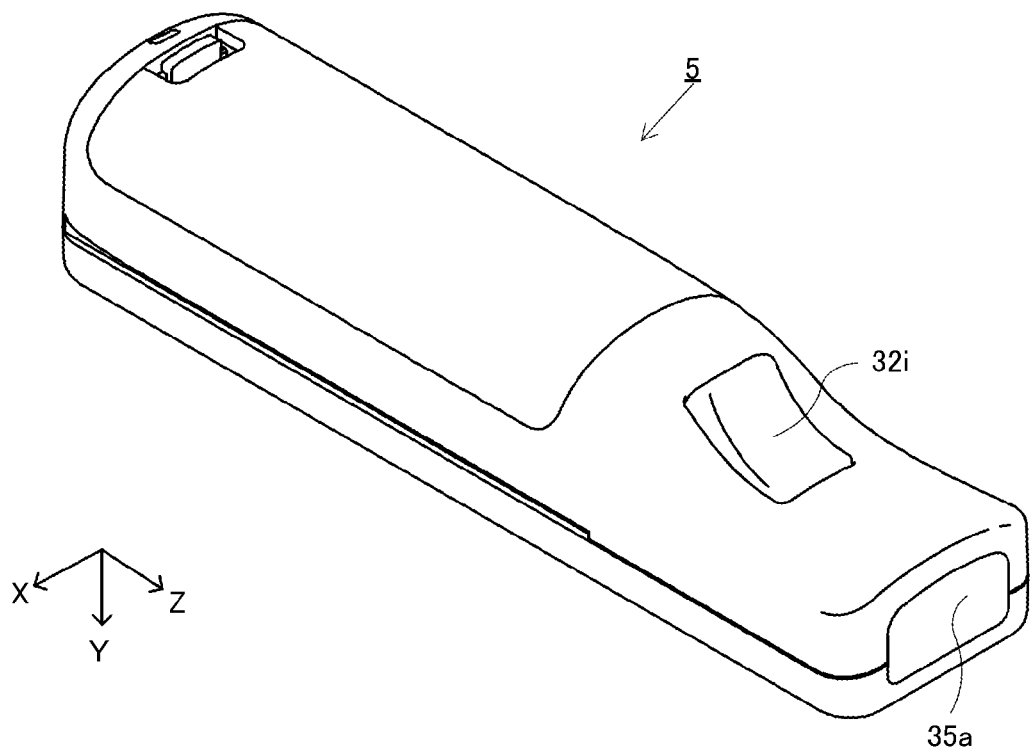
FIG. 4 is a perspective view showing the example non-limiting controller as viewed from the bottom front side thereof.

Next, with reference to FIGS. 3 to 7, the controller 5 will be described. FIGS. 3 and 4 are perspective views illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a engagement hole 33a (see FIG. 6) for preventing easy inadvertent disengagement of a device connected to the controller 5 as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing unit 35 (FIG. 6), and a light incident surface 35a of an image capturing/processing unit 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 49 (see FIG. 5) provided in the controller 5 are provided between the first button 32b and the home button 32f.

Figure 5:
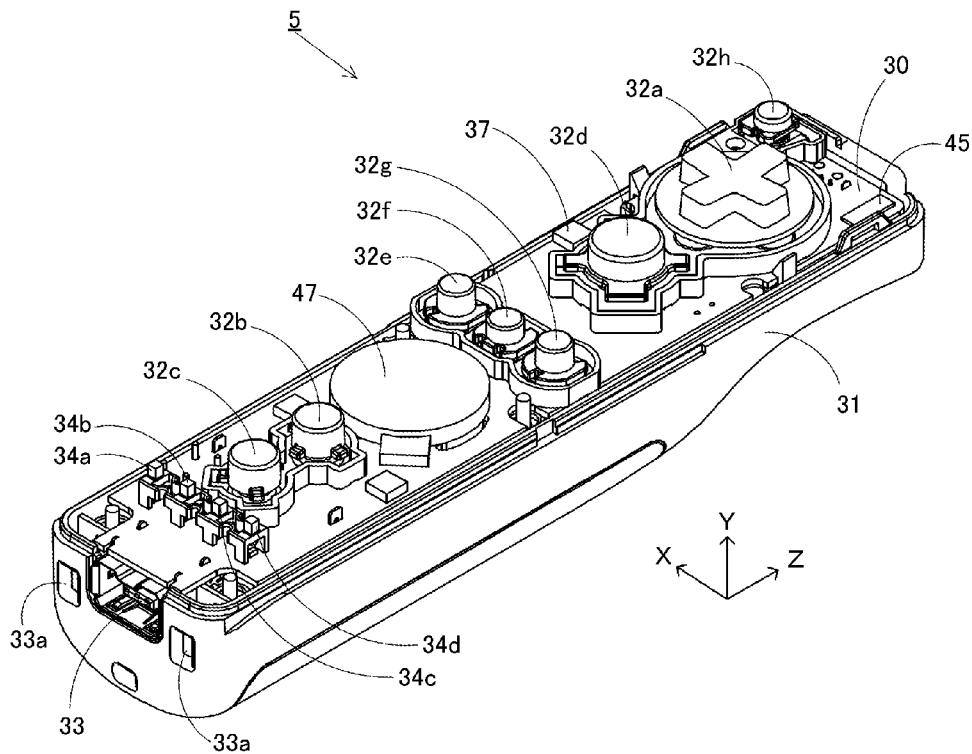
FIG. 5 is a diagram showing an internal configuration of the example non-limiting controller.
Figure 6:
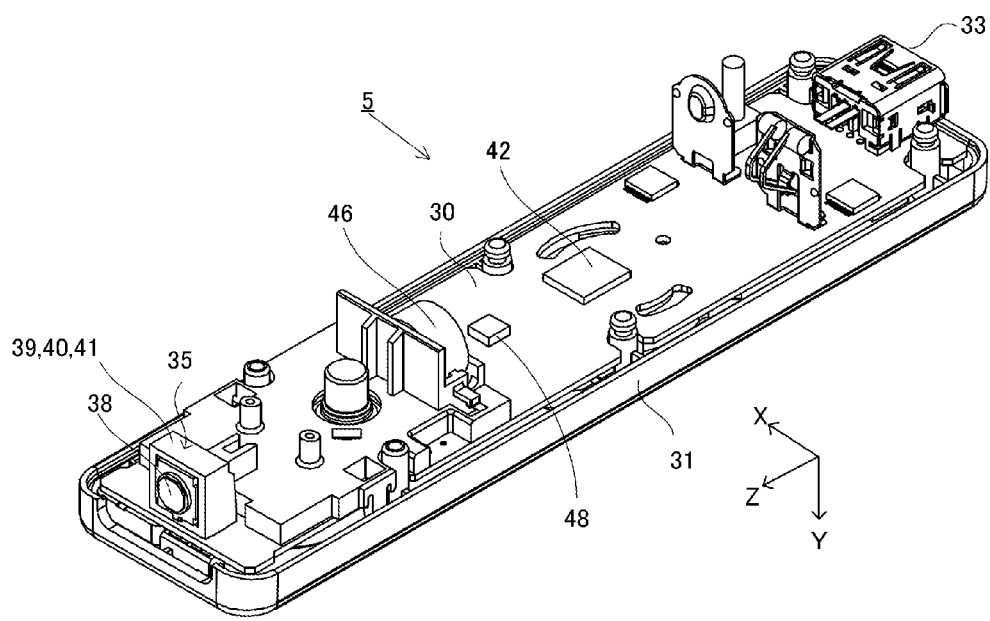
FIG. 6 is a diagram showing an internal configuration of the example non-limiting controller.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, an acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing unit 35 is provided. The image capturing/processing unit 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the systems, methods, and techniques described herein may be implemented with controllers having other shapes, numbers, and positions. Further, although in the present embodiment the image-capturing direction of the image-capturing unit is the Z-axis positive direction, the image-capturing direction may be any direction. That is, the position of the image capturing/processing unit 35 (the light incident surface 35a of the image capturing/processing unit 35) in the controller 5 may not be on the front surface of the housing 31, but may be on any other surface on which light can be received from the outside of the housing 31.

Figure 7:
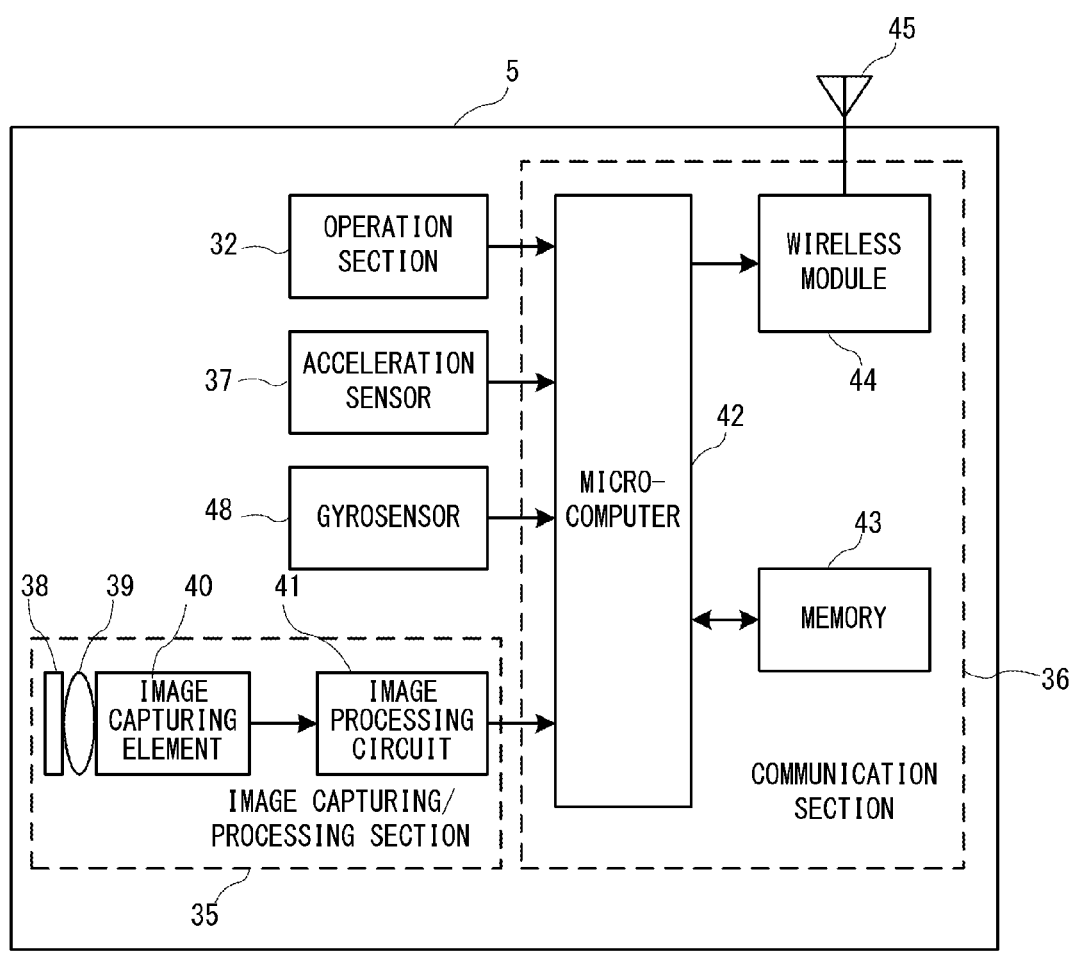
FIG. 7 is a block diagram showing a configuration of an example non-limiting controller.

FIG. 7 is a block diagram illustrating a configuration of the controller 5. The controller 5 includes an operation unit 32 (the operation buttons 32a to 32i), the image capturing/processing unit 35, a communication unit 36, the acceleration sensor 37, and a gyrosensor 48. The controller 5 transmits to the game device 3, as operation data, data representing the content of operations performed on the controller itself. Hereinafter, the operation data transmitted by the controller 5 may be referred to as the "controller operation data", and the operation data transmitted by the terminal device 7 may be referred to as the "terminal operation data".

The operation unit 32 includes the operation buttons 32a to 32i described above, and outputs, to the microcomputer 42 of the communication unit 36, operation button data indicating the input status of the operation buttons 32a to 32i (e.g., whether or not the operation buttons 32a to 32i are pressed).

The image capturing/processing unit 35 is a system for analyzing image data captured by the image-capturing element and calculating the centroid, the size, etc., of an area(s) having a high brightness in the image data. The image capturing/processing unit 35 has a maximum sampling period of, for example, about 200 frames/sec., and therefore can trace and analyze even relatively fast motion of the controller 5.

The image capturing/processing unit 35 includes the infrared filter 38, the lens 39, the image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker unit 55 of the terminal device 7 and the marker device 6 of which images are captured are formed by markers outputting infrared light. Therefore, the provision of the infrared filter 38 enables the image capturing element 40 to receive only the infrared light transmitted through the infrared filter 38 and generate image data, so that an image of the image-capturing object (e.g., the markers of a marker unit 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication unit 36. The data representing the coordinates is transmitted as operation data to the game device 3 by the microcomputer 42. Hereinafter, the coordinates are referred to as "marker coordinates". The marker coordinates change depending on the roll orientation (roll angle about the z axis) and/or the position of the controller 5 itself, and therefore the game device 3 can calculate, for example, the roll angle and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection unit of the acceleration sensor 37 in the straight line direction along the sensing axis direction, among all the acceleration applied to the detection unit of the acceleration sensor 37. For example, a multi-axis acceleration sensor having two or more axes detects acceleration components along the axes, as the acceleration applied to the detection unit of the acceleration sensor. While the acceleration sensor 37 is assumed to be an electrostatic capacitance type MEMS (Micro Electro Mechanical System) acceleration sensor, other types of acceleration sensors may be used.

In the present embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication unit 36. The acceleration detected by the acceleration sensor 37 changes depending on the orientation and the movement of the controller 5 itself, and therefore the game device 3 is capable of calculating the orientation and the movement of the controller 5 using the obtained acceleration data. In the present embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 63 to be described later). For example, in the case in which the computer performs a process on the premise that the controller 5 including the acceleration sensor 37 is in static state (that is, in the case in which the process is performed on the premise that the acceleration to be detected by the acceleration sensor includes only the gravitational acceleration), when the controller 5 is actually in static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angle (s) (or another appropriate parameter).

The gyrosensor 48 detects angular velocities about three axes (the X, Y and Z axes in the embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as a gyrosensor 48 can detect angular velocities about three axes. For example, a gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication unit 36. The gyrosensor 48 may be a gyrosensor that detects an angular velocity or velocities about one axis or two axes.

The communication unit 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation unit 32, the image capturing/processing unit 35, the acceleration sensor 37 and the gyrosensor 48 to the microcomputer 42 are temporarily stored in the memory 43. The data are transmitted as the operation data (controller operation data) to the game device 3. At the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the obtained operation data, the CPU 10 of the game device 3 performs the game process. Note that while the wireless transmission from the communication unit 36 to the controller communication module 19 is sequentially performed with a predetermined cycle, since the game process is generally performed with a cycle of 1/60 sec (as one frame period), the transmission may be performed with a cycle less than or equal to this period. The communication unit 36 of the controller 5 outputs, to the controller communication module 19 of the game device 3, the operation data at a rate of once per 1/200 sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc.

While the controller 5 does not include the display for displaying the game image in the embodiment, it may include a display for displaying, for example, an image representing the battery level, etc.

4. Configuration of Terminal Device 7

Figure 8:
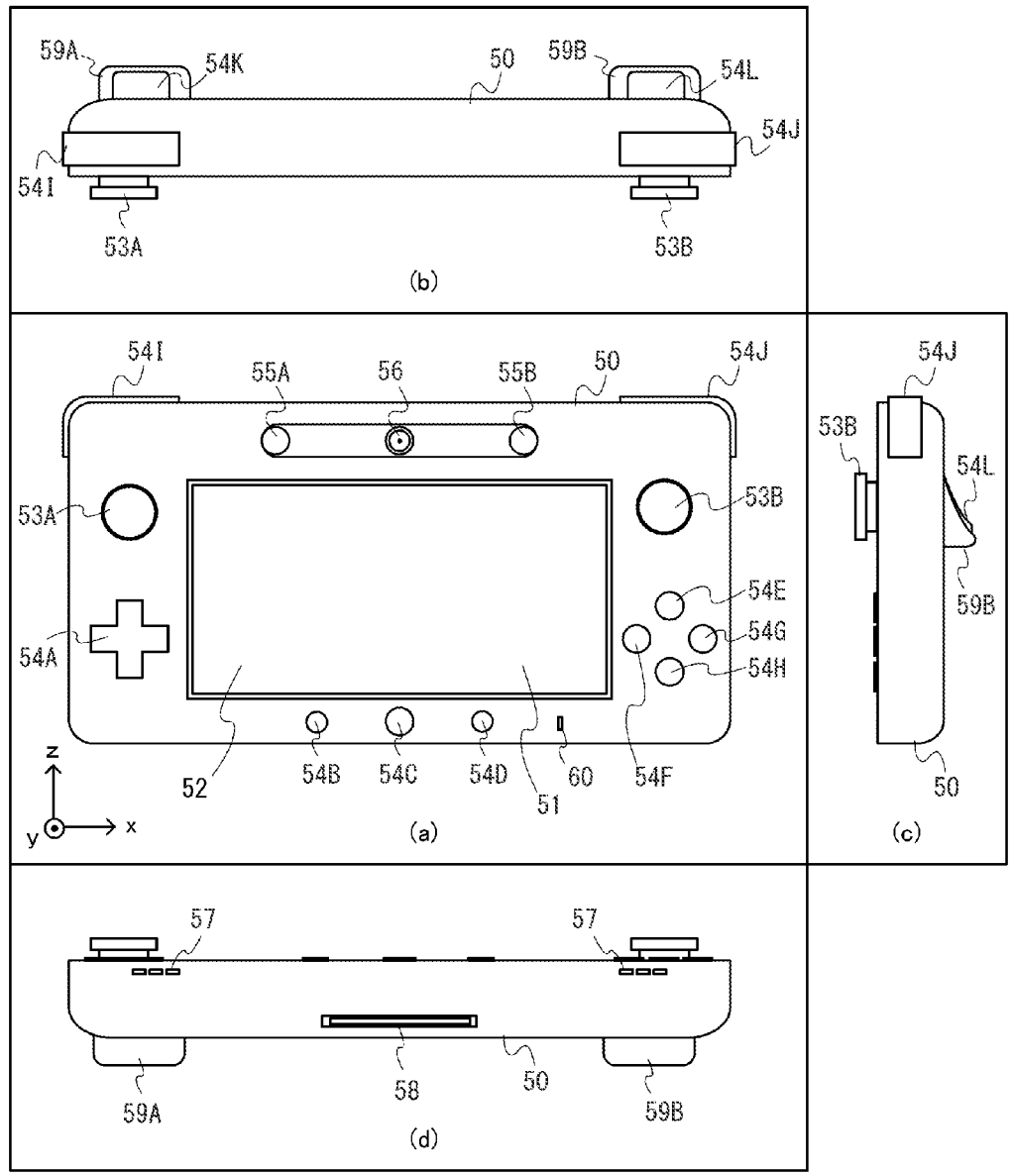
FIG. 8 is an external view of an example non-limiting terminal device.
Figure 9:
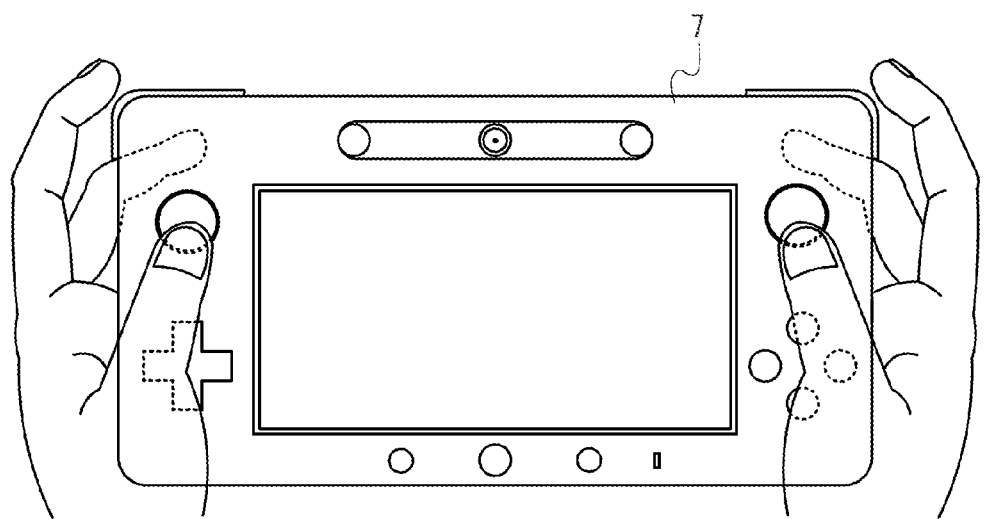
FIG. 9 is a diagram showing the example non-limiting terminal device being held by the user.
Figure 10:
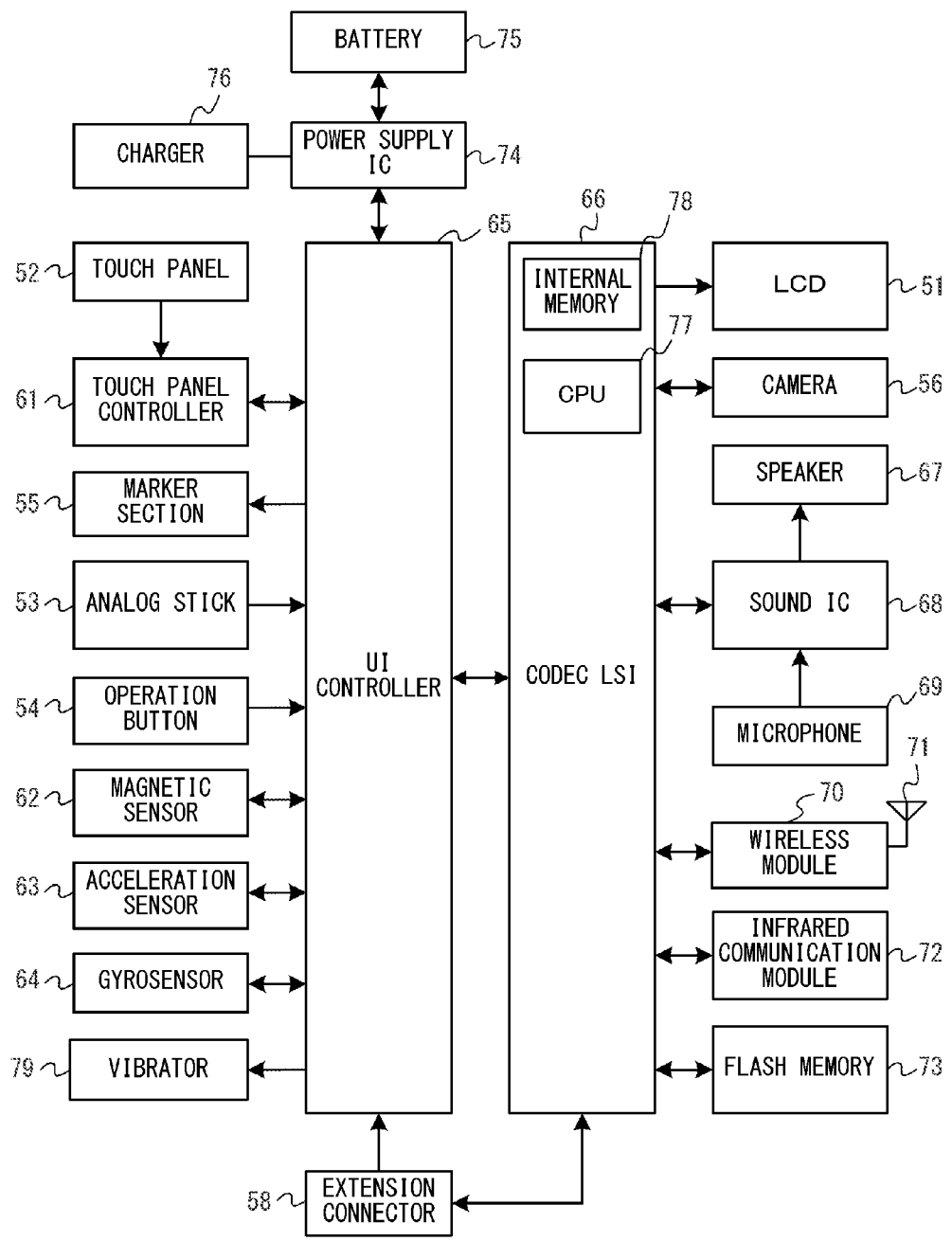
FIG. 10 is a block diagram showing an internal configuration of the example non-limiting terminal device.

Next, a configuration of the terminal device 7 will be described with reference to FIGS. 8 to 10. FIG. 8 is a diagram showing an external configuration of the terminal device 7. FIG. 8(a) is a front view of the terminal device 7, FIG. 8(b) is a top view thereof, FIG. 8(c) is a right side view thereof, and FIG. 8(d) is a bottom view thereof. FIG. 9 is a diagram showing a user holding the terminal device 7.

As shown in FIG. 8, the terminal device 7 includes a housing 50 generally in a horizontally-elongated rectangular plate shape. The housing 50 is sized so that it can be held by the user. Thus, the user can hold and move the terminal device 7, and can change the position in which the terminal device 7 is placed.

The terminal device 7 includes the LCD 51 on the surface of the housing 50. The LCD 51 is provided near the center of the surface of the housing 50. Therefore, the user can hold and move the terminal device 7 while looking at the screen of the LCD 51 by holding opposing end portions of the housing 50 with respect to the LCD 51, as shown in FIG. 9. While FIG. 9 shows an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 8(a), the terminal device 7 includes a touch panel 52 on the screen of the LCD 51 as an operation unit. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen 60 is usually used for making inputs on the touch panel 52, an input may be made on the touch panel 52 with a finger of the user, instead of using the touch pen 60. The housing 50 is provided with a hole for accommodating the touch pen used for performing operations on the touch panel 52. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons 54A to 54M, as operation units. The analog sticks 53A and 53B are each a direction-specifying device. The analog sticks 53A and 53B are each configured so that the stick portion operated with a finger of the user can be slid (or tilted) in any direction (at any angle in the up, down, left, right and diagonal directions) with respect to the surface of the housing 50. The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 9, the analog sticks 53A and 53B are provided at such positions that the user can operate them while holding the left and right portions of the terminal device 7, and therefore the user can easily operate the analog sticks 53A and 53B even when holding and moving the terminal device 7.

The buttons 54A to 54L are operation units for making predetermined inputs. As will be discussed below, the buttons 54A to 54L are provided at such positions that the user can operate them while holding the left and right portions of the terminal device 7 (see FIG. 9). Therefore, the user can easily operate these operation units even when holding and moving the terminal device 7.

As shown in FIG. 8(a), the cross button (direction-input button) 54A and the buttons 54B to 54H, of the operation buttons 54A to 54L, are provided on the front surface of the housing 50. That is, these buttons 54A to 54H are provided at positions at which they can be operated by the thumbs of the user (see FIG. 9).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify up, down, left and right directions. The buttons 54B to 54D are provided on the lower side of the LCD 51. These three buttons 54B to 54D are provided at positions at which they can be operated with either the left or the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

As shown in FIGS. 8(a), 8(b) and 8(c), a first L button 54I and a first R button 54J are provided on diagonally upper portions (the left upper portion and the right upper portion) of the housing 50. Specifically, the first L button 54I is provided at the left end of the upper side surface of the plate-like housing 50, and is exposed on the upper side surface and the left side surface. The first R button 54J is provided at the right end of the upper side surface of the housing 50, and is exposed on the upper side surface and the right side surface. Thus, the first L button 54I is provided at such a position that it can be operated with the left index finger of the user, and the first R button 54J is provided at such a position that it can be operated with the right index finger of the user (see FIG. 9).

As shown in FIGS. 8(b) and 8(c), a second L button 54K and a second R button 54L are arranged on leg portions 59A and 59B which are provided so as to project from the back surface (i.e., the surface opposite to the front surface on which the LCD 51 is provided) of the plate-like housing 50. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to generally correspond to a left analog stick 53A provided on the front surface, and the second R button 54L is provided on the reverse side so as to generally correspond to the right analog stick 53B provided on the front surface. Thus, the second L button 54K is provided at a position at which it can be operated with the left middle finger of the user, and the second R button 54L is provided at a position at which it can be operated with the right middle finger of the user (see FIG. 9). As shown in FIG. 8(c), the second L button 54K and the second R button 54L are provided on diagonally-upwardly-facing surfaces of the leg portions 59A and 59B and have diagonally-upwardly-facing button surfaces. It is believed that the middle fingers will move in the up/down direction when the user holds the terminal device 7, and it will be easier for the user to press the second L button 54K and the second R button 54L if the button surfaces are facing upward. With the provision of leg portions on the back surface of the housing 50, it is easier for the user to hold the housing 50, and with the provision of buttons on the leg portions, it is easier to operate the housing 50 while holding the housing 50.

With the terminal device 7 shown in FIG. 8, since the second L button 54K and the second R button 54L are provided on the back surface, if the terminal device 7 is put down with the screen of the LCD 51 (the front surface of the housing 50) facing up, the screen may not be completely horizontal. Therefore, in other embodiments, three or more leg portions may be formed on the back surface of the housing 50. Then, since it can be put down on the floor surface with the leg portions in contact with the floor surface in a state where the screen of the LCD 51 is facing up, the terminal device 7 can be put down so that the screen is horizontal. A removable leg portion may be added so that the terminal device 7 is put down horizontally.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc.

Although not shown, the terminal device 7 may include a button for turning ON/OFF the power of the terminal device 7. The terminal device 7 may also include a button for turning ON/OFF the screen display of the LCD 51, a button for performing a connection setting (pairing) with the game device 3, and a button for adjusting the sound volume of the speaker (the speaker 67 shown in FIG. 10).

As shown in FIG. 8(a), the terminal device 7 includes the marker unit (the marker unit 55 shown in FIG. 10) including a marker 55A and a marker 55B on the front surface of the housing 50. The marker unit 55 is provided on the upper side of the LCD 51. The marker 55A and the marker 55B are each formed by one or more infrared LEDs, as are the markers 6R and 6L of the marker device 6. The marker unit 55 is used for the game device 3 to calculate the movement, etc., of the controller 5, as is the marker device 6 described above. The game device 3 can control the lighting of the infrared LEDs of the marker unit 55.

The terminal device 7 includes a camera 56 as an image-capturing unit. The camera 56 includes an image-capturing element (e.g., a CCD image sensor, a CMOS image sensor, or the like) having a predetermined resolution, and a lens. As shown in FIG. 8, a camera 56 is provided on the front surface of the housing 50 in the present embodiment. Therefore, the camera 56 can capture an image of the face of the user holding the terminal device 7, and can capture an image of the user playing a game while looking at the LCD 51, for example.

The terminal device 7 includes a microphone (a microphone 69 shown in FIG. 10) as a sound input unit. A microphone hole 60 is provided on the front surface of the housing 50. The microphone 69 is provided inside the housing 50 behind the microphone hole 60. The microphone detects sounds around the terminal device 7 such as the voice of the user.

The terminal device 7 includes a speaker (the speaker 67 shown in FIG. 10) as a sound output unit. As shown in FIG. 8(*d*), speaker holes 57 are provided on the lower side surface of the housing 50. The output sounds from the speaker 67 are outputted from the speaker holes 57. In the present embodiment, the terminal device 7 includes two speakers, and the speaker holes 57 are provided at the respective positions of each of the left speaker and the right speaker.

The terminal device 7 includes an extension connector 58 via which another device can be connected to the terminal device 7. In the present embodiment, the extension connector 58 is provided on the lower side surface of the housing 50 as shown in FIG. 8(*d*). The other device connected to the extension connector 58 may be any device, and may be, for example, a game-specific controller (gun-shaped controller, etc.) or an input device such as a keyboard. The extension connector 58 may be omitted if there is no need to connect another device to terminal device 7.

With the terminal device 7 shown in FIG. 8, the shape of each operation button, the shape of the housing 50, the number and the positions of the components, etc., are merely illustrative, and the systems, methods, and techniques described herein may be implemented with other shapes, numbers, and positions.

Next, an internal configuration of the terminal device 7 will be described with reference to FIG. 10. FIG. 10 is a block diagram showing an internal configuration of the terminal device 7. As shown in FIG. 10, in addition to the configuration shown in FIG. 8, the terminal device 7 includes a touch panel controller 61, a magnetic sensor 62, the acceleration sensor 63, the gyrosensor 64, a user interface controller (UI controller) 65, a codec LSI 66, the speaker 67, a sound IC 68, the microphone 69, a wireless module 70, an antenna 71, an infrared communication module 72, a flash memory 73, a power supply IC 74, a battery 75, and a vibrator 79. These electronic components are mounted on an electronic circuit board and accommodated in the housing 50.

The UI controller 65 is a circuit for controlling the input/output of data to/from various types of input/output units. The UI controller 65 is connected to the touch panel controller 61, an analog stick 53 (the analog sticks 53A and 53B), an operation button 54 (the operation buttons 54A to 54L), the marker unit 55, the magnetic sensor 62, the acceleration sensor 63, the gyrosensor 64, and the vibrator 79. The UI controller 65 is connected to the codec LSI 66 and the extension connector 58. The power supply IC 74 is connected to the UI controller 65, and power is supplied to various units via the UI controller 65. The built-in battery 75 is connected to a power supply IC 74 to supply power. The charger 76 or a cable with which power can be obtained from an external power source via a connector, or the like, can be connected to the power supply IC 74, and the terminal device 7 can receive power supply from or be charged by an external power source using the charger 76 or the cable. The terminal device 7 may be charged by attaching the terminal device 7 to a cradle (not shown) having a charging function.

The touch panel controller 61 is a circuit connected to the touch panel 52 for controlling the touch panel 52. The touch panel controller 61 generates touch position data of a predetermined format based on signals from the touch panel 52, and outputs it to the UI controller 65. The touch position data represents, for example, the coordinates of a position on the input surface of the touch panel 52 at which an input is made. The touch panel controller 61 reads a signal from the touch panel 52 and generates touch position data at a rate of once per a predetermined amount of time. Various control instructions for the touch panel 52 are outputted from a UI controller 65 to the touch panel controller 61.

The analog stick 53 outputs, to the UI controller 65, stick data representing the direction and the amount of slide (or tilt) of the stick portion operated with a finger of the user. The operation button 54 outputs, to the UI controller 65, operation button data representing the input status of each of the operation buttons 54A to 54L (e.g., whether it is pressed).

The magnetic sensor 62 detects the azimuthal direction by sensing the size and direction of the magnetic field. Azimuthal direction data representing the detected azimuthal direction is outputted to the UI controller 65. Control instructions for a magnetic sensor 62 are outputted from the UI controller 65 to the magnetic sensor 62. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., a magnetic sensor 62 may be any sensor as long as it is possible to detect the azimuthal direction. Strictly speaking, in a place where there is a magnetic field other than the geomagnetic field, the obtained azimuthal direction data does not represent the azimuthal direction.

The acceleration sensor 63 is provided inside the housing 50 for detecting the magnitude of the linear acceleration along each of the directions of the three axes (the x, y and z axes shown in FIG. 8(*a*)). Specifically, an acceleration sensor 63 detects the magnitude of the linear acceleration along each of the axes, where the x axis lies in the longitudinal direction of the housing 50, the y axis lies in the direction vertical to the surface of the housing 50, and the z axis lies in the width direction of the housing 50. Acceleration data representing the detected acceleration is outputted to the UI controller 65. Control instructions for the acceleration sensor 63 are outputted from the UI controller 65 to the acceleration sensor 63. While the acceleration sensor 63 is assumed to be a capacitive-type MEMS-type acceleration sensor, for example, in the present embodiment, other types of acceleration sensors may be employed in other embodiments. The acceleration sensor 63 may be an acceleration sensor for 1-axis or 2-axis detection.

The gyrosensor 64 is provided inside the housing 50 for detecting angular velocities about the three axes, i.e., the x-axis, the y-axis and the z-axis. Angular velocity data representing the detected angular velocities is outputted to the UI controller 65. Control instructions for a gyrosensor 64 are outputted from the UI controller 65 to the gyrosensor 64. The number and combination of gyrosensors used for detecting angular velocities about three axes may be any number and combination, and the gyrosensor 64 may be formed by a 2-axis gyrosensor and a 1-axis gyrosensor, as is the gyrosensor 48. The gyrosensor 64 may be a gyrosensor for 1-axis or 2-axis detection.

The vibrator 79 is, for example, a vibration motor or a solenoid, and is connected to the UI controller 65. The terminal device 7 is vibrated by actuation of the vibrator 79 based on a command from the UI controller 65. Therefore, the vibration is conveyed to the user's hand holding the terminal device 7, and thus a so-called vibration-feedback game is realized.

The UI controller 65 outputs, to the codec LSI 66, operation data including touch position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 66 is a circuit for performing a compression process on data to be transmitted to the game device 3, and an expansion process on data transmitted from the game device 3. The LCD 51, the camera 56, the sound IC 68, the wireless module 70, the flash memory 73, and the infrared communication module 72 are connected to the codec LSI 66. The codec LSI 66 includes a CPU 77 and an internal memory 78. While the terminal device 7 does not itself perform game processes, the terminal device 7 may execute a minimal program for the management thereof and for the communication. When the terminal device 7 is started up, a program stored in the flash memory 73 is read out to the internal memory 78 and executed by the CPU 77 upon power-up. Some area of the internal memory 78 is used as the VRAM for the LCD 51.

The camera 56 captures an image in response to an instruction from the game device 3, and outputs the captured image data to the codec LSI 76. Control instructions for the camera 56, such as an image-capturing instruction, are outputted from the codec LSI 66 to the camera 56. Camera 56 can also record video. That is, the camera 56 can repeatedly capture images and repeatedly output the image data to the codec LSI 66.

The sound IC 68 is a circuit connected to the speaker 67 and the microphone 69 for controlling input/output of sound data to/from the speaker 67 and the microphone 69. That is, when sound data is received from the codec LSI 66, the sound IC 68 outputs sound signals obtained by performing D/A conversion on the sound data to the speaker 67 so that sound is outputted from the speaker 67. The microphone 69 detects sounds propagated to the terminal device 7 (the sound of the user, etc.), and outputs sound signals representing such sounds to the sound IC 68. The sound IC 68 performs A/D conversion on the sound signals from the microphone 69 to output sound data of a predetermined format to the codec LSI 66.

The infrared communication module 72 emits an infrared signal and establishes infrared communication with another device. Herein, for example, the infrared communication module 72 has a function of establishing infrared communication in conformity with the IrDA standard and a function of outputting an infrared signal for controlling the television 2.

The codec LSI 66 transmits image data from the camera 56, sound data from the microphone 69 and terminal operation data from the UI controller 65 to the game device 3 via the wireless module 70. In the present embodiment, the codec LSI 66 performs a compression process similar to that of the codec LSI 27 on the image data and the sound data. The terminal operation data and the compressed image data and sound data are outputted, as transmit data, to the wireless module 70. The antenna 71 is connected to the wireless module 70, and the wireless module 70 transmits the transmit data to the game device 3 via the antenna 71. The wireless module 70 has a similar function to that of the terminal communication module 28 of the game device 3. That is, the wireless module 70 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The codec LSI 66 may transmit, to the game device 3, data received via infrared communication while it is included in the transmit data as necessary.

As described above, compressed image data and sound data are transmitted from the game device 3 to the terminal device 7. These data are received by the codec LSI 66 via the antenna 71 and the wireless module 70. The codec LSI 66 expands the received image data and sound data. The expanded image data is outputted to the LCD 51, and images are displayed on the LCD 51. The expanded sound data is outputted to the sound IC 68, and the sound IC 68 outputs sounds from the speaker 67.

In a case in which control data is included in data received from the game device 3, the codec LSI 66 and the UI controller 65 give control instructions to various units in accordance with the control data. As described above, the control data is data representing control instructions for the components of the terminal device 7 (the camera 56, the touch panel controller 61, the marker unit 55, sensors 62 to 64, the infrared communication module 72, and the vibrator 79 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker unit 55, which is an infrared LED, the control can be done simply by turning ON/OFF the power supply thereto.

The game device 3 can control the operation of the television 2 by controlling the output of the infrared communication module 72. That is, the game device 3 outputs, to the terminal device 7, an instruction (the control data) for causing the infrared communication module 72 to output an infrared signal corresponding to a control command for controlling the television 2. In response to this instruction, the codec LSI 76 causes the infrared communication module 72 to output an infrared signal corresponding to the control command. Herein, the television 2 includes an infrared receiving portion capable of receiving infrared signals. As the infrared signal outputted from the infrared communication module 72 is received by the infrared receiving portion, the television 2 performs an operation in accordance with the infrared signal. The instruction from the game device 3 may represent a pattern of an infrared signal, or may be an instruction representing such a pattern in a case in which the terminal device 7 stores patterns of infrared signals.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 62, the acceleration sensor 63 and the gyrosensor 64 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 69, it may not include the camera 56 and the microphone 69 or it may include only one of them in other embodiments.

While the terminal device 7 includes the marker unit 55 as a configuration for calculating the positional relationship between the terminal device 7 and the controller 5 (the position and/or attitude, etc., of the terminal device 7 as seen from the controller 5), it may not include the marker unit 55 in other embodiments. In other embodiments, the terminal device 7 may include other mechanisms as a configuration for calculating the positional relationship. For example, in other embodiments, the controller 5 may include a marker unit, and the terminal device 7 may include an image-capturing element. Moreover, in such a case, the marker device 6 may include an image-capturing element, instead of an infrared LED.

5. Outline of Game Process

Next, an outline of game processes to be performed in the game system 1 of the present embodiment will be explained with reference to FIGS. 11 to 14. In the present embodiment, the player can draw dots and lines in a three-dimensional virtual space (the game space) using the terminal device 7. The game image representing the virtual space is displayed on two display devices of the television 2 and the terminal device 7. In the present embodiment, the terminal device 7 is used not only as the display device but also as the controller device. Therefore, the controller 5 may not be used, and the game system 1 may not include the controller 5.

Figure 11:
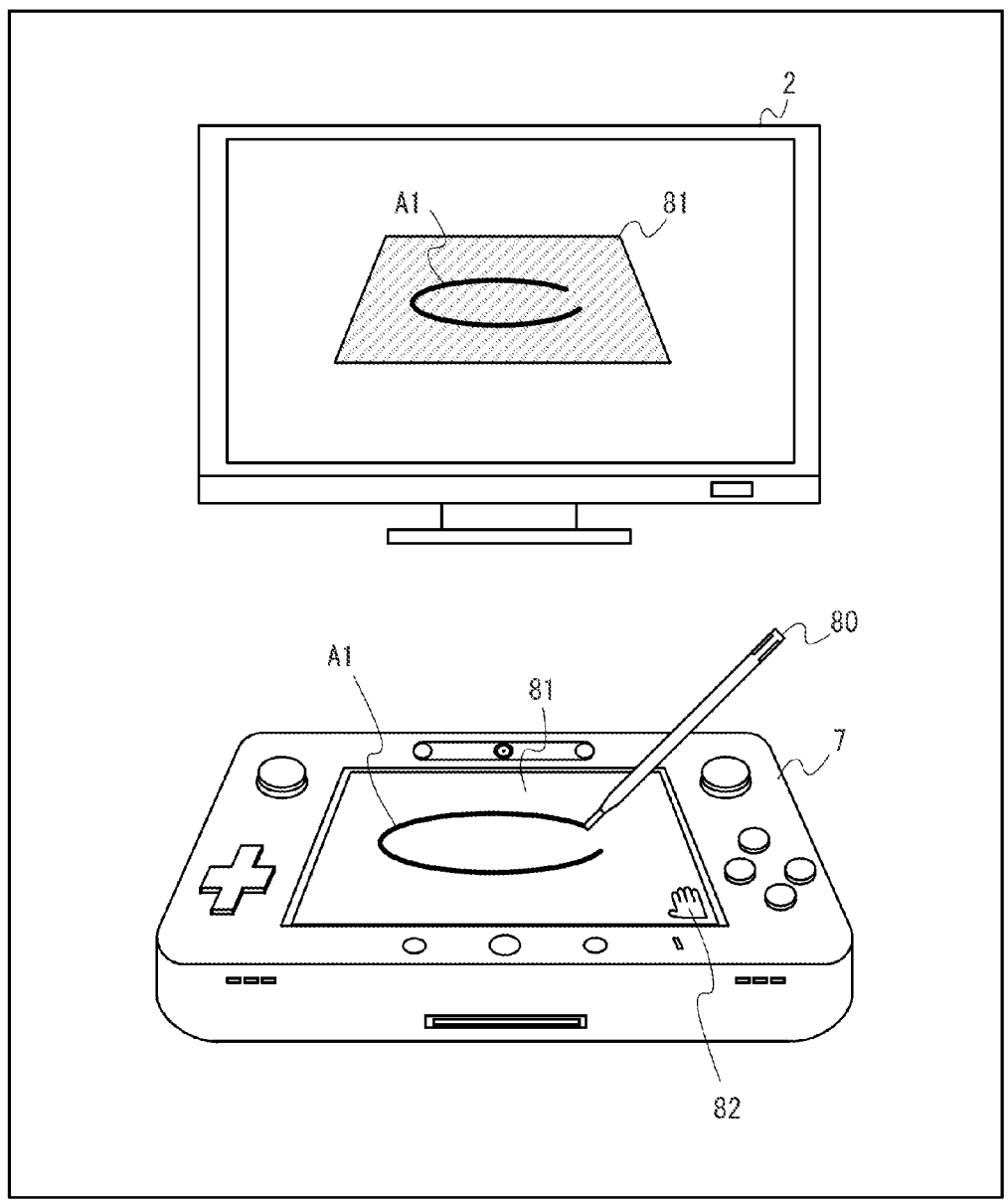
FIG. 11 is a diagram showing a television 2 and an example non-limiting terminal device 7 when game operations are performed in the present embodiment.

FIG. 11 is a diagram showing the television 2 and the terminal device 7 when game operations are performed in the present embodiment. As shown in FIG. 11, a three-dimensional virtual space in which a predetermined surface 81 is provided is displayed on the television 2, and the surface 81 is displayed also on the terminal device 7. In the terminal device 7, the surface 81 is displayed so that the surface 81 and the display screen coincide with each other. That is, the surface 81 corresponds to the input surface of the touch panel 52 of the terminal device 7. The surface 81 is a rectangular plane having the same aspect ratio as that of input surface of the touch panel 52 (the screen of the LCD 51). The attitude of the surface 81 corresponds to the attitude of the terminal device 7, and the attitude of the surface 81 in the virtual space changes by changing the attitude of the terminal device 7, the details of which will be described later. In FIG. 11, since the terminal device 7 is in such an attitude that the touch panel 52 is horizontal, the surface 81 is also horizontal in the virtual space. An icon 82 is displayed on the terminal device 7. The icon 82 is used for moving (rotating) the path generated in the virtual space, the details of which will be described later.

The player can draw dots and lines with the touch pen 80, a finger, etc., on the touch panel 52 of the terminal device 7. When a dot or a line is drawn, the dot or line drawn (the line A1 in FIG. 11) is generated and displayed on the surface 81 in the virtual space as shown in FIG. 11. Specifically, when an input (touch input) is made on the touch panel 52, the position on the surface 81 corresponding to the position at which an input has been made (input position) is calculated. Hereinafter, the position (the position on the surface 81) in the virtual space that corresponds to the touch position will be referred to as the "specified position". In the present embodiment, an object representing a dot or line is placed at the specified position, thereby displaying the input dot or line. As described above, the player can draw dots and lines in a three-dimensional virtual space through input operations on the touch panel 52.

Figure 12:
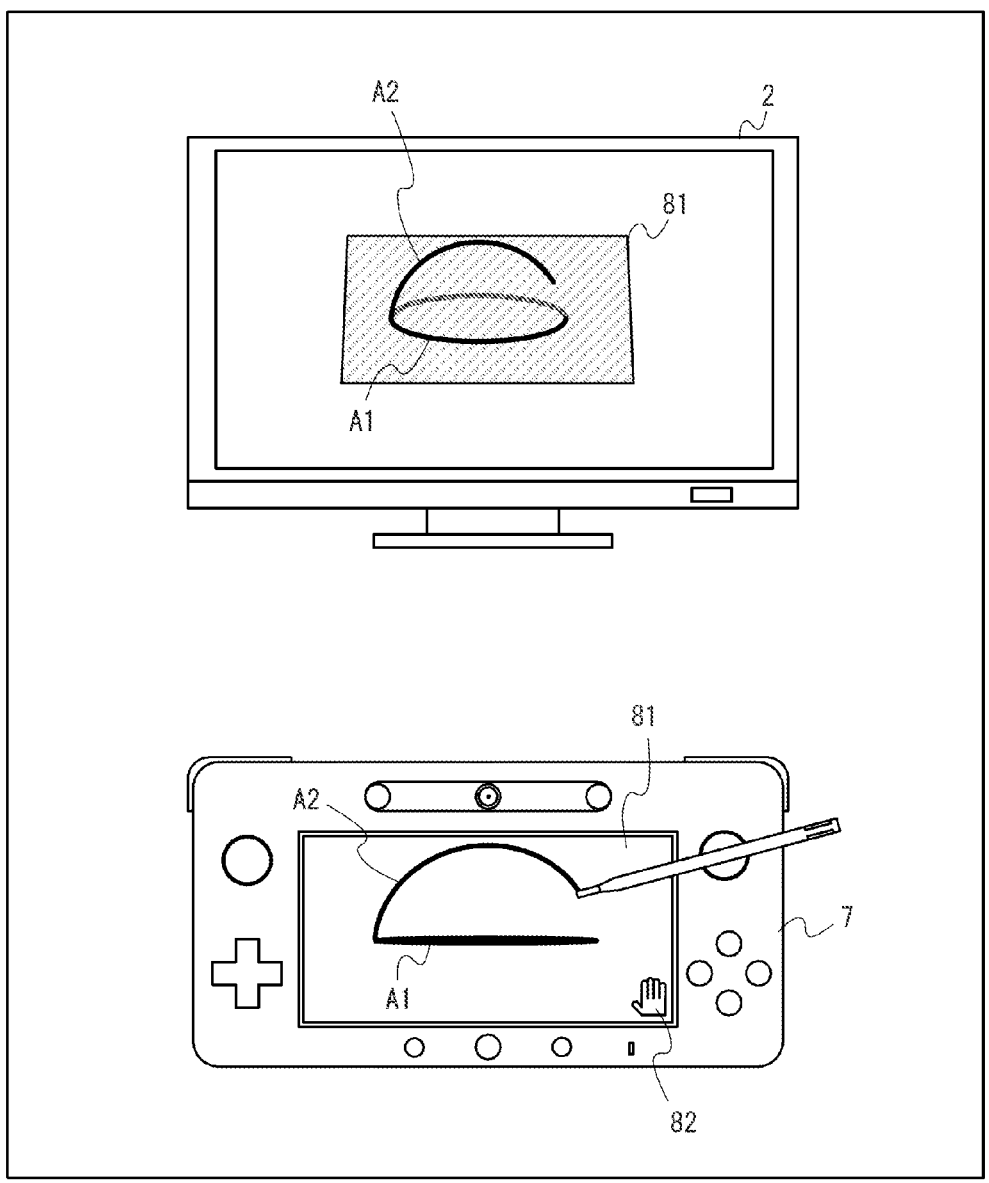
FIG. 12 is a diagram showing the television 2 and the example non-limiting terminal device 7 when the terminal device 7 is tilted from the state shown in FIG. 11.

FIG. 12 is a diagram showing the television 2 and the terminal device 7 when the terminal device 7 is tilted from the state shown in FIG. 11. While the input surface of the touch panel 52 is horizontal in the state shown in FIG. 11, the attitude of the terminal device 7 has changed from that in the state shown in FIG. 12 so that the input surface is vertical. When the attitude of the terminal device 7 is changed so that the input surface of the touch panel 52 is vertical, the surface 81 in the virtual space also changes so as to be vertical as shown in FIG. 12. In the present embodiment, the surface 81 rotates about the center of the surface 81 as the center of rotation in accordance with the attitude of the terminal device 7. When the attitude of the surface 81 changes, the viewpoint and the viewing direction of the image displayed on the terminal device 7 change so that the surface 81 and the display screen coincide with each other.

Also in the state shown in FIG. 12, as in the state shown in FIG. 11, the player can draw dots and lines in the three-dimensional virtual space through input operations on the touch panel 52. That is, when the player draws a line on the touch panel 52 in the state shown in FIG. 12, a line is generated and displayed on the surface 81 which has turned parallel to the vertical direction in the virtual space. In the state shown in FIG. 12, since the attitude of the surface 81 is different from that in the state shown in FIG. 11, the position and the direction of the line generated through a touch input are different from those of FIG. 11. That is, while the line A1 generated in the state shown in FIG. 11 is generated in a horizontal surface, the line A2 generated in the state shown in FIG. 12 is generated in a vertical surface. Therefore, the drawing formed by the line A1 and the line A2 is not two-dimensional but is three-dimensional.

As described above, in the present embodiment, a drawing (dots and lines) is generated on the surface 81 in the virtual space in accordance with inputs made on the touch panel 52 of the terminal device 7, while the attitude of the surface 81 changes in accordance with the attitude of the terminal device 7. Thus, the drawing generated on the surface 81 can be made three-dimensional by changing the attitude of the surface 81. That is, the player can three-dimensionally freely draw a drawing in a three-dimensional virtual space through input operations on the touch panel 52.

Figure 13:
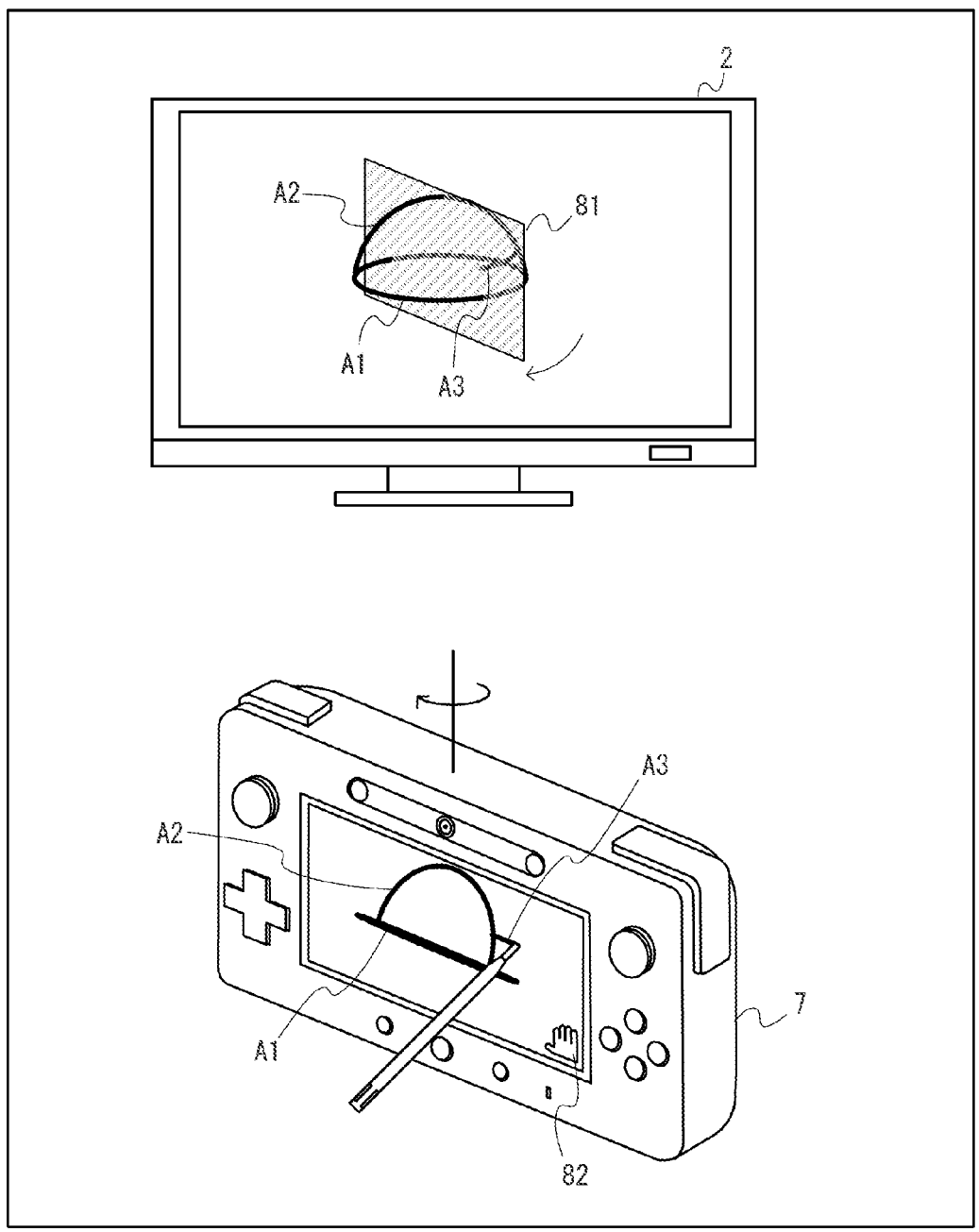
FIG. 13 is a diagram showing the television 2 and the example non-limiting terminal device 7 when the terminal device 7 is tilted from the state shown in FIG. 12.

In the present embodiment, the player can also draw a line in the virtual space through the operation of changing the attitude of the terminal device 7. FIG. 13 is a diagram showing the television 2 and the terminal device 7 when the terminal device 7 is tilted from the state shown in FIG. 12. While the normal direction to the input surface of the touch panel 52 faces toward the television 2 in the state shown in FIG. 12, the normal direction is slightly sideways from the direction toward the television 2 in the state shown in FIG. 13. It is assumed herein that while the attitude of the terminal device 7 is changed from that in the state shown in FIG. 12 to that in the state shown in FIG. 13, the player continuously touches a certain position on the touch panel 52 (except for the position of the icon 82). Also when moving from the state shown in FIG. 12 to the state shown in FIG. 13, the attitude of the surface 81 changes in accordance with the attitude of the terminal device 7 as described above as shown in FIG. 13. In this case, even if the player continuously touches the same position, the specified position in the virtual space changes as the attitude of the surface 81 changes. Therefore, as shown in FIG. 13, the line A3 is generated and displayed representing a path along which the specified position has moved. Thus, in the present embodiment, it is possible to draw a line in the virtual space through the operation of changing the attitude of the terminal device 7, in addition to the operation of drawing a line on the touch panel 52. It is also possible to draw a line in a direction that is not parallel to the surface 81 through the operation of changing the attitude of the terminal device 7.

Figure 14:
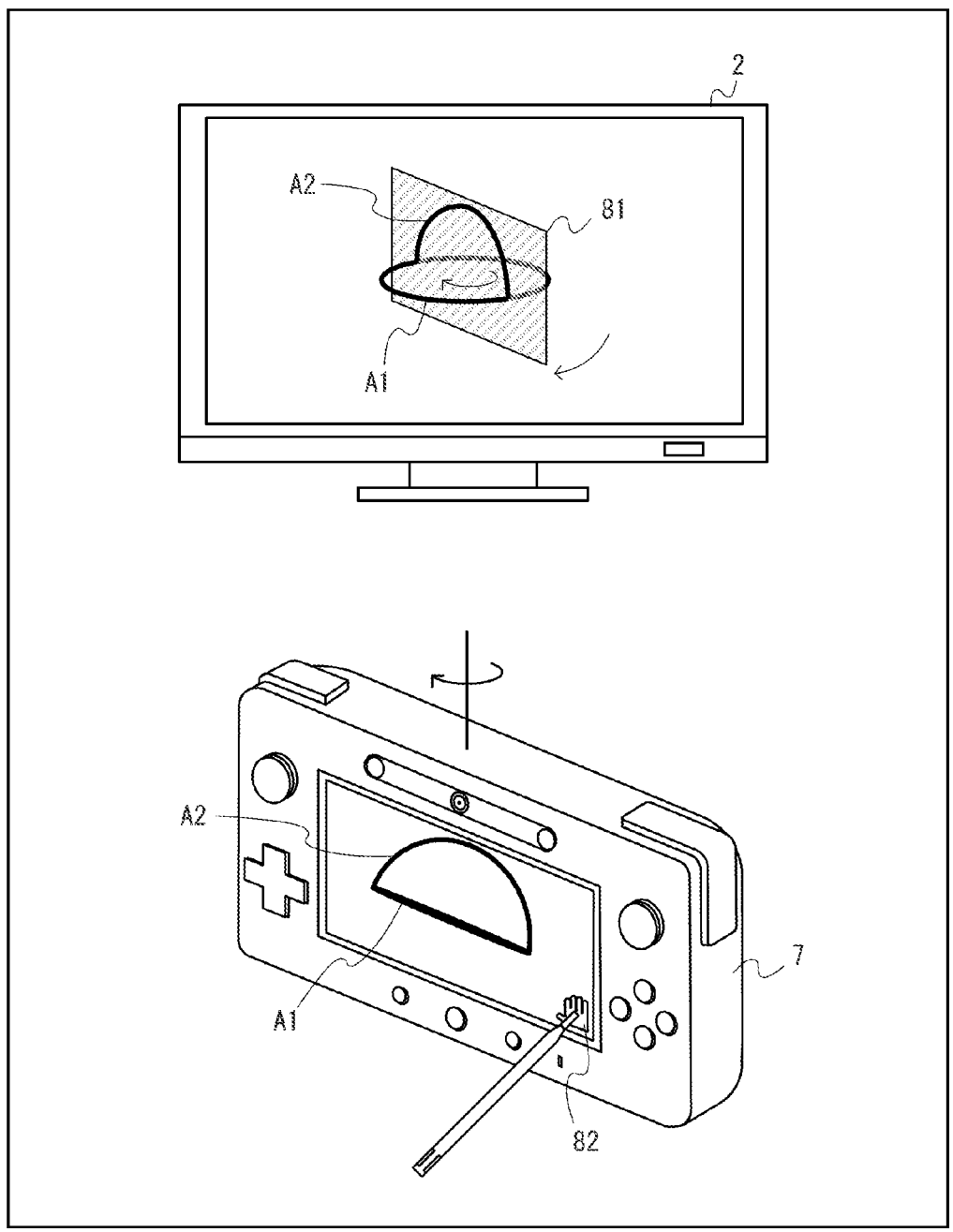
FIG. 14 is a diagram showing the television 2 and the example non-limiting terminal device 7 when a drawing is rotated from the state shown in FIG. 12.

In the present embodiment, the player can change the direction (attitude) of the drawing generated in the virtual space. FIG. 14 is a diagram showing the television 2 and the terminal device 7 when a drawing is rotated from the state shown in FIG. 12. While the normal direction to the input surface of the touch panel 52 is facing toward the television 2 in the state shown in FIG. 12, the normal direction is slightly sideways from the direction toward the television 2 in the state shown in FIG. 14, as in the state shown in FIG. 13. It is assumed that the player is performing a predetermined operation (herein an operation of continuously touching the position of the icon 82 on the touch panel 52) while the attitude of the terminal device 7 is changed from that in the state shown in FIG. 12 to that in the state shown in FIG. 13. When the attitude of the terminal device 7 is changed while a predetermined operation is being performed as described above, the attitude of the generated drawing changes, together with the attitude of the surface 81, in accordance with the attitude of the terminal device 7. For example, in FIG. 14, the drawing made up of the lines A1 and A2 rotates together with the surface 81 about an axis in the vertical direction in the virtual space as the terminal device 7 rotates about an axis in the vertical direction. Then, the drawing is displayed on the television 2 with the direction having been changed. Therefore, the player can view the created drawing from various directions and check the shape of the drawing through the operation of changing the attitude of the terminal device 7 while touching the icon 82. Since the viewing direction of an image displayed on the terminal device 7 changes together with the attitude of the surface 81, the drawing appears to be not moving. While the predetermined operation is an operation of touching the icon 82 in the present embodiment, it may be any other suitable operation such as pressing a predetermined button of the terminal device 7, for example, in other embodiments.

6. Details of Game Processes

Figure 15:
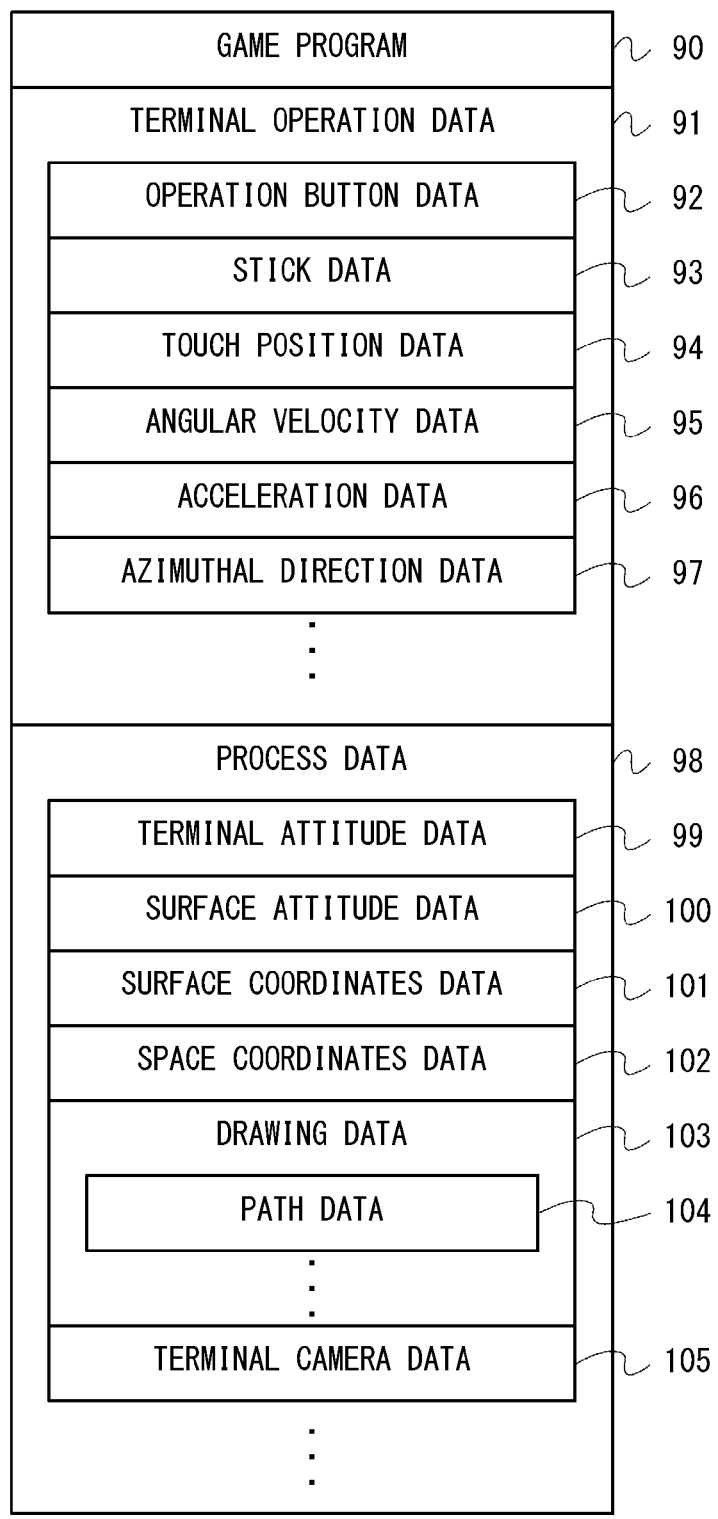
FIG. 15 is a diagram showing various example non-limiting data used in the game processes.

Next, the details of game processes performed in the present game system will be described. First, various data used in the game processes will be described. FIG. 15 is a diagram showing various data used in the game processes. FIG. 15 is a diagram showing primary data to be stored in the main memory (the external main memory 12 or the internal main memory 11e) of the game device 3. As shown in FIG. 15, the main memory of the game device 3 stores a game program 90, terminal operation data 91 and process data 98. In addition to those shown in FIG. 15, the main memory also stores other data used in the game, such as image data of various objects appearing in the game, and sound data used in the game, etc.

At an appropriate point in time after the power of the game device 3 is turned ON, a part or whole of the game program 90 is loaded from the optical disc 4 and stored in the main memory. The game program 90 may be obtained from the flash memory 17 or an external device of the game device 3 (e.g., via the Internet), instead of from the optical disc 4. A part of the game program 90 (e.g., a program for calculating the attitude of the controller and/or the terminal device 7) may be pre-stored in the game device 3.

The terminal operation data 91 is data representing an operation performed by the player on the terminal device 7. The terminal operation data 91 is transmitted from the terminal device 7 and obtained by the game device 3 to be stored in the main memory. The terminal operation data 91 includes operation button data 92, stick data 93, touch position data 94, angular velocity data 95, acceleration data 96, and azimuthal direction data 97. Other than the various data shown in FIG. 15, the terminal operation data 91 may include data of an image captured by the camera 56 and sound data detected by the microphone 69. The main memory may store a predetermined number of latest (most recently obtained) sets of terminal operation data.

The operation button data 92 is data representing the input status of the operation buttons 54A to 54L provided on the terminal device 7. Specifically, the operation button data 92 represents whether each of the operation buttons 54A to 54L is pressed.

The stick data 93 is data representing the direction and the amount of slide (or tilt) of the stick portion of the analog stick 53 (the analog sticks 53A and 53B). The direction and the amount may be represented as two-dimensional coordinates or a two-dimensional vector, for example.

The input position data 94 is data representing the position (touch position) on the input surface of the touch panel 52 at which an input is made. In the present embodiment, the touch position data 94 represents coordinate values in a two-dimensional coordinate system for representing a position on the input surface. In a case in which the touch panel 52 is of a multi-touch type, the touch position data 94 may represent a plurality of input positions.

The angular velocity data 95 is data representing the angular velocity detected by the gyrosensor 64. While the angular velocity data 95 represents angular velocity about each of the three axes of x, y and z shown in FIG. 8 in the present embodiment, it may represent angular velocity about any one or more axes in other embodiments.

The acceleration data 96 is data representing the acceleration (acceleration vector) detected by the acceleration sensor 63. While the acceleration data 96 represents three-dimensional acceleration of which each component is the acceleration for one of the three axes of x, y and z shown in FIG. 8 in the present embodiment, it may represent acceleration for any one or more directions in other embodiments.

The azimuthal direction data 97 is data representing the azimuthal direction detected by the magnetic sensor 62. In the present embodiment, the azimuthal direction data 97 represents the direction of a predetermined azimuthal direction (e.g., north) with respect to the terminal device 7. However, in a place where there is a magnetic field other than the geomagnetic field, the azimuthal direction data 97 does not strictly represent the absolute azimuthal direction (e.g., north). Nevertheless, it represents a relative direction of the terminal device 7 with respect to the direction of the magnetic field in that place, and it is therefore possible to calculate the attitude of, or the change in the attitude of, the terminal device 7 based on the azimuthal direction data 97 even in such cases.

The terminal operation data 91 may be data representing operations performed on the terminal device 7, and may be data including only one of the data 92 to 97 described above. In a case in which the terminal device 7 includes other input units (e.g., a touch pad, an image-capturing unit of the controller 5, etc.), the terminal operation data 91 may include data representing operations performed on the other input units. In a case in which the movement of the terminal device 7 itself is used as a game operation as in the present embodiment, the terminal operation data 91 may include data whose value changes in accordance with the movement of the terminal device 7 itself, as is the acceleration data 96, the angular velocity data 95 or the azimuthal direction data 97.

In the present embodiment, camera image data and/or microphone sound data may be transmitted from the terminal device 7 to the game device 3, in addition to the terminal operation data 91. The camera image data is data representing images (camera images) captured by the camera 56 of the terminal device 7. The microphone sound data is data representing sounds (microphone sounds) detected by the microphone 69 of the terminal device 7. The camera image data and the microphone sound data may be compressed by the codec LSI 76, transmitted to the game device 3, expanded by the codec LSI 27 in the game device 3, and stored in the main memory.

The main memory may store controller operation data which represents an operation performed by a player on the controller 5, though it is not shown because the controller 5 is not used as the controller device in the present embodiment.

The process data 98 is data used in the game processes (FIG. 16) to be described later. The process data 98 includes terminal attitude data 99, surface attitude data 100, planar coordinate data 101, space coordinate data 102, drawing data 103, and terminal camera data 105. In addition to those shown in FIG. 15, the process data 98 also includes various data used in the game processes, such as data representing various parameters set for various objects appearing in the game.

The terminal attitude data 99 is data representing the attitude of the terminal device 7. The attitude of the terminal device 7 may be represented for example by a rotation matrix which represents the rotation from a predetermined reference attitude to the current attitude of the terminal device 7, or may be represented by a cubic vector or three angles. While an attitude in a three-dimensional space is used as the attitude of the terminal device 7 in the present embodiment, an attitude in a two-dimensional plane may be used in other embodiments. In the present embodiment, the terminal attitude data 99 is calculated based on the angular velocity data 95 and the acceleration data 96 included in the terminal operation data 91. The method for calculating the terminal attitude data 99 will be described below in step S11.

The surface attitude data 100 is data representing the attitude of the surface 81 which is set in the virtual space. The attitude of the surface 81 represented by the surface attitude data 100 may be expressed by a rotation matrix, may be expressed by a cubic vector or three angles, or may be expressed by a formula of a plane. In the present embodiment, the position of the surface 81 is fixed to a predetermined position.

The planar coordinate data 101 is data representing planar coordinates of the specified position. Planar coordinates as used herein are coordinates for expressing the specified position in a coordinate system (planar coordinate system) with respect to the surface 81. Since the specified position is a point on the surface 81, the planar coordinate data 101 may be data representing two-dimensional coordinate values. The specified position on the surface 81 corresponds to the touch position on the touch panel 52, and the planar coordinate data 101 is calculated based on the touch position data 94.

The space coordinate data 102 is data representing space coordinates of the specified position. Space coordinates as used herein are coordinates for expressing the specified position in a coordinate system (space coordinate system) with respect to the virtual space. The space coordinate data 102 represents the specified position by three-dimensional coordinate values. The space coordinate data 102 is calculated based on the surface attitude data 100 and the planar coordinate data 101.

The drawing data 103 is data representing a drawing formed by specified positions. The drawing data 103 includes one or more path data 104. The path data 104 is data representing a path of calculated specified positions. Specifically, when inputs are made successively on the touch panel 52 (i.e., when touch positions are detected successively), the path data 104 represents a series of specified positions corresponding to touch positions starting from the oldest one. The path data 104 represents coordinate values expressing specified positions in the space coordinate system. In the present embodiment, when a next touch input is newly made after one touch input is complete, new path data 104 for the next touch input is generated and stored in the main memory, in addition to the path data 104 generated for the first touch input.

The terminal camera data 105 is data representing the position and the attitude of a virtual camera (terminal virtual camera) which is used for generating the terminal image. In the present embodiment, the position and the attitude of the terminal virtual camera are calculated based on the position of the surface 81.

In addition to the data 99 to 104, the main memory stores various data used in the game processes. In the present embodiment, for example, flag data is stored which represents whether it is in a grab state. The grab state is a state in which the icon 82 is touched, and is a state in which a drawing formed by paths of the specified positions can be moved.

Figure 16:
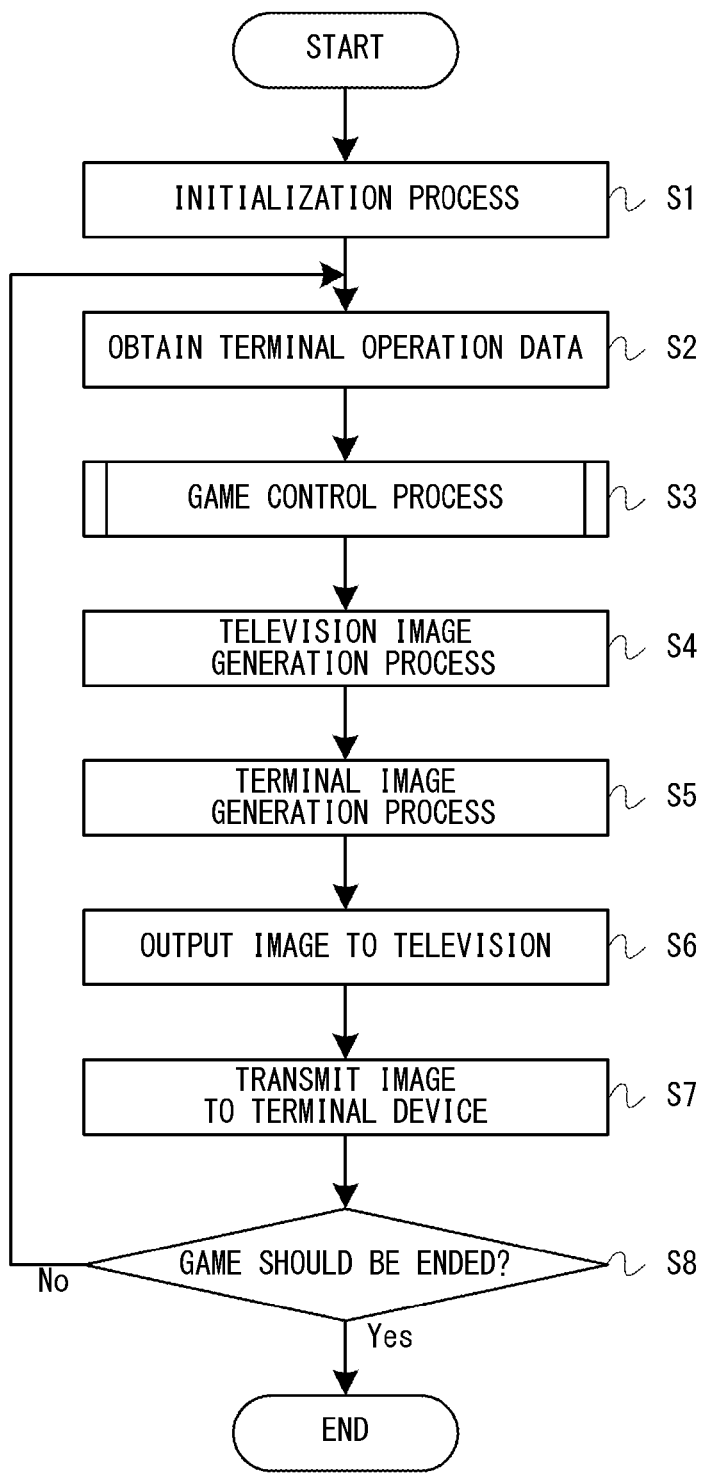
FIG. 16 is a main flow chart showing an example non-limiting flow of a game process to be performed by a game device 3.

Next, the details of the game processes performed by the game device 3 will be described with reference to FIGS. 16 to 20. FIG. 16 is a main flow chart showing the flow of the game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The flow chart shown in FIG. 16 is a flow chart showing the process to be performed after processes described above are completed. The game device 3 may be configured to execute the game program immediately after power-up, or it may be configured so that a built-in program is executed after power-up for displaying a predetermined menu screen first, and then the game program is executed when the start of the game is instructed by a player through the operation of making a selection on the menu screen, for example.

The processes of the steps of the flow charts shown in FIGS. 16, 17, 20 and 21 are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the virtual space at their initial positions, and setting initial values of various parameters used in the game processes. In the present embodiment, the surface 81 is placed in the virtual space at a predetermined position and with a predetermined attitude. Data representing the initial position and the initial attitude of the surface 81 is stored in the main memory. The virtual camera (television virtual camera) used for generating the television image and the virtual camera (terminal virtual camera) used for generating the terminal image are set with a predetermined initial position and a predetermined initial attitude. The data representing the initial position and the initial attitude of the television virtual camera is stored in the main memory, and data representing the initial position and the initial attitude of the terminal virtual camera is stored in the main memory as the terminal camera data 105. The television virtual camera is set with a predetermined position and a predetermined attitude so that the surface 81 is included in the viewing field range. The initial position and the initial attitude of the terminal virtual camera are set so that the viewing direction is perpendicular to the surface 81 and the surface 81 coincides with the display screen of the LCD 51. In step S1, data representing a non-grab state is stored in the main memory as the flag data. The process of step S2 is performed, following step S1. Thereafter, the process loop including a series of processes of steps S2 to S8 is repeatedly performed at a rate of once per a predetermined amount of time (a one frame period, e.g., 1/60 sec).

In step S2, the CPU 10 obtains terminal operation data transmitted from the terminal device 7. Since the terminal device 7 repeatedly transmits the terminal operation data to the game device 3, the game device 3 successively receives the terminal operation data. In the game device 3, the terminal communication module 28 successively receives the terminal operation data, and the input/output processor 11a successively stores the terminal operation data in the main memory. In step S2, the CPU 10 reads out the latest terminal operation data 91 from the main memory. The process of step S3 is performed, following step S2.

In step S3, the CPU 10 performs the game control process. The game control process is a process for, for example, generating object representing dots and lines in the virtual space in response to operations by the player, and moving the objects. The details of the game control process will now be described with reference to FIG. 17.

Figure 17:
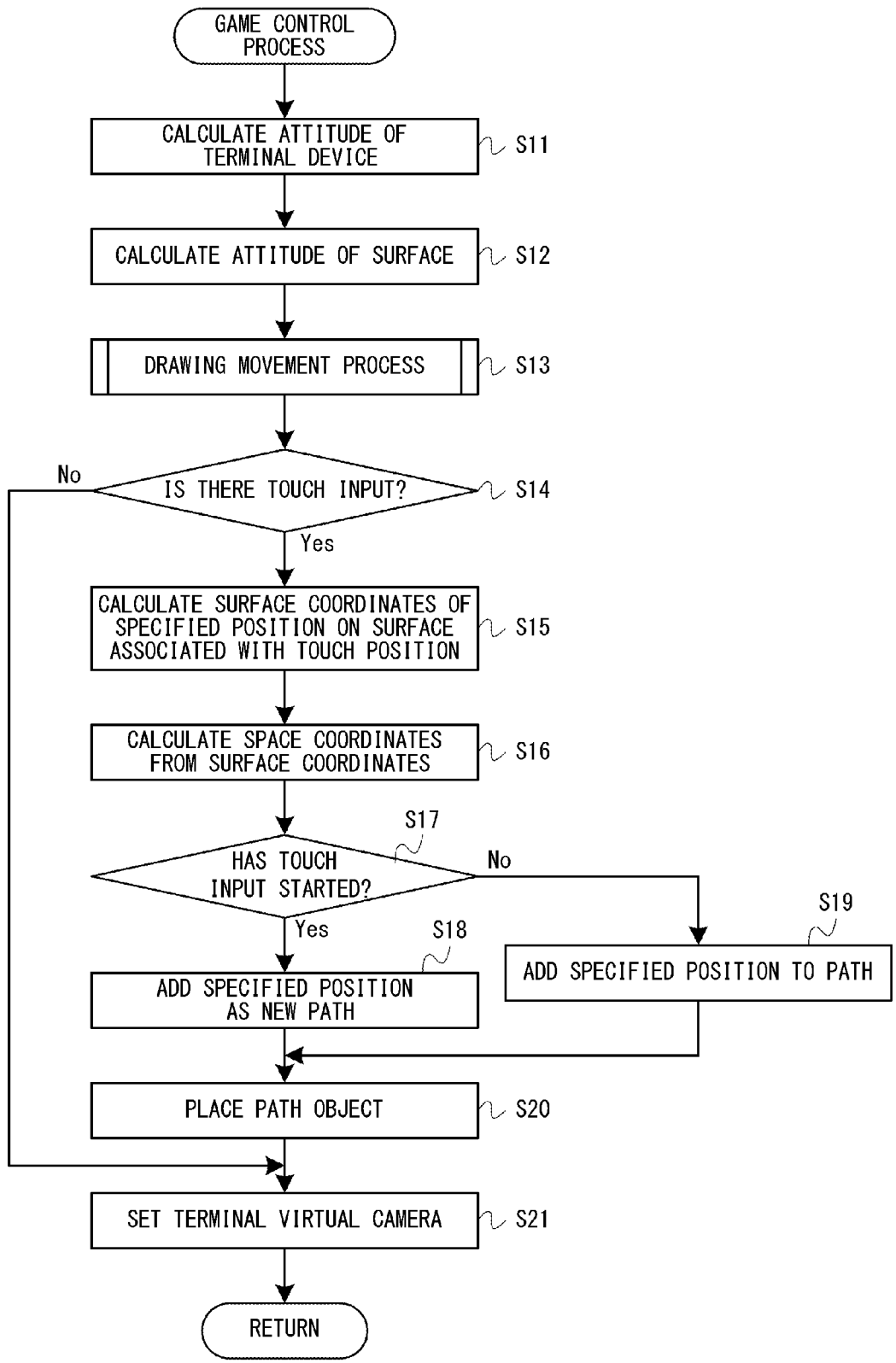
FIG. 17 is a flow chart showing a detailed flow of an example non-limiting game control process (step S3) shown in FIG. 16.

FIG. 17 is a flow chart showing a detailed flow of the game control process (step S3) shown in FIG. 16. In the game control process, first, in step S11, the CPU 10 calculates the attitude of the terminal device 7. The attitude of the terminal device 7 is calculated based on the physical quantities for calculating the attitude which are represented by the terminal operation data. In the present embodiment, the angular velocity represented by the angular velocity data 95 and the acceleration represented by the acceleration data 96 are used as the physical quantities for calculating the attitude. The details of the attitude calculation process will now be described.

In the attitude calculation process, first, the CPU 10 calculates the attitude of the terminal device 7 based on the angular velocity data 95. While the method for calculating the attitude based on the angular velocity may be any method, the attitude is calculated using the previous attitude (the attitude calculated in step S11 in a previous iteration) and the current angular velocity (the angular velocity obtained in step S2 in a current iteration of the process loop). Specifically, the CPU 10 calculates the attitude by rotating the previous attitude by a unit time's worth of the current angular velocity. The previous attitude is represented by the terminal attitude data 99 stored in the main memory, and the current angular velocity is represented by the angular velocity data 95 stored in the main memory. Therefore, the CPU 10 reads out the terminal attitude data 99 and the angular velocity data 95 from the main memory to calculate the attitude of the terminal device 7. The data representing the attitude calculated as described above is stored in the main memory.

Where the attitude is calculated from the angular velocity, an initial attitude may be set. That is, where the attitude of the terminal device 7 is calculated from the angular velocity, the CPU 10 initially calculates the initial attitude of the terminal device 7. The initial attitude of the terminal device 7 may be calculated based on the acceleration data 96, or the player may be prompted to perform a predetermined operation with the terminal device 7 in a particular attitude so that the particular attitude at the point in time when the predetermined operation is performed is used as the initial attitude. While the initial attitude may be calculated in a case in which the attitude of the terminal device 7 is calculated as an absolute attitude with respect to a predetermined direction in the space, the initial attitude may not be calculated in a case in which the attitude of the terminal device 7 is calculated as a relative attitude with respect to the attitude of the terminal device 7 at the start of the game, for example.

Next, after calculating the attitude based on the angular velocity, the CPU 10 corrects the calculated attitude based on the acceleration of the terminal device 7. In a state in which the terminal device 7 is substantially stationary, the acceleration acting upon the terminal device 7 means the gravitational acceleration. That is, in this state, the acceleration vector represented by the acceleration data 96 represents the direction of gravity in the terminal device 7. Therefore, the CPU 10 performs a correction such that the downward direction (direction of gravity) of the attitude calculated based on the angular velocity is brought closer to the direction of gravity represented by the acceleration vector. That is, the attitude is rotated so that the downward direction is brought closer to the direction of gravity represented by the acceleration vector at a predetermined rate. Therefore, the attitude based on the angular velocity can be corrected so as to be an attitude taking into consideration the direction of gravity based on the acceleration. The predetermined rate may be a predetermined fixed value or may be set in accordance with the detected acceleration, etc. For example, the CPU 10 may increase the rate at which the downward direction of the attitude is brought closer to the direction of gravity represented by the acceleration vector when the magnitude of the detected acceleration is close to the magnitude of the gravitational acceleration, and decrease the rate when the magnitude of the detected acceleration is remote from the magnitude of the gravitational acceleration.

Specifically, the CPU 10 reads out data representing the attitude calculated based on the angular velocity and the acceleration data 96 from the main memory, and performs the correction described above. Then, data representing the corrected attitude is stored in the main memory as the terminal attitude data 99. The process of step S12 is performed, following step S11 described above.

In the present embodiment, the CPU 10 calculates the attitude of the terminal device 7 based on the detection results of the inertia sensor (the acceleration sensor 63 and the gyrosensor 64). In other embodiments, the method for calculating the attitude of the terminal device 7 may be any method. For example, in other embodiments, if the terminal device 7 includes other sensor units (e.g., the magnetic sensor 62 and the camera 56), the attitude of the controller 5 may be calculated using the detection results of the other sensor units. That is, the CPU 10 can know a predetermined azimuthal direction with respect to the terminal device 7 (that is, the attitude of the terminal device 7 with respect to the predetermined azimuthal direction) from the azimuthal direction data 97 detected by the magnetic sensor 62. Therefore, in other embodiments, the CPU 10 may calculate the attitude of the terminal device 7 by further using the azimuthal direction data 97, in addition to the angular velocity data 95 and the acceleration data 96. If the attitude of the terminal device 7 is calculated using the azimuthal direction data 97, it is possible to calculate the absolute attitude with respect to a predetermined direction in the real space, and it is therefore possible to more accurately calculate the attitude of the terminal device 7. For the azimuthal direction data 97, in a place where there is a magnetic field other than the geomagnetic field, the azimuthal direction data does not strictly represent the absolute azimuthal direction (e.g., north). Nevertheless, it represents a relative direction of the terminal device 7 with respect to the direction of the magnetic field in that place, and it is therefore possible to calculate the attitude of the terminal device 7 even in such cases. In other embodiments, the attitude may be calculated based on one or two of the three data. In a case in which the game system 1 includes a camera for capturing an image of the terminal device 7, for example, the game device 3 may obtain an image-capturing result of capturing an image of the terminal device 7 with the camera, and calculate the attitude of the terminal device 7 using the image-capturing result.

In step S12, the CPU 10 sets the surface 81 so that the attitude changes in accordance with the attitude of the terminal device 7. In the present embodiment, since the position of the surface 81 does not change, the CPU 10 calculates the attitude of the surface 81 based on the attitude of the terminal device 7. In the present embodiment, the attitude of the surface 81 in the virtual space is controlled so as to correspond to the attitude of the terminal device 7 in the real space. Specifically, the attitude of the terminal device 7 in which the y axis (see FIG. 9) of the terminal device 7 is horizontal and faces toward the television 2 is the reference attitude, and when the terminal device 7 is in the reference attitude, the surface 81 is horizontal in the virtual space. When the attitude of the terminal device 7 changes from the reference attitude, the surface 81 is rotated from the attitude of the surface 81 in the reference attitude in a direction in accordance with the direction in which the attitude of the terminal device 7 changes by an amount in accordance with the amount of change (so that the amount of rotation of the terminal device 7 and the amount of rotation of the surface 81 are equal to each other in the present embodiment). The attitude of the surface 81 may be controlled in any way as long as it is controlled so that it changes in accordance with the change in the attitude of the terminal device 7.

As a specific process of step S12, the CPU 10 reads out the terminal attitude data 99 from the main memory, and calculates the attitude of the surface 81 based on the attitude of the terminal device 7. Data representing the calculated attitude of the surface 81 is stored in the main memory as the surface attitude data 100. In the present embodiment, the attitude of the surface 81 may be represented by three vectors which represent, in a space coordinate system, three axis directions in a three-dimensional planar coordinate system with respect to the surface 81, for example. The process of step S13 is performed, following step S12.

In step S13, the CPU 10 performs a drawing moving process. The drawing moving process is a process of moving (rotating), in accordance with the attitude of the terminal device 7, the drawing formed by specified positions which have been set based on inputs made by the player. The details of the drawing moving process will be described below. The process of step S14 is performed, following step S13.

In step S14, the CPU 10 determines whether there has been a touch input on the touch panel 52. This determination can be made by referencing the touch position data 94 read out in step S2. If the determination result of step S14 is affirmative, the process of step S15 is performed. If the determination result of step S14 is negative, the CPU 10 skips the processes of steps S15 to S20 and performs the process of step S21 to be described below.

Figure 18:
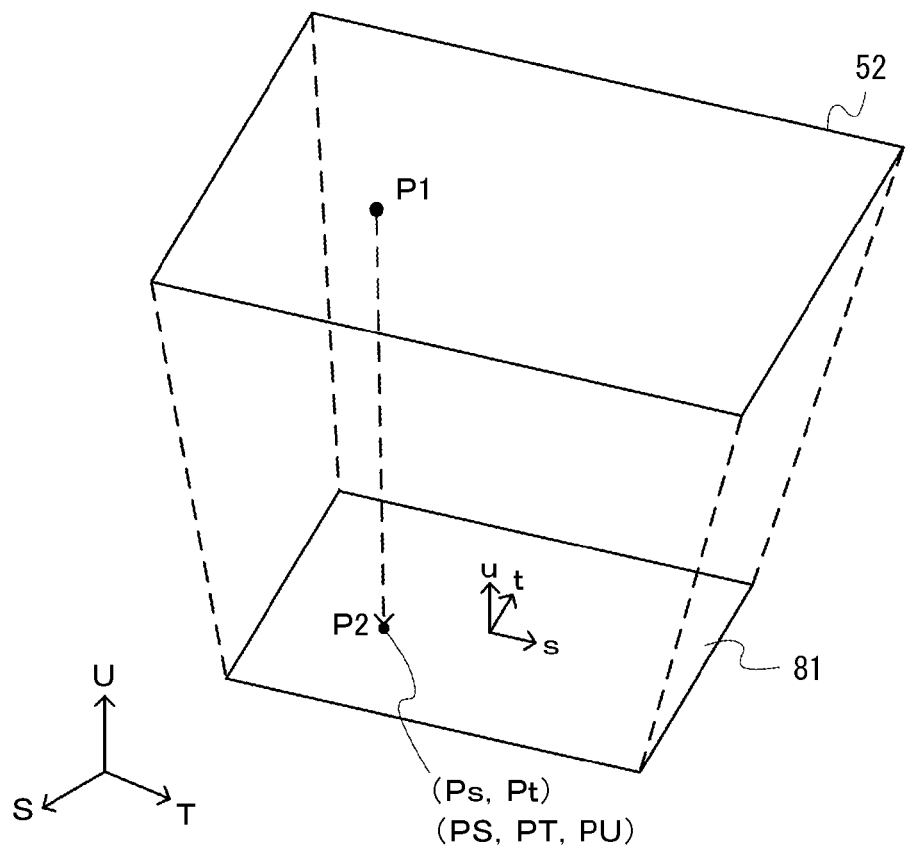
FIG. 18 is a diagram illustrating an example non-limiting method for calculating a specified position based on a touch position on an input surface of a touch panel 52.

In step S15 and step S16, the specified position is calculated based on the touch position. As described above, in the present embodiment, the position on the surface 81 determined by the touch position is calculated as the specified position. FIG. 18 is a diagram illustrating a method for calculating a specified position based on a touch position on the input surface of the touch panel 52. As shown in FIG. 18, the specified position P2 on the surface 81 is calculated as the position on the surface 81 corresponding to the touch position P1 on the input surface of the touch panel 52. In the present embodiment, first, the planar coordinates (Ps, Pt) of the specified position P2 are calculated based on the touch position P1. The planar coordinates (Ps, Pt) are coordinates which are expressed in a planar coordinate system (stu coordinate system) with respect to the surface 81. The planar coordinate system as used herein is composed of the s axis extending in the longitudinal direction of the surface 81, the t axis extending in the width direction of the surface 81, and the u axis extending in the direction vertical to the surface 81. Therefore, the position on the surface 81 is expressed by two-dimensional coordinates (Ps, Pt) including the s-direction component and the t-direction component. The u axis of the planar coordinate system is set for the purpose of representing, in a planar coordinate system, a position that is not on the surface 81 in the drawing moving process to be described below. The planar coordinates (Ps, Pt) are calculated by, for example, scaling (multiplying by a predetermined constant) the coordinate values of the touch position P1 in accordance with the ratio between the size of the surface 81 and the size of the input surface of the touch panel 52. When the planar coordinate system and the space coordinate system are set so that the ratio is "1", the coordinate values of the touch position P1 can be used as they are as the planar coordinates (Ps, Pt).

When the planar coordinates (Ps, Pt) of the specified position P2 are calculated, the planar coordinates (Ps, Pt) are then converted to the space coordinates (PS, PT, PU). The space coordinates (PS, PT, PU) are coordinate values representing the specified position P2 in the space coordinate system (STU coordinate system). The position of the origin and the directions of the axes of the planar coordinate system in the space coordinate system are determined by the position and the attitude of the surface 81. Therefore, the space coordinates (PS, PT, PU) can be calculated based on the position of the surface 81 ((DS, DT, DU) to be described below) and the attitude (the vector A and the vector B to be described below) and the planar coordinates (Ps, Pt). Specifically, the space coordinates (PS, PT, PU) can be calculated in accordance with Expression (1) below.

$$PS = Ps \times AS + Pt \times AS + DS$$

$$PT = Ps \times AT + Pt \times AT + DT$$

$$PU = Ps \times AU + Pt \times AU + DU \quad (1)$$

In Expression (1) above, (AS, AT, AU) are the components of the unit vector A extending in the positive s-axis direction in the planar coordinate system, and (BS, BT, BU) are the components of the unit vector B extending in the positive t-axis direction in the planar coordinate system. The position of the origin (in the space coordinate system) in the planar coordinate system is (DS, DT, DU).

Specifically, first, in step S15, the CPU 10 calculates the planar coordinates of the specified position corresponding to the touch position. As described above, the planar coordinates are calculated as the position P2 on the surface 81 corresponding to the touch position P1 on the input surface of the touch panel 52. While the specific method for calculating the planar coordinates may be any method, the planar coordinates are calculated so that the positional relationship of the touch position P1 with respect to the four sides of the input surface of the touch panel 52 is the same as the positional relationship of the specified position P2 with respect to the four sides of the surface 81. Specifically, in the present embodiment, the planar coordinates are calculated by scaling the coordinate values of the touch position P1 in accordance with the ratio described above. As a specific process of step S15, the CPU 10 calculates the two-dimensional coordinates for expressing, by the planar coordinate system, the position on the surface 81 corresponding to the touch position, from the touch position represented by the touch position data 94 readout in step S2. Then, data representing the calculated two-dimensional coordinates is stored in the main memory as the planar coordinate data 101. The process of step S16 is performed, following step S15.

In step S16, the CPU 10 calculates the space coordinates of the specified position from the planar coordinates. As described above, the space coordinates can be calculated based on the planar coordinates and the position and the attitude of the surface 81 (i.e., the origin position and the directions of the coordinate axes of the planar coordinate system in the space coordinate system). That is, the CPU 10 reads out the surface attitude data 100 and the planar coordinate data 101 from the main memory, and calculates the space coordinates by substituting the planar coordinates and the position and the attitude of the surface 81 into Expression (1) above. Data representing the calculated space coordinates is stored in the main memory as the space coordinate data 102. The process of step S17 is performed, following step S16.

With steps S15 and S16, the CPU 10 calculates, as the specified position in the virtual space, a position (in the virtual space) corresponding to the touch position on the display screen of the touch panel 52 (the LCD 51). That is, since the position touched by the player is the specified position on the display screen, the player can specify the specified position through an intuitive and easy-to-understand operation.

In step S17, the CPU 10 determines whether a touch input has been started (whether it is immediately after the start of the touch input). Specifically, the CPU 10 determines whether there has been a touch input in the previous iteration of the process loop (a process loop including a series of processes of steps S2 to S8). Taking into consideration erroneous detections of the touch panel 52 and erroneous operations of the player, the CPU 10 may determine whether there have been successive touch inputs over a predetermined number of preceding iterations, rather than whether there has been a touch input for the previous iteration. If the determination result of step S17 is affirmative, the process of step S18 is performed. If the determination result of step S17 is negative, the process of step S19 is performed.

In step S18, the CPU 10 stores the specified position calculated in steps S15 and S16 as the start point of a new path. Specifically, the CPU 10 stores the space coordinate data 102, which has been stored in the main memory, as new path data 104 in the main memory. Thus, one path data 104 included in the drawing data 103 has been added. That is, one path of a drawing has been added. The process of step S20 is performed, following step S18.

In step S19, the CPU 10 stores the specified position calculated in steps S15 and S16 as the end point of the existing path. Specifically, the CPU 10 updates the path data 104 so as to add the space coordinate data 102 to the latest one of the path data 104 included in the drawing data 103. Thus, the specified position has been added to the end point of the latest path. The process of step S20 is performed, following step S19.

In step S20, the CPU 10 places a predetermined object at the specified position calculated in steps S15 and S16. While the predetermined object may be of any shape, an object representing a path at a specified position is placed in the present embodiment. That is, the CPU 10 places an object so that one or more specified positions including on path data 104 form one line. Specifically, in the process of one iteration of step S20, a linear object connecting between the latest specified position and the previous specified position is placed. For example, the linear object may be a cylindrical object so that it is seen to be linear from any direction. When the latest specified position is the start point of a path, an object representing a point (e.g., a spherical object) is placed. While the object placed in step S20 continues to be present in subsequent processes in the present embodiment, it may be erased in response to an instruction from the player, for example, in other embodiments. The object placed in step S20 may be successively (automatically) moved in a predetermined direction in response to a predetermined operation by the player. Thus, for example, the player can draw a straight line only by specifying a point in the virtual space, or drawing a wavy line by reciprocating the touch position in a direction perpendicular to the movement direction of the object, and the player can easily draw a wider variety of lines. The process of step S21 is performed, following step S20.

Figure 19:
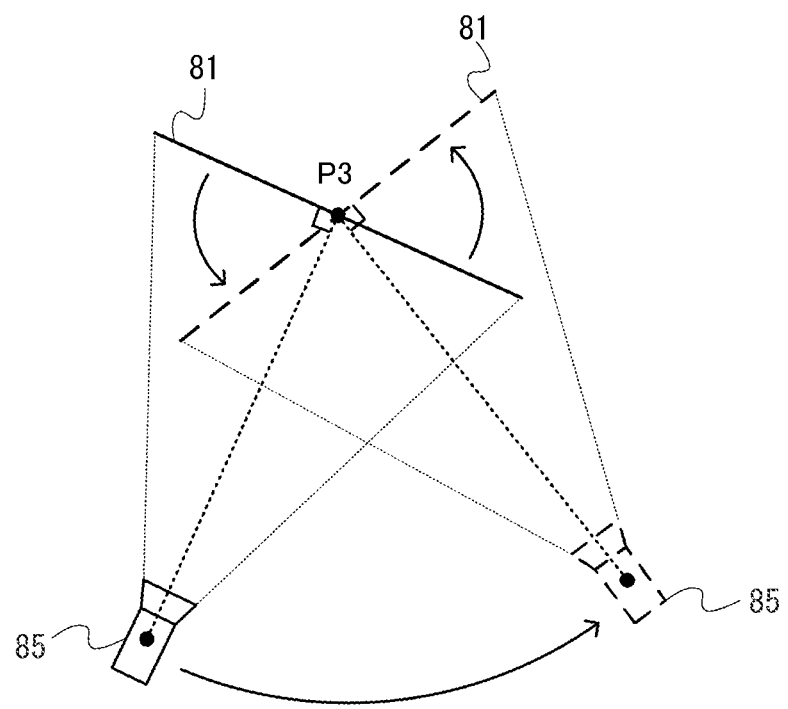
FIG. 19 is a diagram showing an example non-limiting positional relationship between a surface 81 and a terminal virtual camera 85.

In step S21, the CPU 10 controls the terminal virtual camera in accordance with the attitude of the surface 81. FIG. 19 is a diagram showing the positional relationship between the surface 81 and the terminal virtual camera 85. FIG. 19 is a diagram showing the surface 81 as seen from a direction parallel to the surface 81. As shown in FIG. 19, when the attitude of the surface 81 changes, the position and the attitude of the terminal virtual camera 85 change in accordance with the attitude of the surface 81. Specifically, the terminal virtual camera 85 is set so that the surface 81 is included in the viewing field range. In the present embodiment, the terminal virtual camera 85 is set so that the periphery of the surface 81 and the perimeter of the viewing field range of the terminal virtual camera 85 coincide with each other. Therefore, the position of the terminal virtual camera 85 is set to a position along a straight line that passes through the center position P3 of the surface 81 and is perpendicular to the surface 81 such that the distance from the surface 81 is a predetermined distance in accordance with the viewing field range. The attitude of the terminal virtual camera 85 is set so that the terminal virtual camera 85 faces toward the center position P3 of the surface 81. As the terminal virtual camera 85 is set as described above, the surface 81 is displayed on the LCD 51 of the terminal device 7 so that the input surface of the touch panel 52 and the surface 81 coincide with each other on the screen (see FIG. 12, etc.). Then, the specified position is the position on the screen touched by the player, with an object representing a dot or line generated and displayed at that position, and the operation of the touch panel 52 can be made intuitive and easy-to-understand.

As a specific process of step S21, the CPU 10 reads out the surface attitude data 100 from the main memory, and calculates the position and the attitude of the terminal virtual camera 85 based on the position and the attitude of the surface 81. Then, data representing the position and the attitude which have been calculated is stored in the main memory as the terminal camera data 105. The CPU 10 ends the game control process after step S21.

Figure 20:
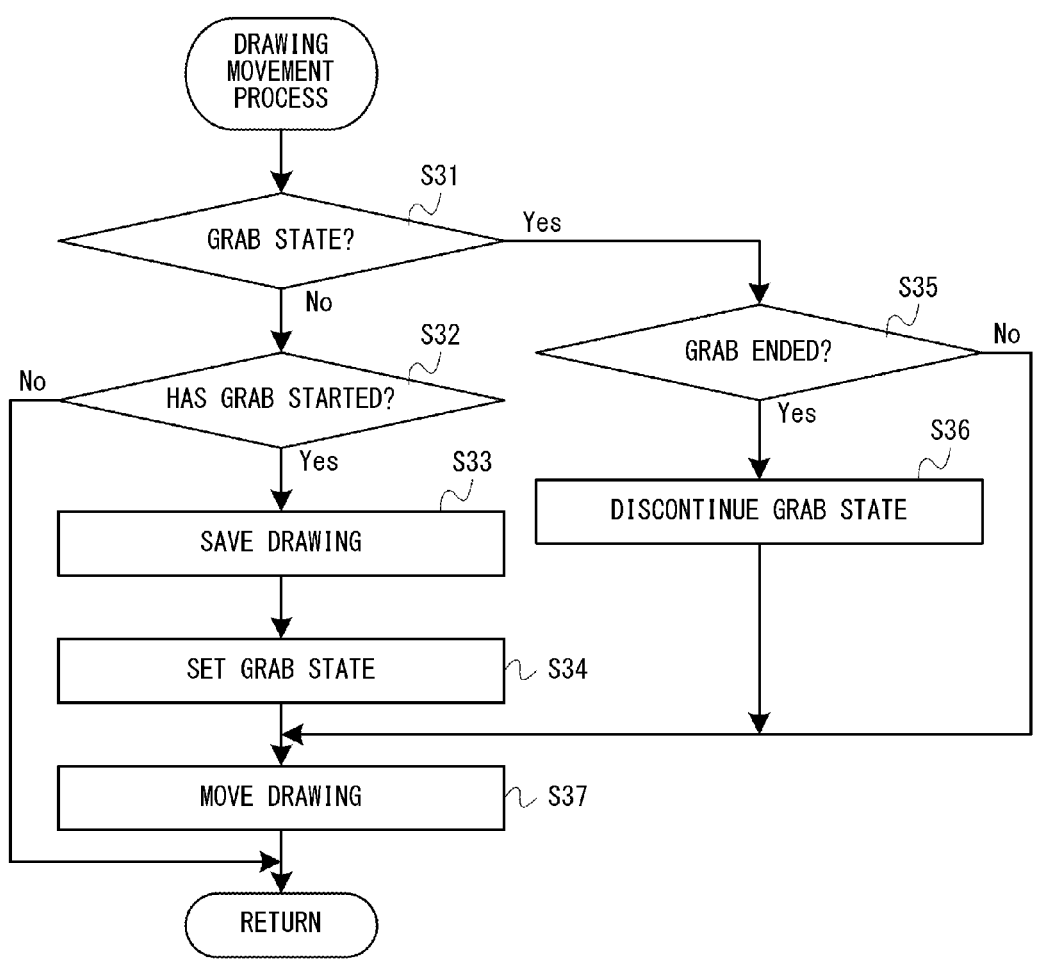
FIG. 20 is a flow chart showing a detailed flow of an example non-limiting drawing moving process (step S13) shown in FIG. 17.

Next, the details of the drawing moving process will be described. FIG. 20 is a flow chart showing a detailed flow of the drawing moving process (step S13) shown in FIG. 17. In the drawing moving process, first, in step S31, the CPU 10 determines whether the current state is a grab state. This determination can be made by reading out the flag data stored in the main memory and referencing the flag data. If the determination result of step S31 is affirmative (a grab state), the process of step S35 to be described below is performed. If the determination result of step S31 is negative (a non-grab state), the process of step S32 is performed.

In step S32, the CPU 10 determines whether a grab state has been started. A case where a grab state is started is where there is no touch input on the icon 82 in the process loop (the process loop through steps S2 to S8) of the previous iteration and there is a touch input on the icon 82 in the process loop of the current iteration. Specifically, the CPU 10 reads out the flag data from the main memory and determines that a grab state has been started if the flag data represents a non-grab state and the touch position data 94 read out in step S2 represents the position of the icon 82. When the flag data represents a grab state or the touch position data 94 readout in step S2 represents a position other than the icon 82, it is determined that a grab state has not been started. If the determination result of step S32 is affirmative, the process of step S33 is performed. If the determination result of step S32 is negative, the CPU 10 ends the drawing moving process.

In step S33, the CPU 10 saves the drawing formed by specified positions. In the present embodiment, the CPU 10 saves the specified positions of the drawing in coordinate values in a planar coordinate system. That is, the CPU 10 reads out the drawing data 104 and the surface attitude data 100 from the main memory, converts the space coordinates of one or more specified position represented by the drawing data 104 into planar coordinates. This conversion is performed by using the attitude of the surface 81 represented by the surface attitude data 100. The CPU 10 stores data representing the converted planar coordinates in the main memory. As is the path data 104 included in the drawing data 103, this data is stored in such a format that the specified positions are grouped by paths. The process of step S34 is performed, following step S33.

In step S34, the CPU 10 sets the flag data so that it represents a grab state. That is, the CPU 10 updates the flag data stored in the main memory so that it represents a grab state. Thereafter, until there is no longer a touch input on the icon 82, it is determined in step S31 that it is a grab state. Step S37 to be described below is performed, following step S34.

In step S35, the CPU 10 determines whether the grab state has ended. That is, if the touch position data 94 read out in step S2 represents a position other than the icon 82 or if there is no touch input, the CPU 10 determines that the grab state has ended. If the touch position data 94 represents the position of the icon 82, it is determined that the grab state has not ended (that the grab state is continuing). If the determination result of step S35 is affirmative, the process of step S36 is performed. If the determination result of step S35 is negative, the process of step S37 is performed, skipping the process of step S36.

In step S36, the CPU 10 resets the flag data so that the grab state is discontinued. That is, the CPU 10 updates the flag data stored in the main memory so that it represents a non-grab state. Thus, it is determined in step S31 that it is a non-grab state in subsequent process iterations. The process of step S37 is performed, following step S36.

In step S37, the CPU 10 moves the drawing formed by the specified positions. In the present embodiment, the drawing rotates in accordance with the attitude of the terminal device 7 (that is, in accordance with the change in the attitude of the surface 81). As with the surface 81, the center of rotation of the drawing is the center position of the surface 81. As described above, the space coordinates of the current (rotated) specified position can be calculated based on the planar coordinates of the specified position and the current attitude of the surface 81. Therefore, the CPU 10 reads out data representing the planar coordinates saved in step S33 and the surface attitude data 100 from the main memory, and converts the planar coordinates into space coordinates using the attitude of the surface 81. Thus, it is possible to calculate space coordinates of specified positions of the drawing which has been rotated in accordance with the attitude of the surface 81. The CPU 10 stores data representing one or more set of space coordinates calculated in the main memory as new drawing data 103. The CPU 10 ends the drawing moving process after step S37.

With the drawing moving process, the CPU 10 moves (rotates) the object representing the drawing based on an operation on the terminal device 7 (step S37). Therefore, the player can see the drawing which has been drawn from various positions or directions, and can easily check the shape of the drawing which has been drawn. In the present embodiment, since the drawing has a three-dimensional shape, it is particularly advantageous to see the drawing from various positions and directions.

In the present embodiment, if a predetermined condition (specifically, that an operation of specifying the icon 82 has been performed) for an operation on the terminal device 7 is satisfied (Yes in step S31 or Yes in step S32), the CPU 10 moves the object of the drawing based on the attitude of the terminal device 7 (step S37). If the predetermined condition is not satisfied (No in step S32), the CPU 10 does not move the object based on the attitude of the terminal device 7. Thus, the player can change the direction of the drawing through an intuitive and easy operation of changing the attitude of the terminal device 7. Moreover, since the player can change the direction of the drawing through the same operation as the operation of changing the attitude of the surface 81, it is possible to further improve the controllability.

In the present embodiment, in order to move the drawing in the drawing moving process, the CPU 10 stores planar coordinates of specified positions of the drawing. That is, planar coordinates of specified positions are stored in the process of step S33, and in the process of step S37 of moving the drawing, space coordinates of the moved specified positions are calculated using the planar coordinates and the current attitude of the surface 81. In other embodiments, the CPU 10 may store space coordinates of specified positions of the drawing in the process of step S33. In the process of step S37, the CPU 10 may rotate the drawing in accordance with the change from the attitude of the surface 81 in the process loop of the previous iteration to the attitude of the surface 81 in the process loop of the current iteration. Specifically, the drawing may be moved (rotated) in the same direction as the direction in which the attitude of the surface 81 changes and by the same amount as the amount of change of the attitude of the surface 81. With the method for storing space coordinates, an error may occur between the change of the surface 81 and the change of the drawing in the process of step S37, and the error may accumulate as the process of step S37 is repeated. Therefore, it may not be possible to accurately rotate the drawing in accordance with the rotation of the surface 81. In contrast, in the present embodiment, the planar coordinates are saved in step S33, and it is possible to calculate the moved specified positions using the saved planar coordinates and the current attitude of the surface 81. Then, errors do not accumulate, and the drawing can be accurately rotated in accordance with the rotation of the surface 81.

In the process of step S37 in the present embodiment, the whole of the drawing placed in the virtual space is moved. In other embodiments, only a portion of the drawing may be moved. For example, the CPU 10 may save only paths specified by the player in step S33, and move only the paths in step S37. While paths may be specified by any method, a path displayed at the touch position on the screen may be specified, for example.

Referring back to FIG. 16, the process of step S4 is performed, following the game control process of step S3. In step S4, a television image is generated. That is, the CPU 10 and the GPU 11b read out data representing the results of the game control process of step S3 (e.g., data of the surface 81 and the object in the game space) from the main memory, and read out data used for generating a game image from the VRAM 11d to generate a television image. In the present embodiment, the television virtual camera is set so that the surface 81 is included in the viewing field range. Thus, a television image is generated representing an area of the virtual space including the position of the surface 81. The generated television image is stored in the VRAM 11d. The process of step S5 is performed, following step S4.

In the present embodiment, as the predetermined object is placed at the specified position (step S20), the image of the object is generated at a position on the television image corresponding to the specified position. Therefore, the player can easily check the position at which an input has been made on the input surface of the touch panel 52, and can easily check the drawing which has been drawn on the input surface. The player can draw a three-dimensional drawing in a virtual space by drawing a dot or line on the input surface. Moreover, in the present embodiment, the object is generated so as to represent a path of specified positions determined by input positions (touch positions) successively inputted on the input surface (step S20). Thus, an image representing the path is generated and displayed on the television 2. Therefore, the player can easily check a line drawn on the touch panel 52. Since different images are displayed when the player inputs dots on the input surface and when the player inputs lines thereon, the game device can display an image that more accurately reflect inputs on the input surface.

In the present embodiment, the surface 81 is displayed so as to make it easier for the player to check the attitude of the surface 81 (the attitude of the terminal device 7). Moreover, the surface 81 is generated as a semi-transparent object so as to make it easier for the player to grasp the depth relationship between the surface 81 and the drawing. In other embodiments, the surface 81 does not need to be displayed (it may be handled as being transparent) or may be generated as an opaque object.

In step S5, the terminal image is generated based on the game control process. That is, the CPU 10 and the GPU 11b read out data representing the results of the game control process of step S3 from the main memory and read out data used for generating a game image from the VRAM 11d to generate a terminal image. In the present embodiment, an image representing the area where the surface 81 is set in the virtual space is generated as the terminal image. Specifically, the terminal image is generated so that the input surface of the touch panel 52 and the surface 81 coincide with each other on the screen of the LCD 51. Thus, the image of the surface 81 is displayed on the terminal device 7 (see FIG. 12, etc.). The generated terminal image is stored in the VRAM 11d. As does the television image, the terminal image includes the image of the object placed in step S20. Therefore, the player can check the drawing which has been drawn on the input surface also by looking at the screen of the terminal device 7. In the terminal image, the surface 81 may not be displayed, or may be generated as a semi-transparent or opaque object. The process of step S6 is performed, following step S5.

In the present embodiment, in the television image (and the terminal image), an object is placed at the specified position in the virtual space so as to generate an image representing the specified position. The image representing the specified position may be generated by any method. For example, in other embodiments, the game device 3 may calculate a position on the television image (and the terminal image) that corresponds to the specified position and place a predetermined image at that position, thereby generating the image representing the specified position.

With the processes of steps S4 and S5, the CPU 10 generates the television image using the television virtual camera whose viewing direction is set independent of the attitude of the surface 81, and generates the terminal image using the terminal virtual camera which is set so that the positional relationship thereof with respect to the surface 81 is constant (more specifically, so that the viewing direction thereof is generally perpendicular to the surface 81). Therefore, when the player changes the attitude of the terminal device 7, the viewing direction does not change in the image displayed on the television 2, whereas the viewing direction changes in accordance with the attitude in the image displayed on the terminal device 7 (FIGS. 11 to 14, etc.). Then, since the attitude of the surface 81 is displayed to be constant on the terminal device 7, the operation of specifying the position on the surface 81 is made easy. Since the attitude of the surface 81 is displayed to be changing on the television 2, it is possible to easily grasp the attitude of the surface 81 in the virtual space. That is, in the present embodiment, since the player can easily perform an operation of specifying the position on the surface 81 using the terminal device 7 and can easily check the attitude of the surface 81 by looking at the screen of the television 2, it is possible to easily specify a position in a three-dimensional virtual space.

In step S6, the CPU 10 outputs a game image to the television 2. Specifically, the CPU 10 sends the data of the television image stored in the VRAM 11d to the AV-IC 15. In response to this, the AV-IC 15 outputs the data of the television image to the television 2 via the AV connector 16. Thus, the television image is displayed on the television 2. In step S6, game sound data may be outputted to the television 2 together with the game image data so as to output the game sound from the speaker 2a of the television 2. The process of step S7 is performed, following step S6.

In step S7, the CPU 10 outputs (transmits) the game image to the terminal device 7. Specifically, the image data of the terminal image stored in the VRAM 11d is sent to the codec LSI 27 by the CPU 10, and a predetermined compression process is performed by the codec LSI 27. The compressed image data is transmitted by the terminal communication module 28 to the terminal device 7 via the antenna 29. The terminal device 7 receives, by the wireless module 70, the data of the image transmitted from the game device 3, and a predetermined expansion process is performed by the codec LSI 66 on the received image data. The expanded image data is outputted to the LCD 51. Thus, the terminal image is displayed on the LCD 51. In step S7, game sound data may be transmitted to the terminal device 7 together with the game image data so as to output the game sound from the speaker 67 of the terminal device 7. The process of step S8 is performed, following step S7.

In step S8, the CPU 10 determines whether the game should be ended. The determination of step S8 is made based on, for example, whether the user has given an instruction to quit the game, etc. If the determination result of step S8 is negative, the process of step S2 is performed again. If the determination result of step S8 is affirmative, the CPU 10 ends the game process shown in FIG. 16. When ending the game process, a process of saving the game data in a memory card, etc., may be performed. The series of processes through steps S2 to S8 is repeatedly performed until it is determined in step S8 that the game should be ended.

As described above, with the game process described above, a position on the surface 81 in the virtual space is specified through an input on the touch panel 52 of the terminal device 7 (step S16), and the attitude of the surface 81 changes in accordance with the attitude of the terminal device 7 (step S12). Then, the player can specify a position in a three-dimensional virtual space by specifying the position using the touch panel 52 while changing the attitude of the surface 81. Thus, in the present embodiment, it is possible to easily input a position in a three-dimensional space using an input device having a planar input surface, i.e., the touch panel 52. Thus, for example, the player can input dots and lines on the touch panel 52, and can also draw a three-dimensional picture in the virtual space by appropriately changing the attitude of the terminal device 7 as in the above embodiment.

7. Variations

The above embodiment is merely an example, and the input system, etc., may also be implemented with, for example, the following configurations in other embodiments.

(Variation Regarding Movement of Surface)

While the attitude of the surface 81 changes in accordance with the attitude of the terminal device 7 in the embodiment above, the surface 81 may be moved by any other method in other embodiments. A variation regarding the method for moving the surface 81 will now be described with reference to FIGS. 21 to 24.

Figure 21:
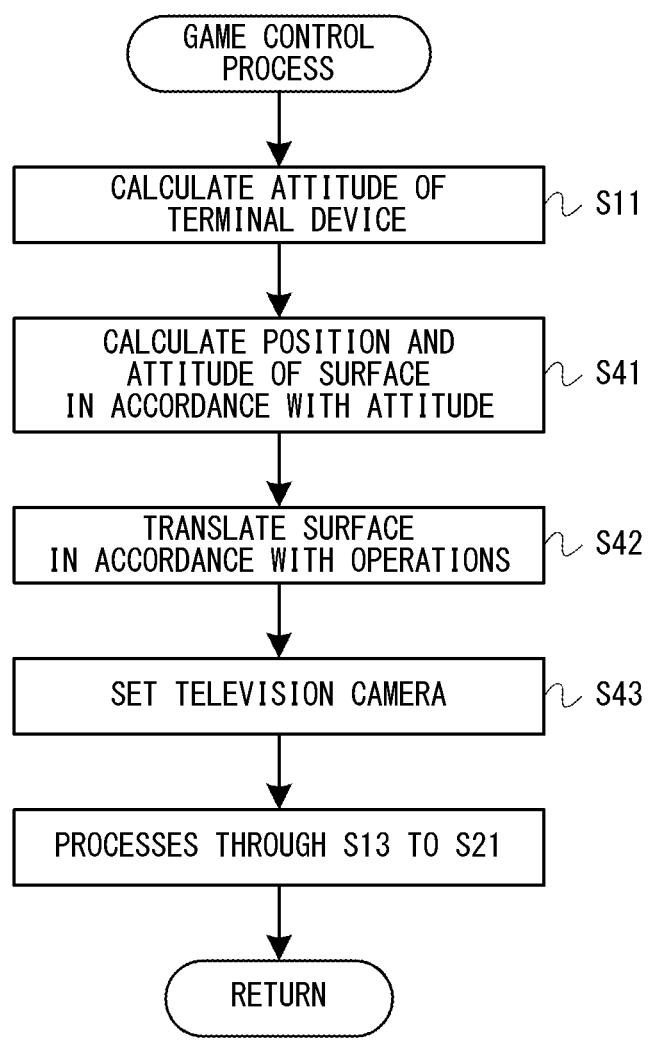
FIG. 21 is a flow chart showing a flow of an example non-limiting game control process according to a variation of the embodiment above.

FIG. 21 is a flow chart showing the flow of the game control process in the variation of the embodiment above. In FIG. 21, the same processes as those shown in FIG. 17 are denoted by the same step numbers and will not be further described below.

In this variation, the process of step S41 is performed, following step S11. In step S41, the CPU 10 calculates the position and the attitude of the surface 81 in accordance with the attitude of the terminal device 7. That is, the CPU 10 controls the attitude of the surface 81 so as to correspond to the attitude of the terminal device 7, and controls the position of the surface 81 in accordance with the attitude of the terminal device 7. The attitude of the surface 81 is controlled based on the attitude of the terminal device 7 as in the embodiment above. The position of the surface 81 is controlled in accordance with the attitude of the surface 81 so that the surface 81 moves in an arc about a position outside the surface 81.

Figure 22:
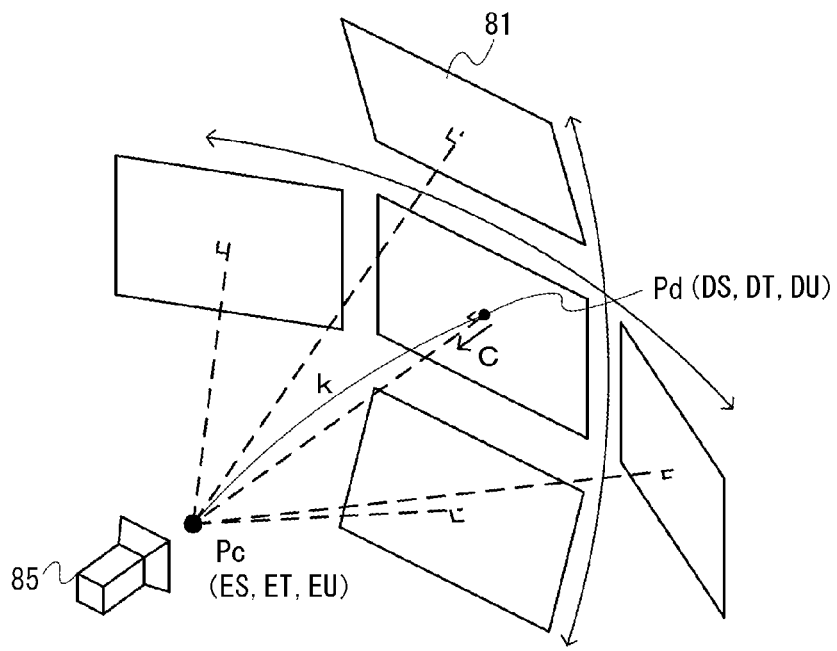
FIG. 22 is a diagram showing how the surface 81 is moved in this variation.

FIG. 22 is a diagram showing the movement of the surface 81 in this variation. In FIG. 22, the point Pc is the central point for the movement of the surface 81 in an arc and is fixedly set in the game space. In FIG. 22, the point Pc is set on the same side as the terminal virtual camera 85 with respect to the surface 81. When the attitude of the terminal device 7 changes, the position of the surface 81 changes as if to rotate about the reference point Pc while the attitude thereof also changes, as shown in FIG. 22. Specifically, the position of the surface 81 is calculated so that the length of the perpendicular extending from the reference point Pc to the surface 81 is equal to a predetermined value (that is, so that the distance from the reference point Pc is constant). Thus, in this variation, the position and the attitude of the surface 81 change so that the surface 81 moves along a spherical surface whose center is the point Pc (see FIG. 22). Therefore, the player can feel as if the player were drawing a picture on an inner surface of a sphere by making inputs on the touch panel 52 while changing the attitude of the terminal device 7.

As a specific process of step S41, the CPU 10 first calculates the attitude of the surface 81 by a method similar to step S12. Next, the CPU 10 calculates the position of the surface 81 so that the length of the perpendicular is equal to a predetermined value based on the calculated attitude and the position of the reference point Pc. For example, the position Pd (DS, DT, DU) of the surface 81 is calculated as shown in Expression (2) below, where (ES, ET, EU) are the coordinates of the reference point Pc and k is the distance from the reference point Pc to the surface 81.

$$DS = -k \times CS + ES$$

$$DT = -k \times CT + ET$$

$$DU = -k \times CU + EU \quad (2)$$

In Expression (2) above, (CS, CT, CU) are the components of the unit vector C (see FIG. 22) which extends in the forward u-axis direction in the planar coordinate system. Data representing the position and the attitude of the surface 81 calculated is stored in the main memory. The process of step S42 is performed, following step S41.

Figure 23:
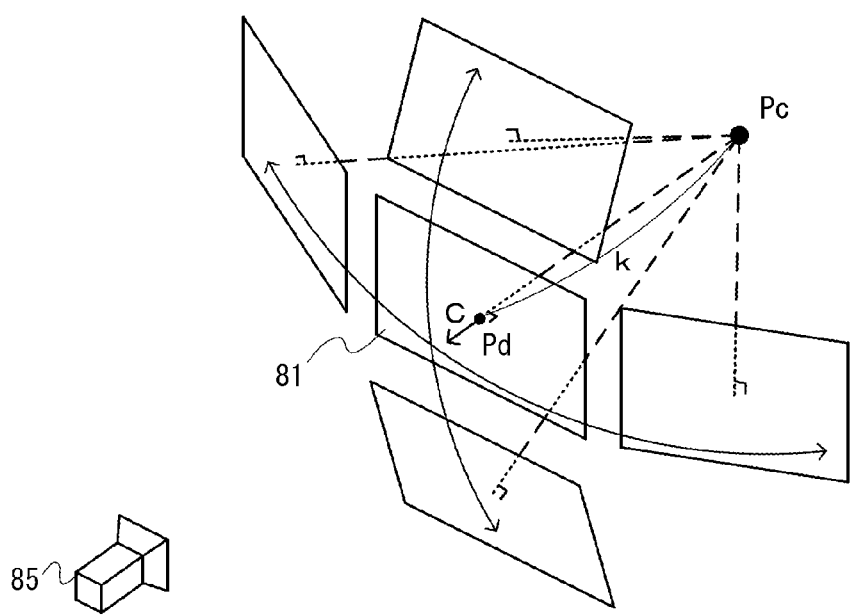
FIG. 23 is a diagram showing how the surface 81 is moved in another embodiment.
Figure 24:
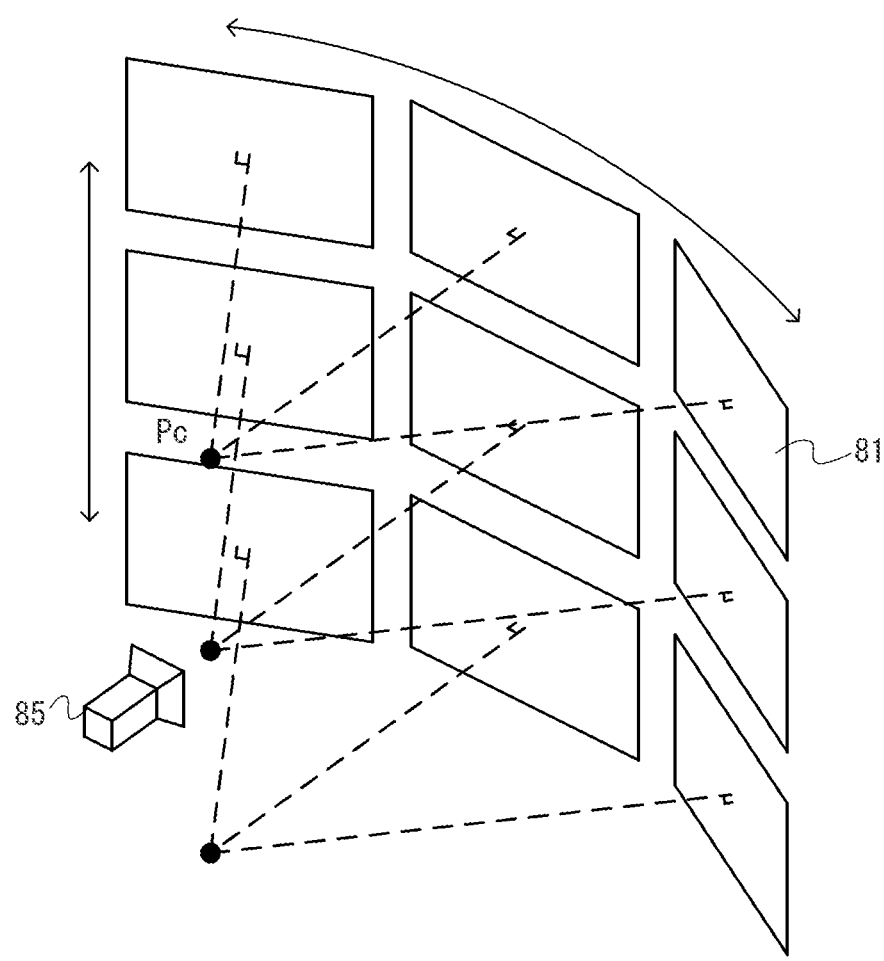
FIG. 24 is a diagram showing how the surface 81 is moved in another embodiment.

While the reference point Pc is set on the same side as the terminal virtual camera 85 with respect to the surface 81 in this variation, the position of the reference point may be any position. FIGS. 23 and 24 are diagrams showing how the surface 81 is moved in other embodiments. In another embodiment, the reference point Pc may be set on the opposite side of the terminal virtual camera 85 with respect to the surface 81 as shown in FIG. 23. Then, the player can feel as if the player were drawing a picture on the outer surface of a sphere by making inputs on the touch panel 52 while changing the attitude of the terminal device 7. In the case shown in FIG. 23, since the direction from the reference point Pc to the position Pd of the surface 81 and the direction of the vector C are equal to each other, the position Pd of the surface 81 can be calculated by changing "−k" to "k" in Expression (2) above. Where k=0, the surface 81 rotates about the position Pd (the reference point Pc) as in the embodiment above (see FIG. 19).

In another embodiment, the surface 81 may be moved in an arc about the reference point Pc for a predetermined rotation direction (the rotation direction about the up/down direction in FIG. 24) while the surface 81 is translated for another direction, as shown in FIG. 24. Then, the player can feel as if the player were drawing a picture on the inner surface of a cylinder. The translation of the surface 81 shown in FIG. 24 may be done in accordance with the change in the attitude of the terminal device 7 or may be done in accordance with a direction input operation in step S42 to be described below.

In step S42, the CPU 10 moves the surface 81 based on a direction input operation on the terminal device 7. While the direction input operation may be performed by any method, it may be for example an input operation on the analog stick 53 or the cross button 54A. Specifically, the surface 81 is controlled so as to move in an up, down, left, right, forward or backward direction of the surface 81 in accordance with an up, down, left, right, forward or backward direction input operation. That is, the CPU 10 determines the direction specified by the direction input operation based on the terminal operation data 91 obtained in step S2. Then, data representing the position and the attitude of the surface 81 is read out from the main memory, and the surface 81 is moved in a direction in accordance with the specified direction. The above data stored in the main memory is updated so as to represent the moved position of the surface 81. The process of step S43 is performed, following step S42.

With the process of step S42, the surface 81 can be freely translated through direction input operations on the terminal device 7. In other embodiments, the CPU 10 may move the surface 81 in an arc (rather than translate it) in step S42. For example, the CPU 10 may control the surface 81 so that the surface 81 moves along a spherical surface or a cylindrical surface as shown in FIGS. 22 to 24.

In step S43, the CPU 10 controls the television virtual camera based on the position and the attitude of the surface 81. The television virtual camera may be controlled in any way as long as the position and the attitude are controlled so that the surface 81 is included in the viewing field range. For example, the position of the television virtual camera may be controlled at a predetermined distance from the surface 81 so that the viewing direction thereof faces toward the surface 81. It may be controlled so that the attitude of the television virtual camera does not change, i.e., so that the television virtual camera is translated. Then, as in the embodiment above, the player can check, on the television image, the attitude of the surface 81 in the virtual space. As a specific process of step S43, the CPU 10 reads out data representing the position and the attitude of the surface 81 from the main memory, and calculates the position and the attitude of the television virtual camera in accordance with the position of the surface 81. The television camera data representing the position and the attitude which have been calculated is stored in the main memory. In the process of step S4, the television image is generated using the television camera data. The process of step S13 is performed, following step S43. In and after step S13, similar processes to those of the embodiment above are performed.

In other embodiments, the television virtual camera may be controlled in accordance with direction input operations on the terminal device 7. That is, the CPU 10 may translate, move in an arc, or rotate the television virtual camera in accordance with the direction input operation. Then, as in a case in which a drawing is rotated through the drawing moving process described above, the player can see the drawing from various directions and can easily check the shape of the drawing.

(Variation Regarding Game Process Using Specified Position)

The embodiment above is directed to an example of a drawing game in which a picture can be drawn in a three-dimensional virtual space, as a game using the specified position as an input. That is, the embodiment above is directed to a process of placing an object at a specified position (step S20) as an example of a game process using the specified position as an input. The game processes to be performed using the specified position as an input may be any processes, and may be game examples as follows, for example.

Figure 25:
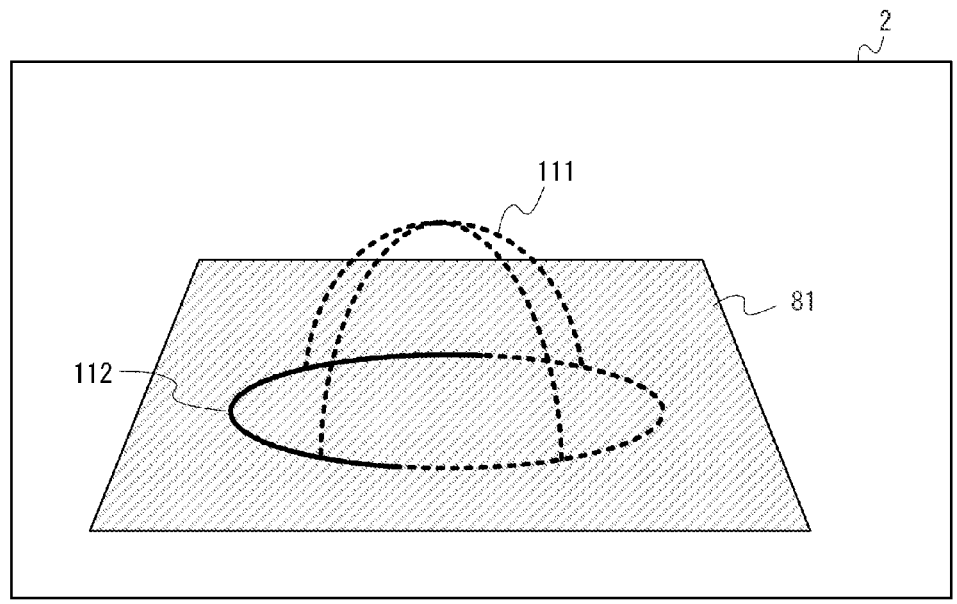
FIG. 25 is a diagram showing an example non-limiting game image to be displayed on the television 2 in a game in which a player draws a drawing so that it is the same as a sample.

FIG. 25 is a diagram showing a game image to be displayed on the television 2 in a game in which a player draws a drawing so that it is the same as a sample. As shown in FIG. 25, the surface 81 and a sample object 111 are displayed on the television 2. The sample object 111 is an object representing a sample of the drawing to be drawn by the player, and a plurality of different sample objects are provided in the game program. The image to be displayed on the terminal device 7 is similar to that of the embodiment above. In this game, the player draws lines (an object 112 representing a path of specified positions) in the virtual space so that it is the same as the sample object 111 using the terminal device 7 as in the embodiment above. Then, the CPU 10 may calculate the similarity between the sample object 111 and the object 112 generated based on player inputs, or perform game processes such as calculating the score based on the similarity. Thus, the game device 3 may perform a game process using, as an input, a path representing specified positions which have been inputted.

Figure 26:
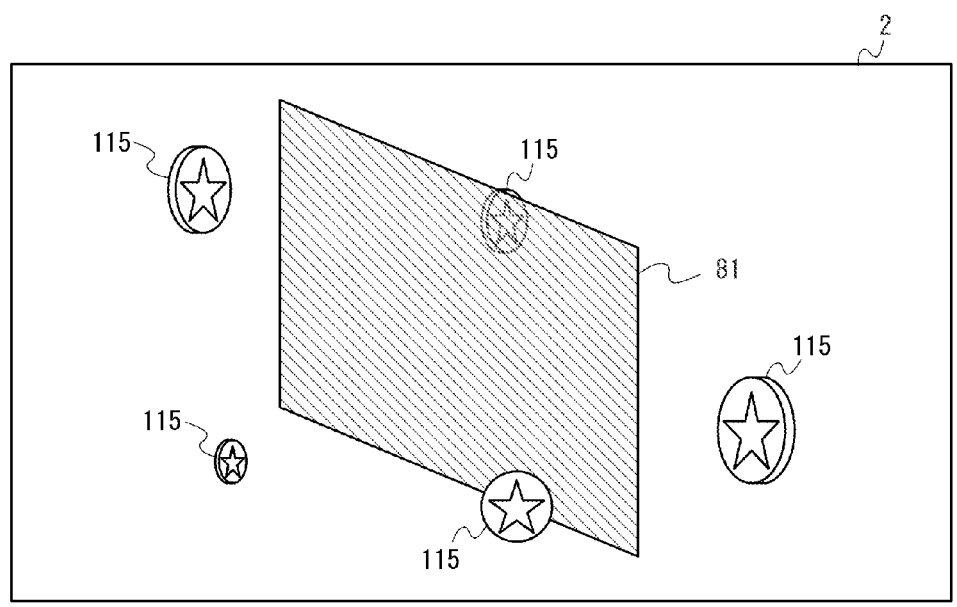
FIG. 26 is a diagram showing an example non-limiting game image to be displayed on the television 2 in a game in which an object 115 arranged in a three-dimensional virtual space is specified by an operation performed on the terminal device 7.

FIG. 26 is a diagram showing a game image to be displayed on the television 2 in a game in which a player specifies, by operations performed on the terminal device, objects (coins) 115 placed in a three-dimensional virtual space. As shown in FIG. 26, the surface 81 and the coins 115 are displayed on the television 2. The image to be displayed on the terminal device 7 is similar to that of the embodiment above. In this game, the player specifies a position in the virtual space by a method similar to that of the embodiment above. Then, it is possible to obtain a coin 115 by specifying the position of the coin 115. For example, the player plays a game by competing for the accuracy in specifying the coin 115 or for the number of coins 115 obtained within a time limit. In this case, as a game process performed using the specified position as an input, the CPU 10 determines whether the specified position is a position of a coin 115, and performs the process of incrementing the number of coins 115 obtained if the specified position is the position of a coin 115. Thus, the game process is not limited to a process of displaying an image at a specified position as in the embodiment above, but may be a process of specifying (selecting) an object in the virtual space.

Figure 27:
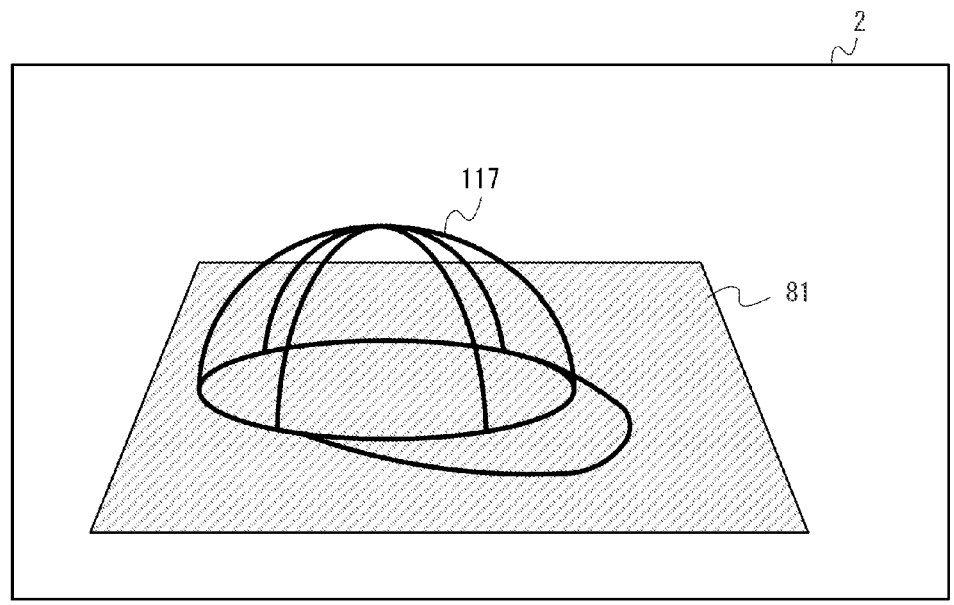
FIG. 27 is a diagram showing an example non-limiting game image to be displayed on the television 2 in a game in which an object is generated based on a drawing drawn by a player.
Figure 28:
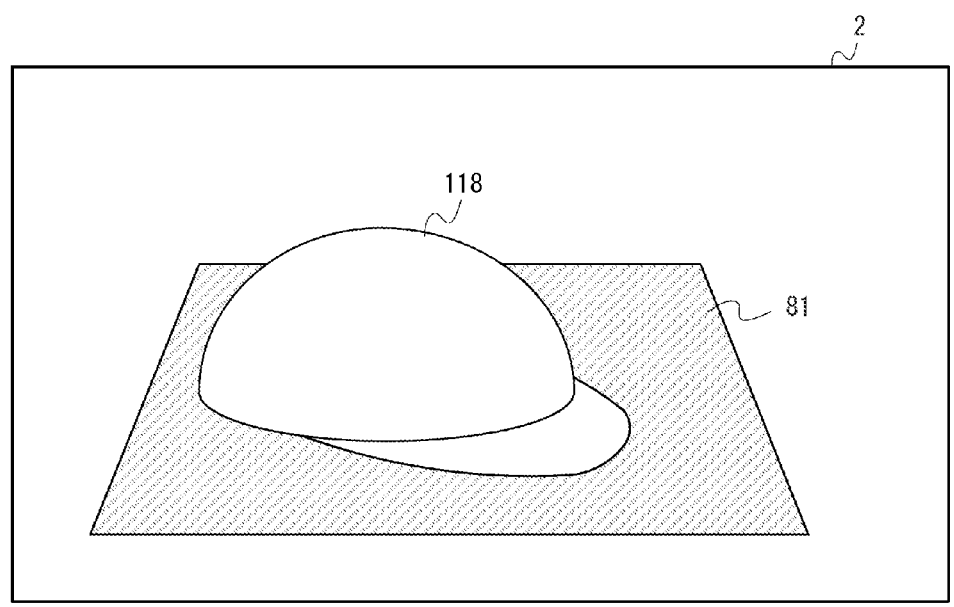
FIG. 28 is a diagram showing an example non-limiting game image to be displayed on the television 2 in a game in which an object is generated based on a drawing drawn by a player.

FIGS. 27 and 28 are diagrams showing game images to be displayed on the television 2 in a game in which an object is generated based on a drawing drawn by the player. In this game, the player first generates a drawing in the virtual space by operations similar to those of the embodiment above. In FIG. 27, an object 117 representing the drawing based on player inputs is generated and displayed. As a game process to be performed using a specified position as an input, the CPU 10 generates a three-dimensional object based on specified positions of the drawing. For example, the CPU 10 generates a three-dimensional object by setting a surface based on paths of the specified positions. For example, when a closed curve is formed by the path, a surface whose perimeter is the closed curve may be set. FIG. 28 shows a game image in a case in which a three-dimensional object 118 is generated based on the object 117 shown in FIG. 27. Thus, the game system 1 may be a system for performing a game process of generating a three-dimensional object based on specified positions. The generated object may be used in a game. For example, the player character may be allowed to use the generated object as an item, or the generated object may be used as a player character.

In addition to those described above, the game process to be performed using a specified position as an input may be any other process. For example, in other embodiments, the CPU 10 may perform a game process of moving the player character in accordance with paths of specified positions. That is, the game to be performed by the game device 3 may be a game in which when a player inputs a path of specified positions, a player character in the virtual space moves along the path.

(Other Applications of Input System)

The embodiment above is directed to the game system 1 in which a player performs game operations using the terminal device 7, as an example of an input system used by a user for inputting a three-dimensional position in a virtual space. In other embodiments, the input system is not limited to game applications, but may be applied to any information processing system for specifying a three-dimensional position in a virtual space based on a user operation.

(Variation Regarding Surface Set in Virtual Space)

In the embodiment above, the surface 81 set in a three-dimensional virtual space is a flat surface. In other embodiments, the surface set in the three-dimensional virtual space may be a curved surface. For example, in a case in which the surface is controlled so as to move along a spherical surface or the side surface of a cylinder (FIGS. 22 to 24), a curved surface extending along the spherical surface or the cylinder side surface may be set. While the surface 81 has the same shape as the shape of the display screen of the terminal device 7 in the embodiment above, the shape of the surface 81 and the shape of the display screen may be different from each other.

(Variation Regarding Configuration of Game System)

In the embodiment above, the game system 1 includes the portable terminal device 7 and the television 2 as display devices. The game system herein may have any configuration as long as an image representing an area in the virtual space including the position of the surface can be displayed on at least one display device. The game system 1 may have a configuration in which the image is displayed on one display device (e.g., the television 2) while the image is not displayed on the terminal device 7 in other embodiments, for example. The game system 1 may include two display devices different from the terminal device 7. Then, the television image of the embodiment above is displayed on one of the display devices, and the terminal image is displayed on the other display device.

Although the game system 1 includes the controller 5 as a controller device different from the terminal device 7, it may not include the controller 5 in other embodiments. In other embodiments, the controller 5 may be used further as a controller device, in addition to the terminal device 7. For example, when a player draws a drawing in a virtual space by drawing a line on the touch panel 52 using the terminal device 7, the game device 3 may move or deform the drawing in accordance with operations on the controller 5.

The input system with which a user inputs a three-dimensional position in a virtual space is not limited to a system implemented with a plurality of devices, but may be implemented by a single device. For example, the input system may be implemented by a portable information processing device (which may be a game device) including two display screens with a touch panel provided on one of the display screens. Then, the information processing device displays the terminal image of the embodiment above on the display screen including the touch panel provided thereon, and displays the television image of the embodiment above on the other display screen. The information processing device may include a sensor (e.g., a gyrosensor or an acceleration sensor) for detecting the physical quantity used for calculating the attitude of itself.

(Variation Regarding Method for Detecting Input Position on Input Surface)

In the embodiment above, the terminal device 7 includes the touch panel 52 provided on the front screen of the LCD 51, as an example of the position detection unit for detecting the input position on a predetermined input surface. In other embodiments, the position detection unit may be a touch pad, for example. That is, the terminal device 7 may include a touch pad without the display unit (the LCD 51) and the touch panel 52. The terminal device 7 may display a cursor on the LCD 51, move the cursor in accordance with a predetermined direction input operation (e.g., an operation on the analog stick 53 or the cross button 54), and use the position of the cursor as the input position.

(Variation Regarding Information Processing Device for Performing Game Processes)

While the game device 3 performs the series of game processes performed in the game system 1 in the embodiment above, some of the game processes may be performed by another device. For example, in other embodiments, some of the game processes (e.g., the process of generating the terminal image) may be performed by the terminal device 7. In other embodiments, in an input system including a plurality of information processing devices that can communicate with each other, the game processes may be divided among the plurality of information processing devices. In a case in which game processes are performed by a plurality of information processing devices, the game processes performed by different information processing devices are synchronized with each other, thus complicating the game processes. In contrast, in a case in which game processes are performed by one game device 3 and the terminal device 7 receives and displays game images (that is, a case in which the terminal device 7 is a thin client terminal) as in the embodiment above, it is not necessary to synchronize game processes between a plurality of information processing devices, and it is possible to simplify the game processes.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, (a) non-volatile memory, including by way of example semiconductor memory devices, such as Erasable Programmable Read-Only Memory (EPROM), Electrically Erasable Programmable Read-Only Memory (EEPROM), and flash memory devices; (b) magnetic disks such as internal hard disks and removable disks; (c) magneto-optical disks; and (d) Compact Disc Read-Only Memory (CD-ROM). Any of the foregoing may be supplemented by, or incorporated in, specially-designed ASICs.

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

The systems, devices and apparatuses described herein may include one or more processors, which may be located in one place or distributed in a variety of places communicating via one or more networks. Such processor (s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment is applicable, for example, to game systems, game devices, game programs, etc., with the aim of, for example, allowing the player to easily specify a position in a three-dimensional space based on an input on a planar input surface such as a touch panel or a touch pad.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An input system comprising a controller device and an information processing device for calculating a position in a three-dimensional virtual space based on an operation performed on the controller device, wherein:
    the controller device comprises:
        a position detection unit for detecting an input position on an input surface;
        an inertia sensor unit; and
        an operation data transmitter for transmitting, to the information processing device, operation data including data representing detection results of the position detection unit and the inertia sensor unit; and
    the information processing device comprises a processing system including at least one processor, the processing system being configured to perform operations comprising:
        calculating aspects of an attitude of the controller device based on the detection result of the inertia sensor unit;
        setting a surface in the virtual space so that an attitude of the virtual space surface changes in accordance with the attitude of the controller device;
        generating a first image which represents an area in the virtual space including a position of the virtual space surface;
        outputting the first image to a display device; and
        calculating, as the position in the virtual space, a position on the virtual space surface determined in accordance with the input position.

2. The input system according to claim 1, wherein the processing system is further configured to generate a predetermined image at a position on the first image corresponding to the calculated position.

3. The input system according to claim 2, wherein the predetermined image comprises an image representing a path extending through a series of positions which are determined in the virtual space by a series of input positions on the input surface.

4. The input system according to claim 1, wherein the processing system is further configured to arrange an object at the calculated position.

5. The input system according to claim 4, wherein the processing system is further configured to move the object based on an operation performed using the controller device.

6. The input system according to claim 5, wherein the processing system is further configured to move the object based on the attitude of the controller device if a condition is satisfied for the operation performed on the controller device, and to not move the object based on the attitude of the controller device if the condition is not satisfied.

7. The input system according to claim 1, wherein:
    the controller device further comprises a display unit;
    the position detection unit comprises a touch panel provided on a display screen of the display unit;
    the processing system of the information processing device is further configured to:
        generate a second image which represents an area in the virtual space including a position of the virtual space surface; and
        calculate, as the position in the virtual space, a position corresponding to the input position on the display screen; and
    the information processing device further comprises a transmitter for transmitting the second image to the controller device.

8. The input system according to claim 7, wherein the processing system is further configured to generate, as the second image, an image representing an area in the virtual space in which the virtual space surface is set.

9. The input system according to claim 8, wherein the processing system is further configured to:
    generate the first image using a first virtual camera whose viewing direction is set independently of the attitude of the virtual space surface; and
    generate the second image using a second virtual camera whose viewing direction is set to be generally perpendicular to the virtual space surface.

10. The input system according to claim 1, wherein the processing system is further configured to control the attitude of the virtual space surface so that the attitude of the virtual space surface corresponds to the attitude of the controller device.

11. The input system according to claim 1, wherein the processing system is further configured to control the attitude of the virtual space surface so that the attitude of the virtual space surface corresponds to the attitude of the controller device, and control a position of the virtual space surface in accordance with the attitude of the controller device.

12. The input system according to claim 11, wherein the processing system is further configured to control the virtual space surface so that the virtual space surface moves in an arc about a predetermined position in the virtual space in accordance with the attitude of the controller device.

13. The input system according to claim 1, wherein the processing system is further configured to move the virtual space surface based on a direction input operation performed on the controller device.

14. The input system according to claim 1, wherein the processing system is further configured to perform game process using, as an input, the calculated position.

15. An information processing system for calculating a position in a three-dimensional virtual space based on an operation performed on an operation unit, the information processing system comprising:
a position detector for detecting an input position on an input surface provided on the operation unit;
a sensor for detecting a physical quantity for calculating aspects of an attitude of the operation unit; and
a processing system comprising at least one processor, the processing system being configured to perform operations comprising:
obtaining operation data including data representing detection results of the position detector and the sensor unit;
calculating aspects of an attitude of the operation unit based on the physical quantity;
setting a surface in the virtual space based on the calculated attitude;
generating a first image which represents an area in the virtual space including a position of the virtual space surface;
outputting the first image to a display device; and
calculating, as the position in the virtual space, a position on the virtual space surface determined in accordance with the input position.

16. An information processing device for calculating a position in a three-dimensional virtual space based on an operation performed on a controller device, the information processing device comprising:
a processing system comprising at least one processor, the processing system being configured to perform operations comprising:
obtaining operation data including data representing detection results of a touch panel and an inertial sensor of the controller device;
calculating aspects of an attitude of the controller device based on the detection result of the inertial sensor;
setting a surface in the virtual space so that an attitude of the virtual space surface changes in accordance with the attitude of the controller device;
calculating, as the position in the virtual space, a position on the virtual space surface determined in accordance with an input position on the touch panel;
arranging an object at the calculated position;
generating a first image representing an area in the virtual space including a position of the virtual space surface;
outputting the first image to a display device; and
generating, as a second image to be displayed on a display screen on which the touch panel is provided, an image representing an area in the virtual space in which the virtual space surface is set; and
a transmitter for transmitting the second image to the controller device.

17. A computer-readable non-transitory storage medium storing an information processing program for execution by a computer of an information processing device for calculating a position in a three-dimensional virtual space based on an operation performed on a controller device, the information processing program comprising instructions which, when executed, cause the computer to:
obtain operation data including data representing detection results of a touch panel and an inertial sensor of the controller device;
calculate aspects of an attitude of the controller device based on the detection result of the inertial sensor;
set a surface in the virtual space so that an attitude of the virtual space surface changes in accordance with the attitude of the controller device;
calculate, as the position in the virtual space, a position on the virtual space surface determined in accordance with an input position on the touch panel;
arrange an object at the calculated position;
generate, as a first image to be displayed on a display device, an image representing an area in the virtual space including a position of the virtual space surface; and
generate, as a second image to be displayed on a display screen on which the touch panel is provided, an image representing an area in the virtual space in which the virtual space surface is set.

18. A three-dimensional position calculation method for an input system including a controller device and an information processing device for calculating a position in a three-dimensional virtual space based on an operation performed on the controller device, the three-dimensional position calculation method comprising:
calculating aspects of an attitude of the controller device based on a detection result of an inertial sensor of the controller device;
setting a surface in the virtual space so that an attitude of the virtual space surface changes in accordance with the attitude of the controller device;
generating a first image representing an area in the virtual space including a position of the virtual space surface;
outputting the first image to a display device; and
calculating, as the position in the virtual space, a position on the virtual space surface determined in accordance with an input position on an input surface of the controller device.

19. The three-dimensional position calculation method according to claim 18, further comprising generating an image at a position on the first image corresponding to the calculated position on the virtual space surface.

20. The three-dimensional position calculation method according to claim 19, further comprising generating, as the image, an image representing a path extending through a series of positions which are determined in the virtual space by a series of input positions on the input surface.

21. The three-dimensional position calculation method according to claim 18, further comprising arranging an object at the calculated position on the virtual space surface.

22. The three-dimensional position calculation method according to claim 21, further comprising moving the object based on an operation performed on the controller device.

23. The three-dimensional position calculation method according to claim 22, further comprising moving the object based on the attitude of the controller device if a condition is satisfied for the operation performed on the controller device, and not moving the object based on the attitude of the controller device if the condition is not satisfied.

24. The three-dimensional position calculation method according to claim 18, wherein:
the controller device includes a display unit, and a touch panel provided on a display screen of the display unit, the method further comprising:
generating a second image representing an area in the virtual space including a position of the virtual space surface;
transmitting the second image to the controller device; and
calculating, as the position in the virtual space, a position corresponding to the input position on the display screen.

25. The three-dimensional position calculation method according to claim 24, further comprising generating, as the second image, an image representing an area in the virtual space in which the virtual space surface is set.

26. The three-dimensional position calculation method according to claim 25, further comprising:
generating the first image using a first virtual camera whose viewing direction is set independently of an attitude of the virtual space surface; and
generating the second image using a second virtual camera whose viewing direction is set to be generally perpendicular to the virtual space surface.

27. The three-dimensional position calculation method according to claim 18, further comprising controlling an attitude of the virtual space surface so that the attitude of the virtual space surface corresponds to the attitude of the controller device.

28. The three-dimensional position calculation method according to claim 18, further comprising controlling an attitude of the virtual space surface so that the attitude of the virtual space surface corresponds to the attitude of the controller device, and controlling a position of the virtual space surface in accordance with the attitude of the controller device.

29. The three-dimensional position calculation method according to claim 28, further comprising controlling the virtual space surface so that the virtual space surface moves in an arc about a predetermined position in the virtual space in accordance with the attitude of the controller device.

30. The three-dimensional position calculation method according to claim 18, further comprising moving the virtual space surface based on a direction input operation performed on the controller device.

31. The three-dimensional position calculation method according to claim 18, further comprising performing a game process using the calculated position on the virtual space surface as an input.

32. A three-dimensional position calculation method for an information processing system for calculating a position in a three-dimensional virtual space based on an operation performed on an operation unit, the three-dimensional position calculation method comprising:
obtaining operation data including data representing an input position on an input surface provided on the operation unit, and data representing a physical quantity for calculating an attitude of the operation unit;
calculating aspects of the attitude of the operation unit based on the physical quantity;
setting a surface in the virtual space based on the calculated attitude;
generating a first image representing an area in the virtual space including a position of the virtual space surface;
outputting the first image to a display device; and
calculating, as the position in the virtual space, a position on the virtual space surface determined in accordance with the input position.

33. An information processing device for use with a control device including a planar touch screen and an inertial sensor, the information processing device including:
a communication module for receiving, from the control device, touch screen input data corresponding to an input supplied to the touch screen and inertial sensor data corresponding to aspects of an attitude of the control device; and
a processing system including at least one processor, the processing system being configured to set a surface in a virtual space based on the aspects of an attitude of the control device indicated by the inertial sensor data and to determine a position in the virtual space in accordance with an input to the touch screen indicated by the touch screen input data.

* * * * *